(12) United States Patent
Vass

(10) Patent No.: US 11,243,621 B1
(45) Date of Patent: Feb. 8, 2022

(54) MICROBIAL SURFACE CONTACT MITIGATION STYLUS TOOL

(71) Applicant: Peter L. Vass, Palmdale, CA (US)

(72) Inventor: Peter L. Vass, Palmdale, CA (US)

( * ) Notice: Subject to any disclaimer, the term of this patent is extended or adjusted under 35 U.S.C. 154(b) by 0 days.

(21) Appl. No.: 17/449,650

(22) Filed: Sep. 30, 2021

(51) Int. Cl.
  *G06F 3/0354* (2013.01)
  *G06F 3/044* (2006.01)

(52) U.S. Cl.
  CPC .......... *G06F 3/03545* (2013.01); *G06F 3/044* (2013.01)

(58) Field of Classification Search
  CPC .............................. G06F 3/03545; G06F 3/044
  See application file for complete search history.

(56) References Cited

U.S. PATENT DOCUMENTS

| | | | | |
|---|---|---|---|---|
| 5,882,667 A * | 3/1999 | Jones | ...................... | A01N 25/34 424/405 |
| 9,880,647 B2 * | 1/2018 | Askew | ................ | G06F 3/03545 |
| 2015/0022503 A1 * | 1/2015 | Chang | ...................... | B43K 23/12 345/179 |
| 2017/0262085 A1 * | 9/2017 | Askew | ...................... | G06F 1/163 |
| 2019/0143379 A1 * | 5/2019 | Kitsell | ............... | G01N 35/1004 510/161 |
| 2019/0314536 A1 * | 10/2019 | Gilliam-Perkins | ....... | A61L 2/28 |
| 2021/0196065 A1 * | 7/2021 | Hsu | ......................... | G09B 19/24 |
| 2021/0330833 A1 * | 10/2021 | Perry | ........................ | A61L 2/10 |

* cited by examiner

*Primary Examiner* — Peter D McLoone

(57) ABSTRACT

Embodiments exemplify an ambidextrous multifunctional personal protection finger-mounted keyring ergonomic microbial surface contact mitigation stylus tool, grasped by a user to mitigate hand contact with surfaces, and electrically interact with a capacitive device touchscreen. The stylus tool can also effect force transmission and motion to a movable surface, and can include a rigid elongated stem having a proximal end with at least a transverse aperture that supports a removably and pivotably docked ring can be used as a rotationally locking keyring and the fulcrum of a third-class lever. The stylus tool can further include a compliantly coupled and ejectable cap on the stem distal end, and a mechanism that includes an ergonomic actuator to removably separate, without the user hand touching the cap, eject the disposable and replaceable cap from the stem by axially sliding thereon, and optionally activating a capacitive device touchscreen.

18 Claims, 34 Drawing Sheets

DETAIL 2A

DETAIL 2B

DETAIL 2C

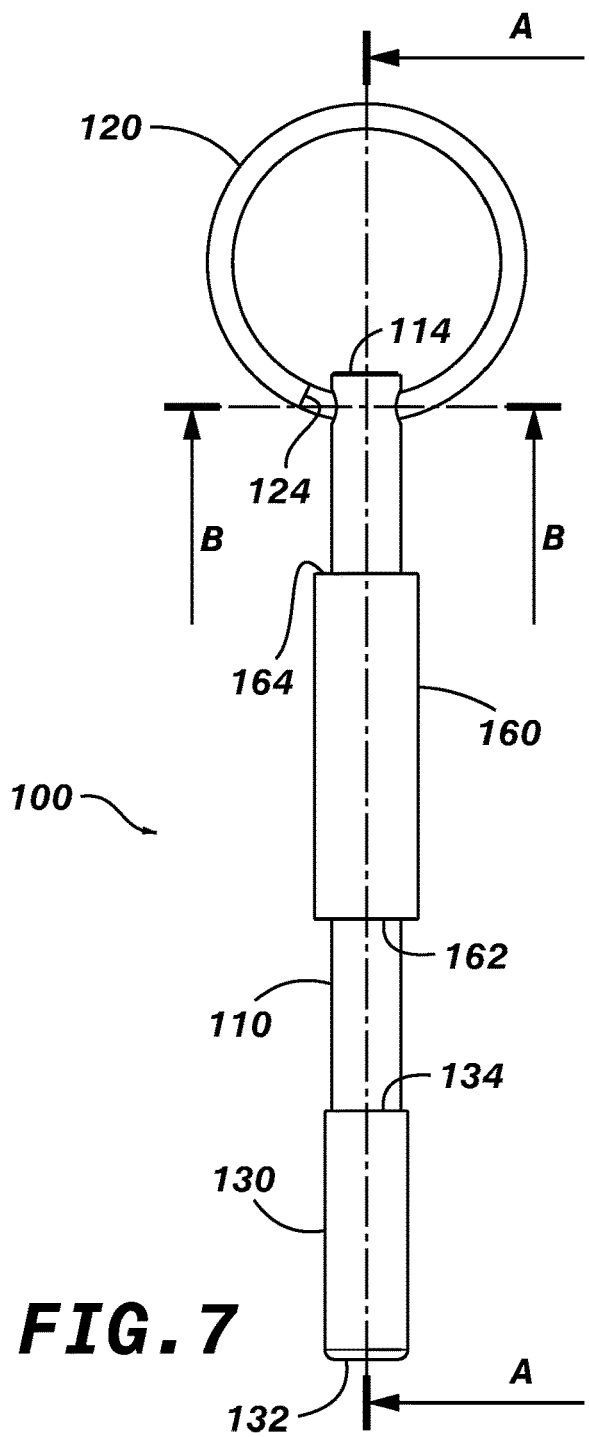
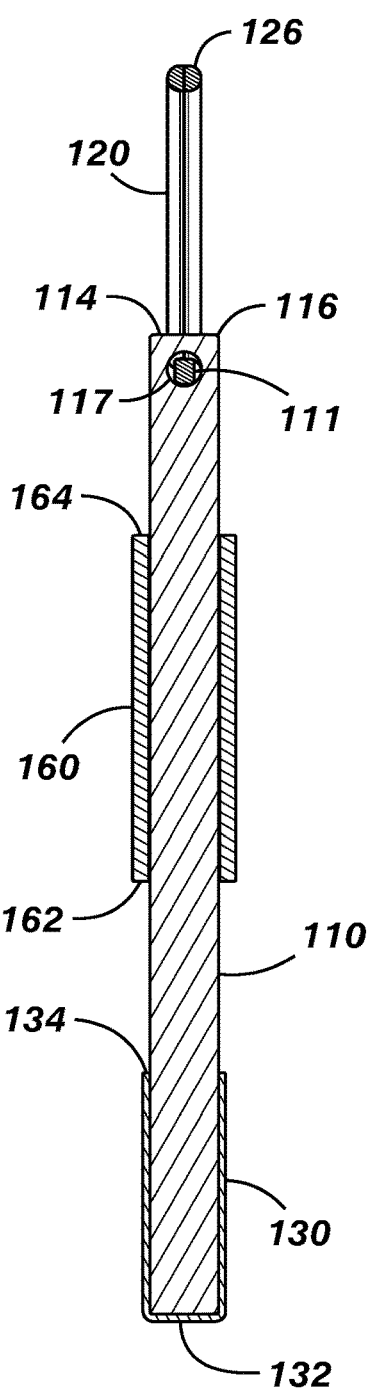
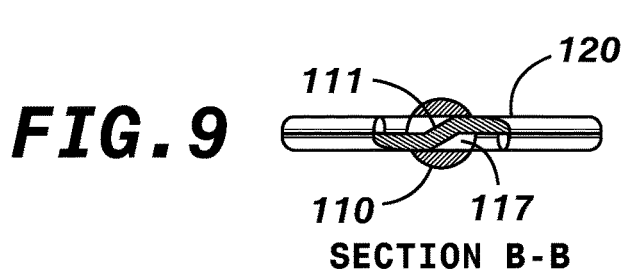

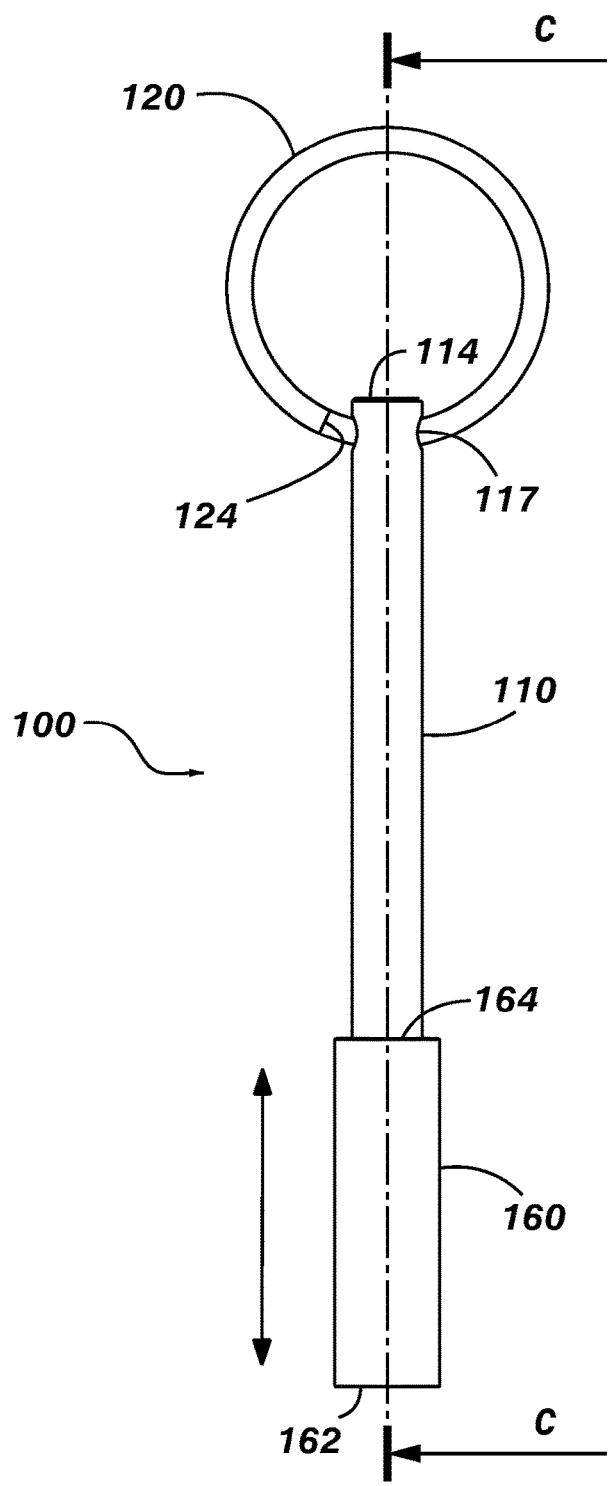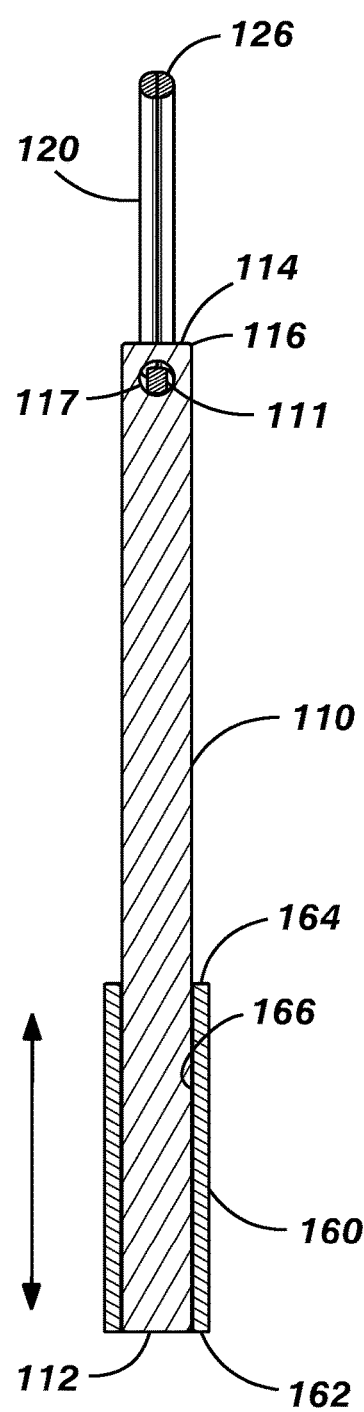
FIG. 11
FIG. 12
SECTION C-C

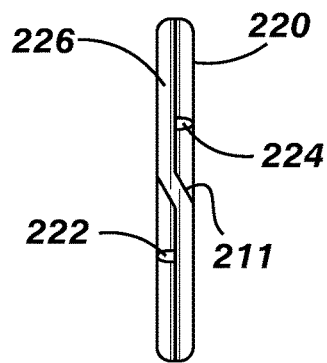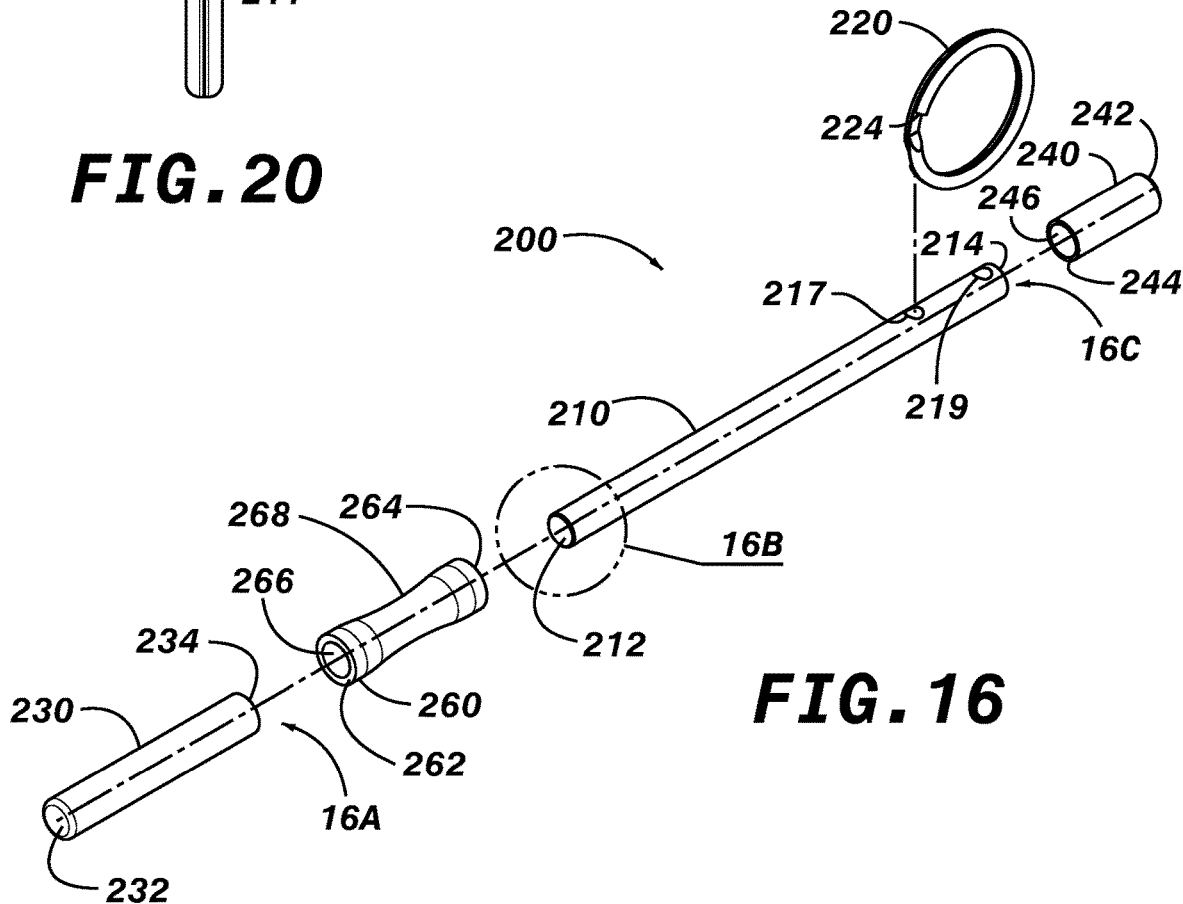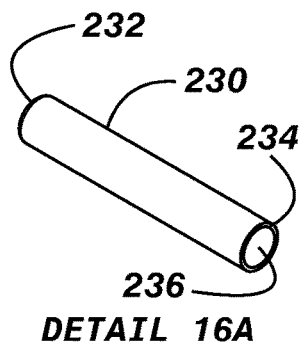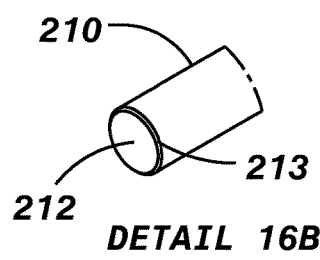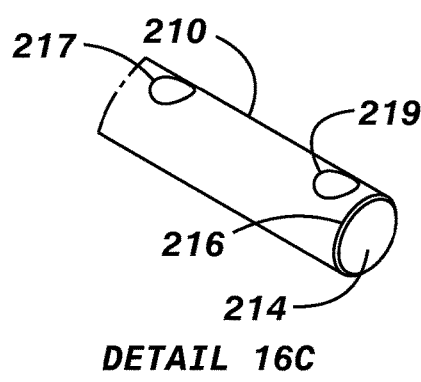
FIG. 20
FIG. 16
FIG. 17  FIG. 18  FIG. 19

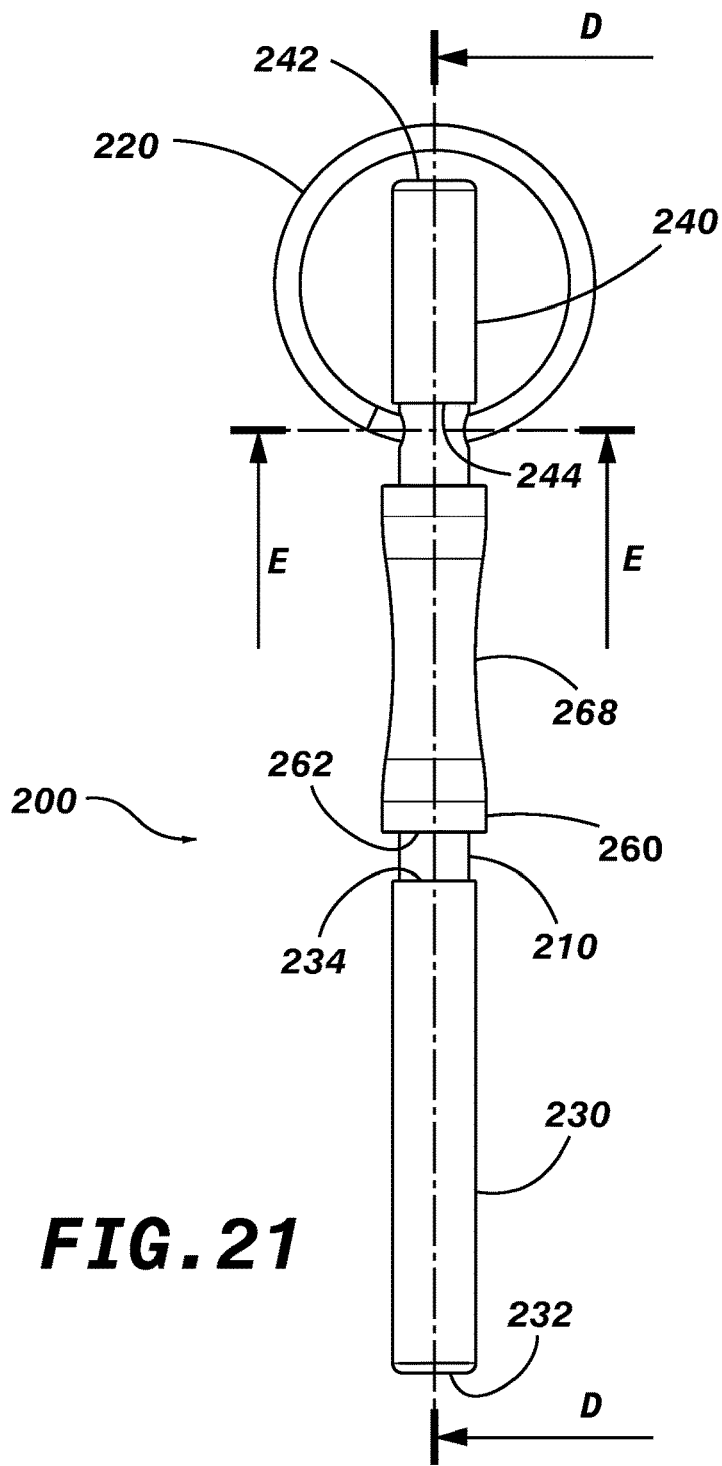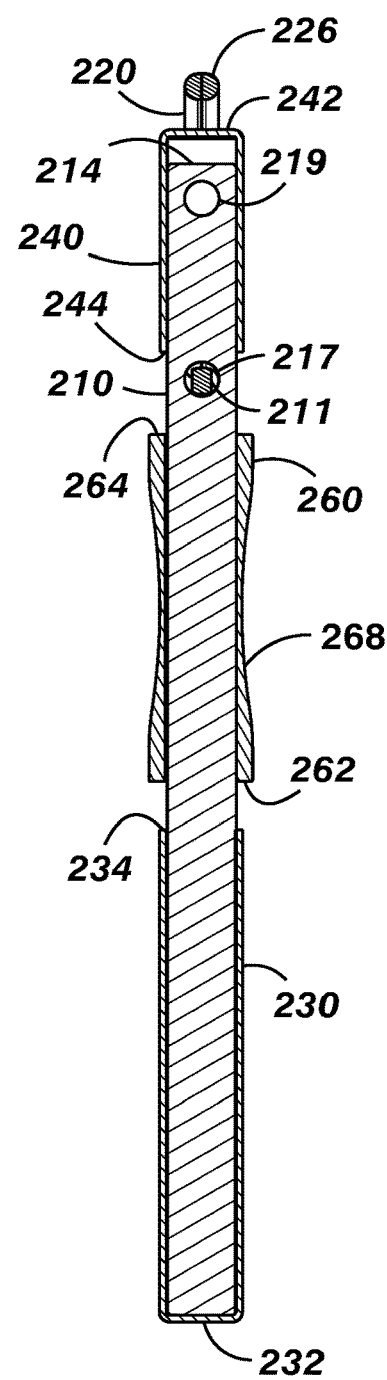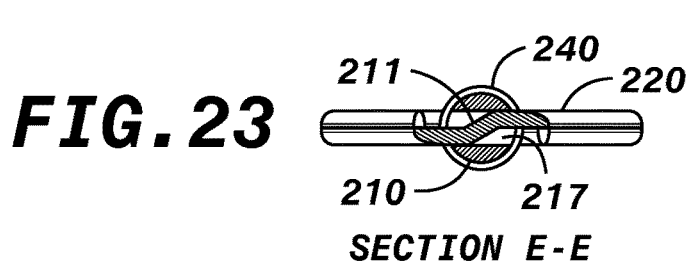
FIG. 21
FIG. 22
FIG. 23

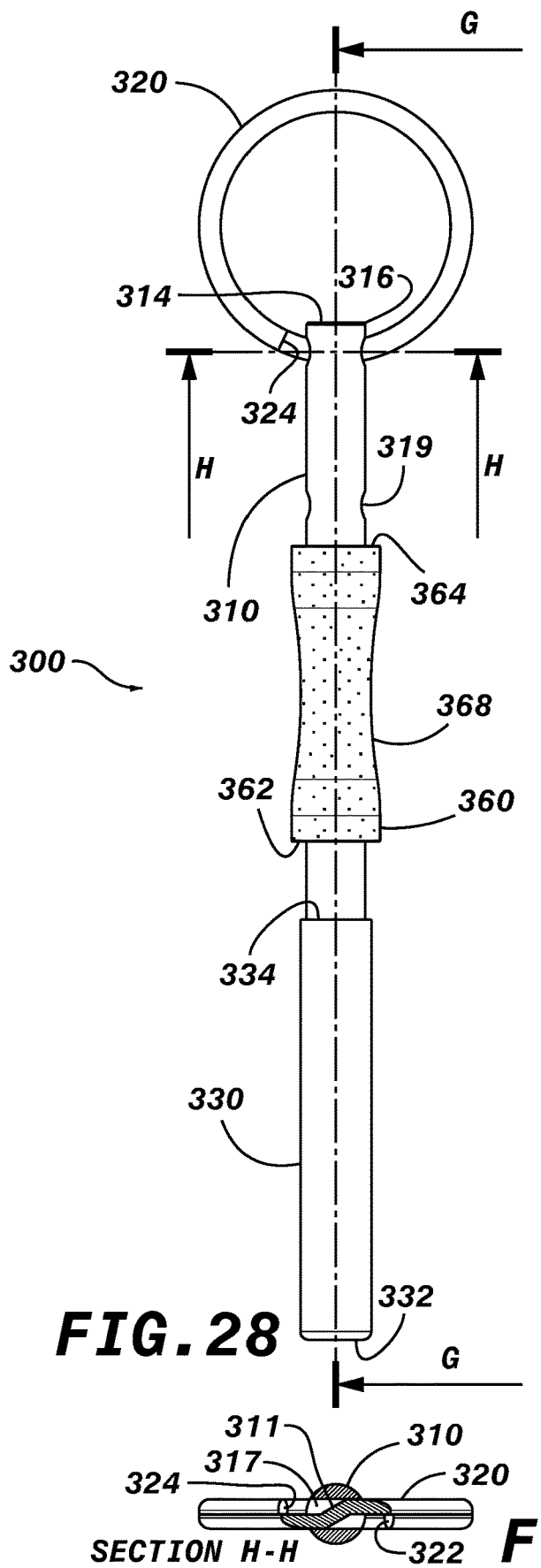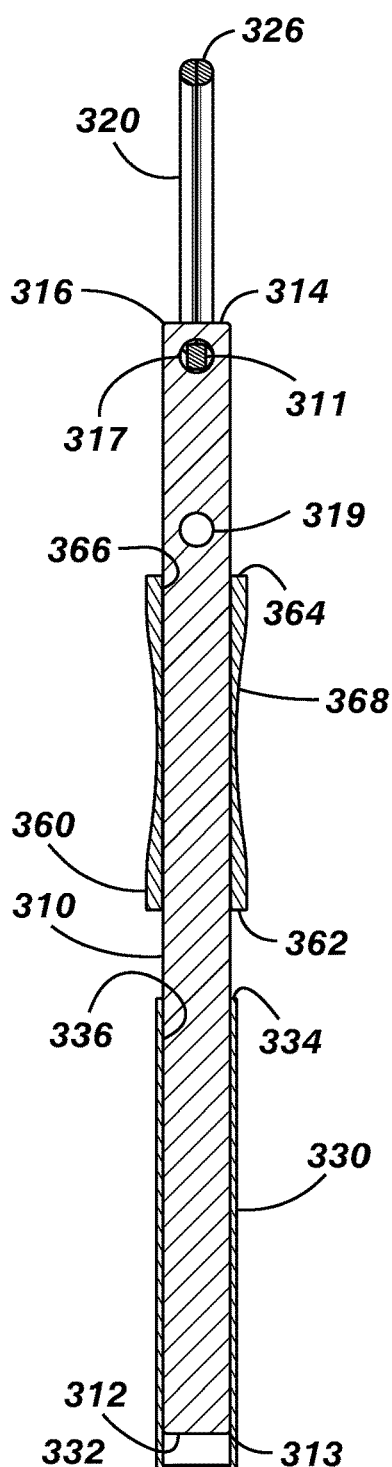
FIG. 28
FIG. 30 SECTION H-H
FIG. 29 SECTION G-G

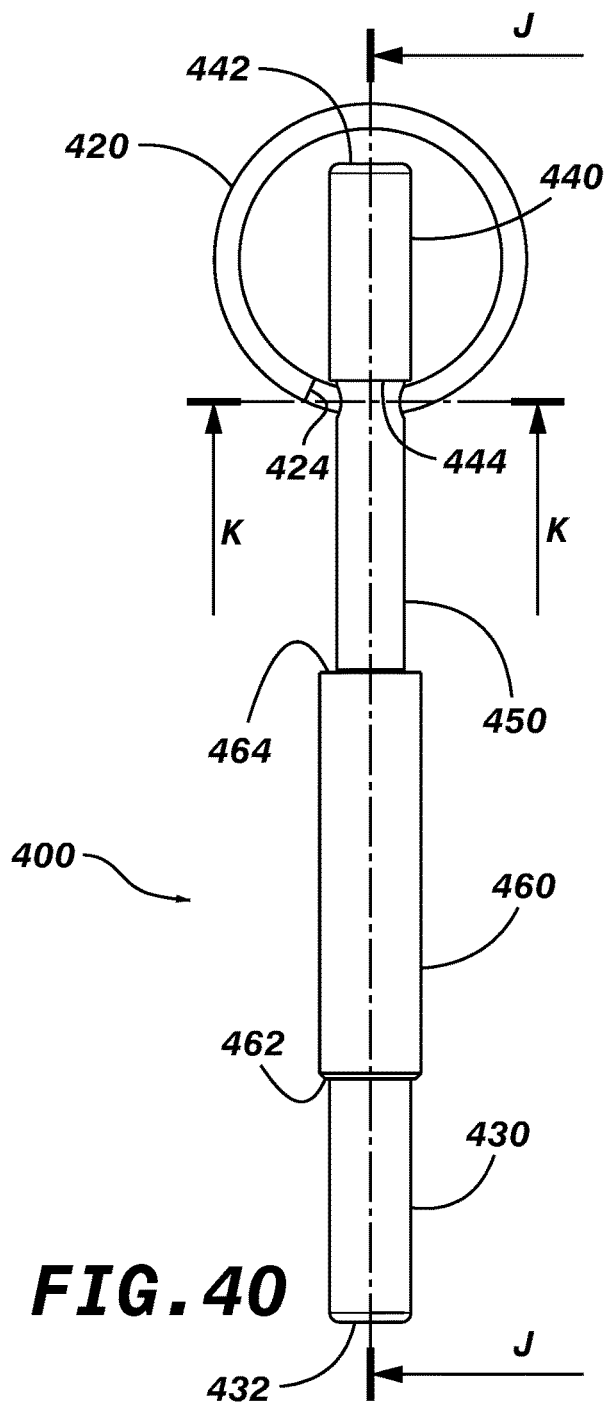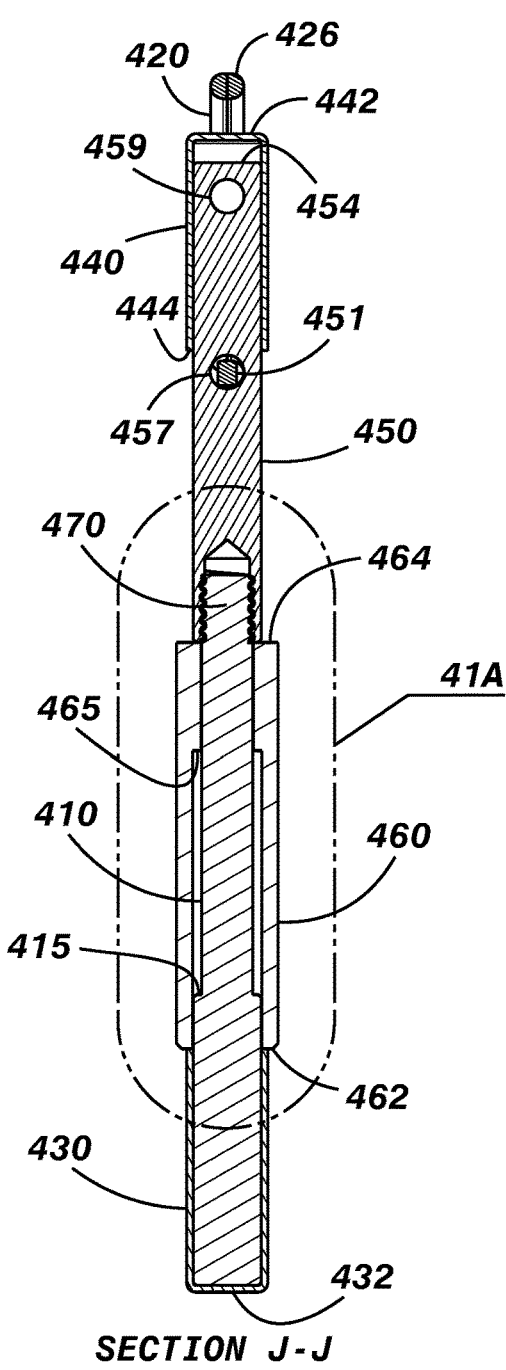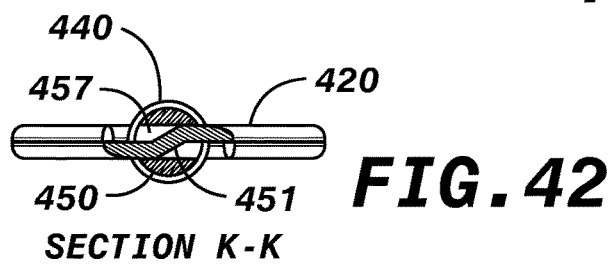

DETAIL 41A

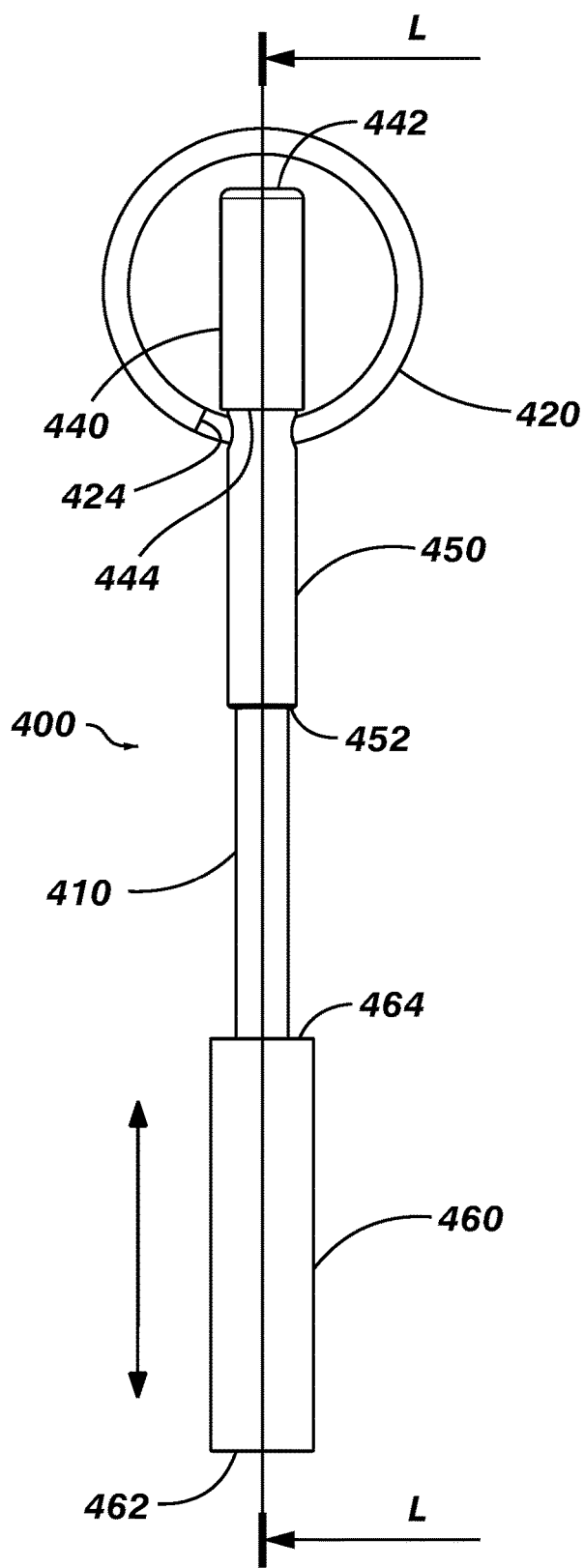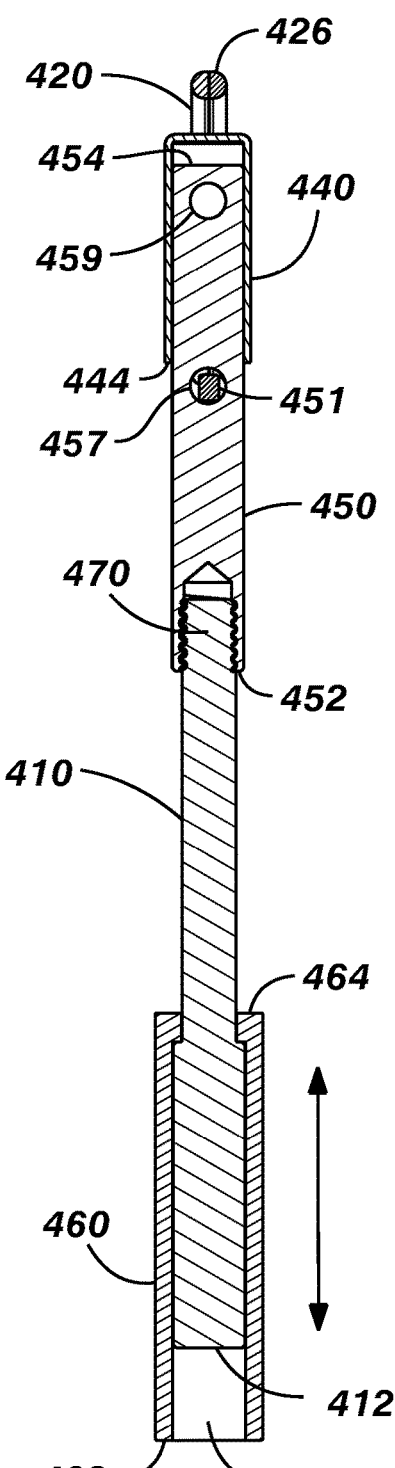
FIG. 46
FIG. 47

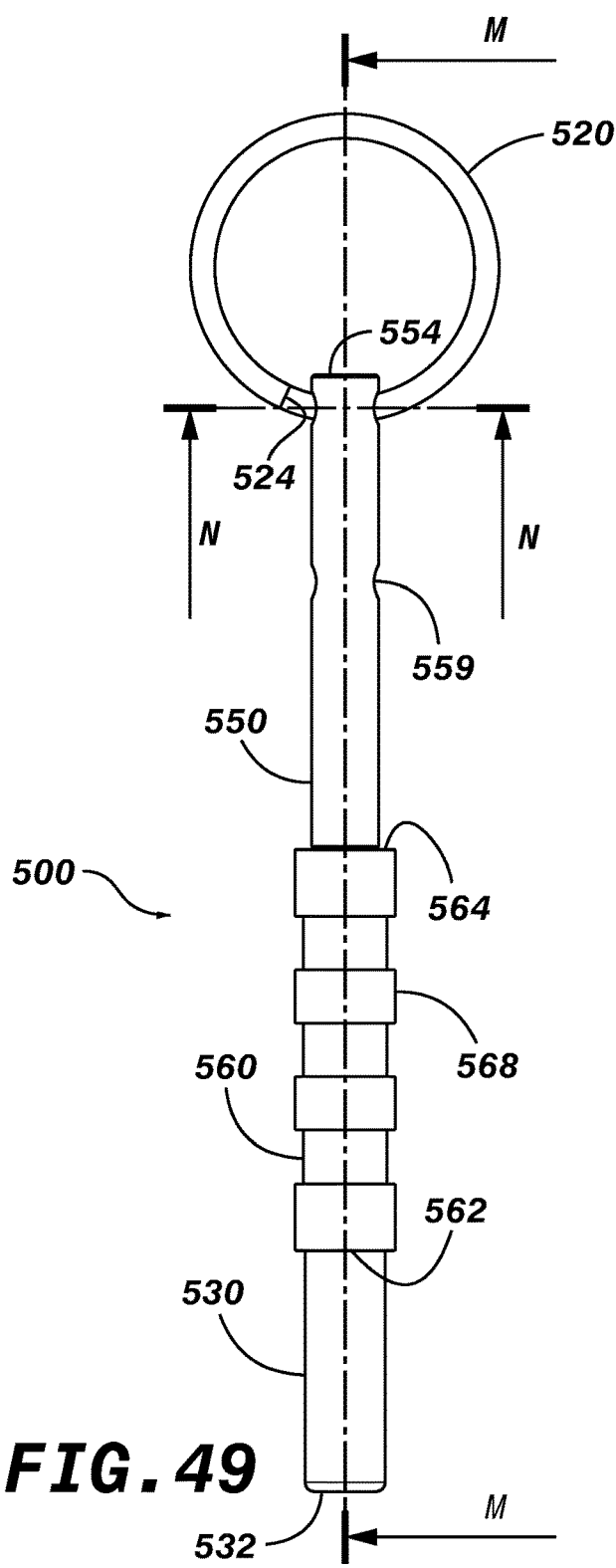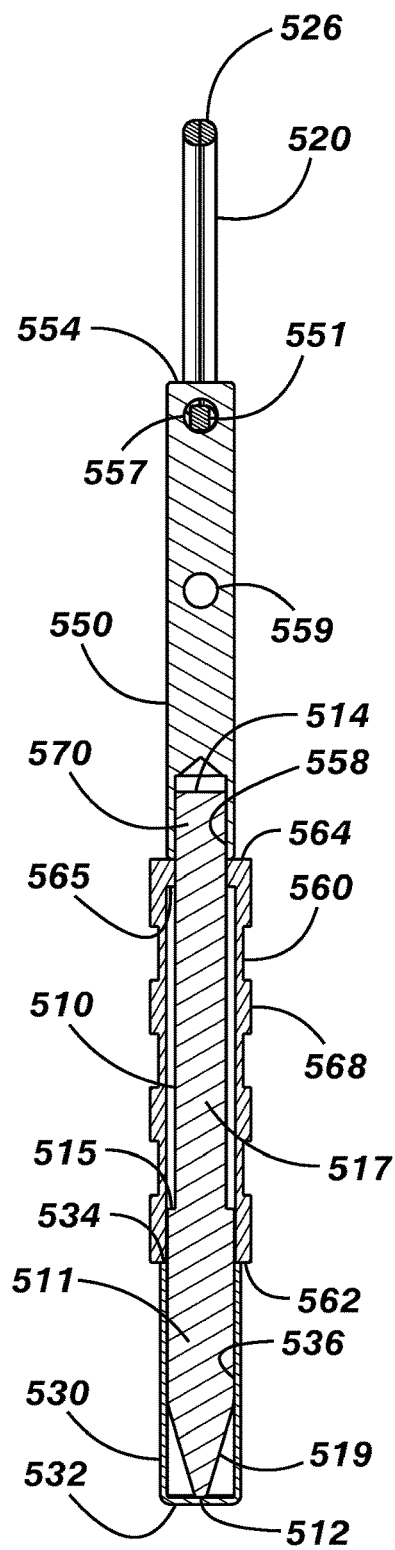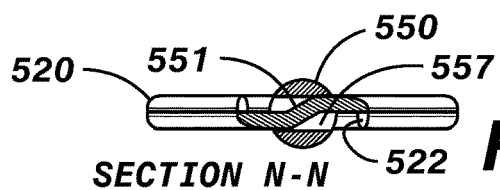
FIG. 49
FIG. 50
SECTION M-M
FIG. 51
SECTION N-N

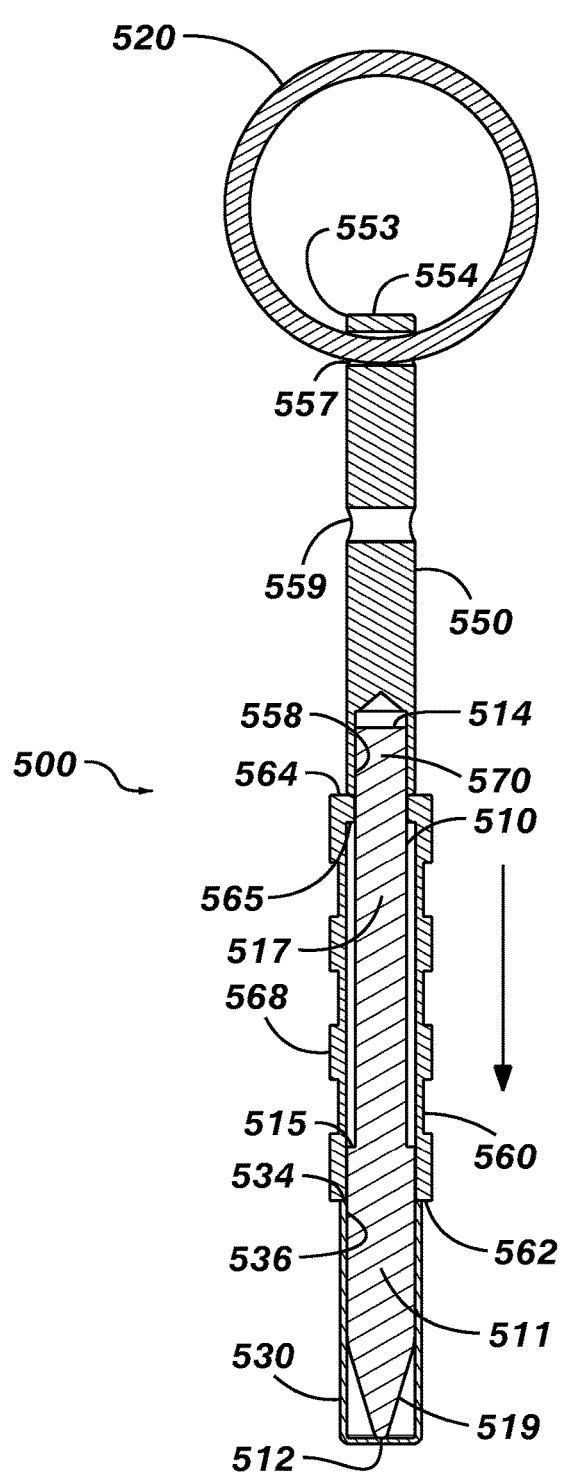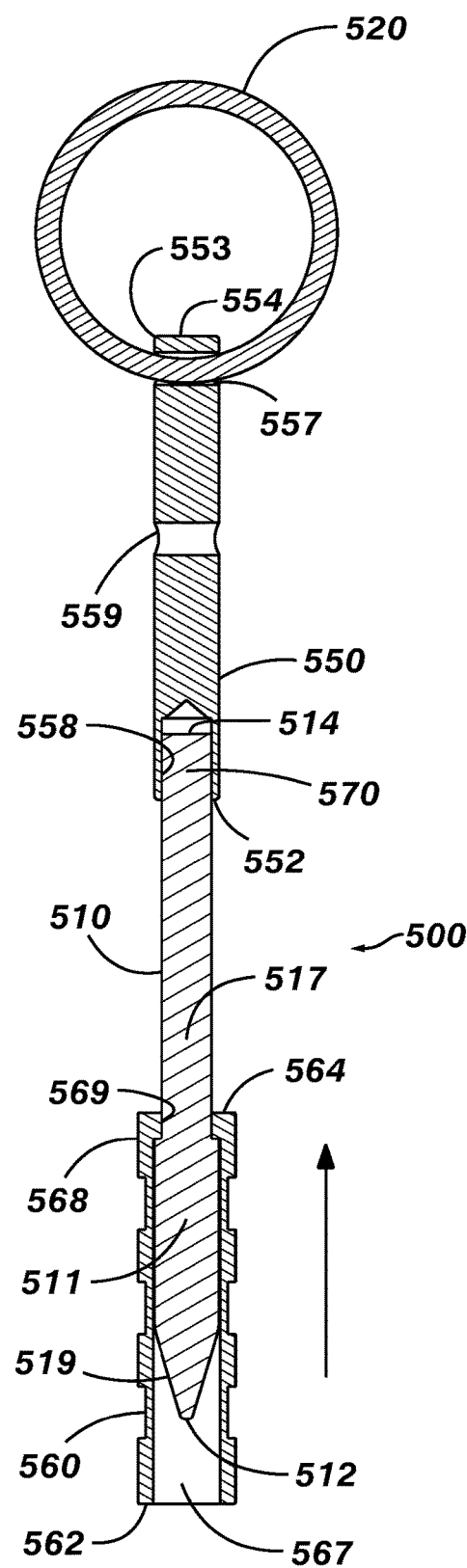
FIG. 52
FIG. 53

DETAIL 55A

DETAIL 55B

DETAIL 55C

SECTION P-P

SECTION R-R

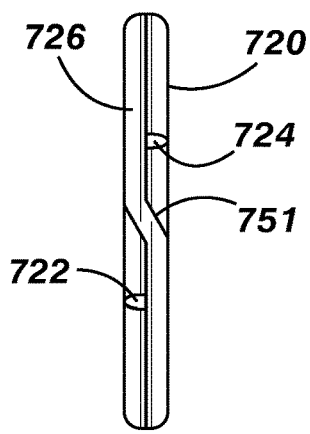
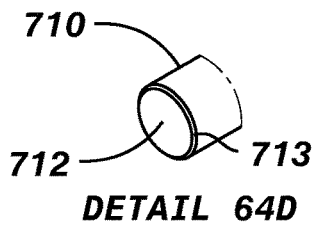
FIG. 68
FIG. 69
FIG. 64
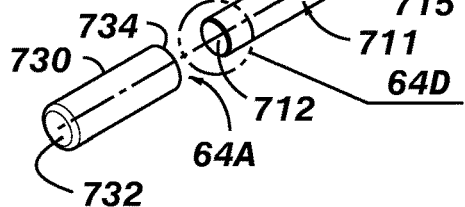
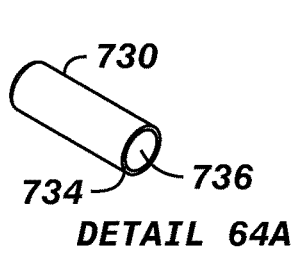
FIG. 65
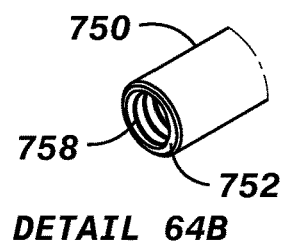
FIG. 66
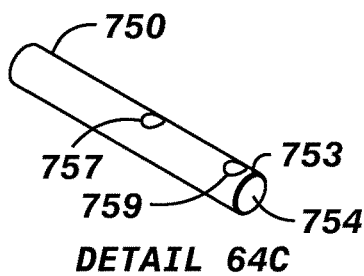
FIG. 67

SECTION S-S

SECTION T-T

DETAIL 71A

DETAIL 77A

DETAIL 77B

DETAIL 77C

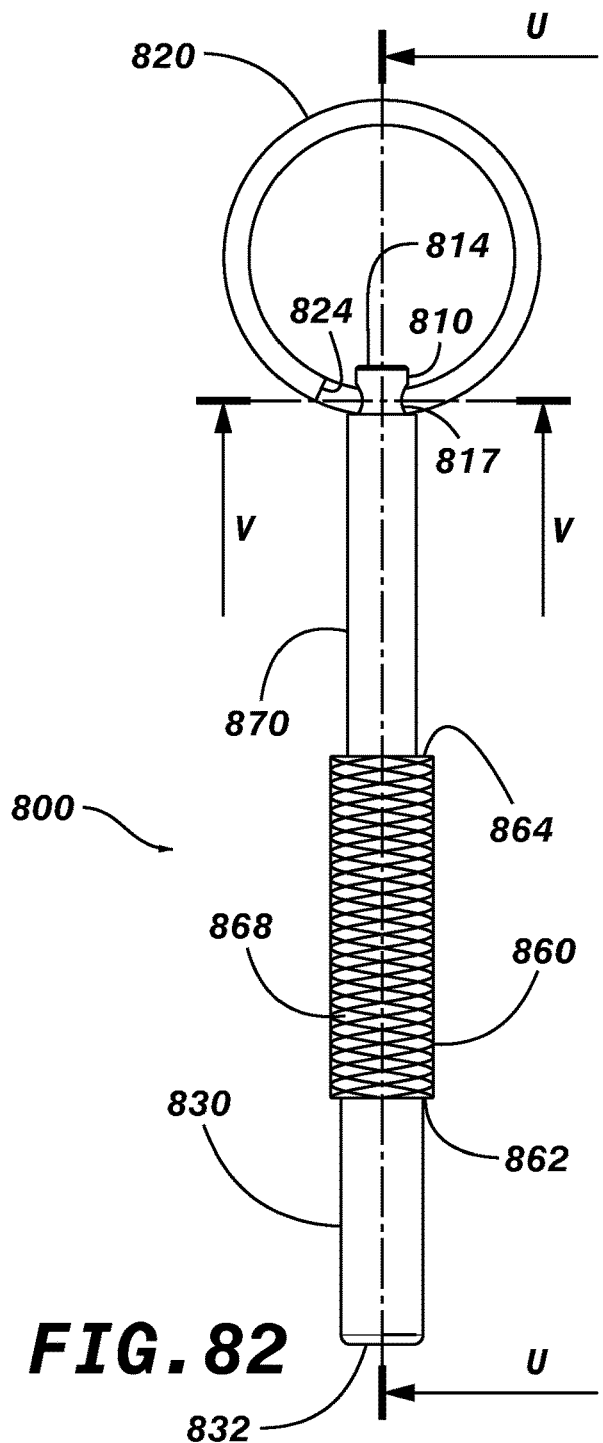
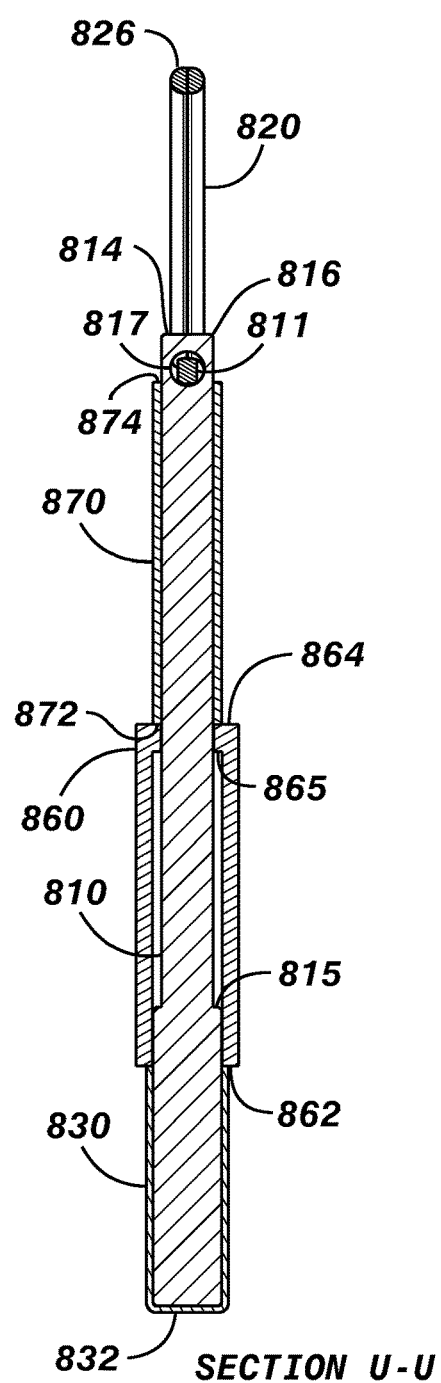
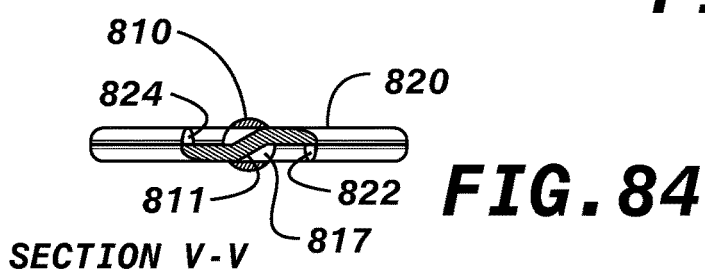

MICROBIAL SURFACE CONTACT MITIGATION STYLUS TOOL

FIELD

The present apparatus is directed to the field of Personal Protective Equipment (PPE), more specifically to hand and finger contact mitigation with contaminated surfaces.

BACKGROUND

The surfaces we touch in our daily routine can be a transmitter of microbes, also called microorganisms, that are tiny living things found all around us and are too small to be seen by the naked eye. The most common types are bacteria, viruses and fungi which along with other pathogens can persist on surfaces for months. The surfaces we touch in our daily routine can be a vector of transmission. The virus that causes COVID-19 can land on surfaces. It's possible for people to become infected if they touch those surfaces and then touch their nose, mouth, or eyes. Some bacteria, including *E. coli* and MRSA, can survive for several months on inanimate surfaces, while infectious yeasts can last for weeks. Like many respiratory viruses, including flu, Covid-19 can be spread in tiny droplets released from the nose and mouth of an infected person as they cough and deposit on nearby surfaces. A single cough can produce up to 3,000 droplets. Contaminated droplets can be produced by others as they talk, cough, sneeze and breathe on door handles, bathroom taps and drinking fountains. Studies show that human coronaviruses such as Severe Acute Respiratory Syndrome (SARS) coronavirus, Middle East Respiratory Syndrome (MERS) coronavirus or endemic human coronaviruses (HCoV) can persist on inanimate surfaces like metal, glass or plastic for up to 9 days, unless they are properly disinfected. Some can even hang around for up to 28 days in low temperatures. The SARS-CoV-2 virus that causes Covid-19 could survive and remain infectious on smooth surfaces including plastic, stainless steel, glass, ceramics and latex gloves for up to seven days. SARS-CoV-2 transmission can occur through direct person-to-person transfer of infectious respiratory droplets, and contact with contaminated surfaces may also play a significant role.

The entire world is currently in the midst of a SARS-CoV-2 pandemic. This virus is highly contagious as evidenced by over 220 million cases as it spread to 192 countries and regions across the globe within a matter of months, and continues to mutate into more contagious and many more deadly variations posing a danger to mankind. Multiple waves of the coronavirus are sweeping the globe. Its magnitude may be a once in a century event that has claimed the lives of more than four and a half million people so far. This virus has killed more people in the United States than did the flu pandemic of 1918. With 2.5 billion people fully vaccinated out of a world population of nearly 8 billion so far, there is an urgent need to devise more efficient preventive measures, to limit the spread of the infection until more successful treatments and longer lasting vaccines can bring about the end of the pandemic. The new preventive measures will depend on the understanding of the transmission routes of this virus and also its persistence on everyday touch surfaces.

It could be some time until an effective vaccine that covers most of the viral mutations can be widely distributed and administered to protect the population of the world. Epidemiologist are increasingly convinced that because of the ease of transmission, new strains, limits on vaccination programs, that Covid-19 is here forever, and will eventually become endemic like other viruses like rabies, HIV and Zika. Elimination or eradication is not a near term likelihood. The only virus that has been entirely eradicated in modern history was smallpox, and polio has been almost eradicated in the world. Smallpox infected only people, while the coronavirus can spread among mammals such as big cats, gorillas, and minks which can reinfect people. Pets like dogs and cats have tested positive for Covid-19. There doesn't seem to be and end in sight yet. A virus that keeps mutating presents a moving target which is difficult to get under control. Therefore, while this pathogen continues to threaten us, we must do whatever may be possible to minimize it's destructiveness.

Various personal protective equipment can be enlisted to mitigate hand and finger contact with contaminated surfaces such as gloves and in particular disposable latex, vinyl and nitrile gloves, additionally disinfectant towels, alcohol wipes and liquid hand sanitizer are frequently used after contacting surfaces. The extensive use of these items can result in people carrying a bulky supply around with them, and producing a large amount of refuse. Capacitive styli can be also be used to lessen contact with capacitive screen devices, and no-touch tools have been in use to lessen contact with objects and surfaces. Some attempted the combination of capacitive functionality and no touch tool in various configurations, however this has not sufficiently addressed the needs of the user owing to some of their awkwardness and fragility.

Some tools can have a replaceable tip, however it is left up to the user to handle the possibly contaminated tip when removing and replacing the used tip. Some other tools have tips that may be too small and may not prevent the body of the tool to come in contact with some contaminated surfaces, and some may lack the ergonomics to provide the proper grip and adequate leverage with the tip to effectively move heavier objects such as doors. Further, some tools may not be sized to activate some capacitive screens, or can be bulky or heavy and may not fit easily or comfortably in a pant pocket. In addition, some tools may have hooks that may be difficult to control and disengage under load, and loose styli and no-touch tools that are not carried on a keyring may be easily misplaced. Many frequently used public surfaces that may require hand and finger contact are potential storehouses of microbes, therefore the general public and to a greater extent humanity, can benefit from the use of an improved apparatus that can mitigate contact with these surfaces.

SUMMARY

The embodiments and aspects described herein relate to an apparatus for electrically interacting with a capacitive device touchscreen, and having rigid components that can effect force transmission and motion to a movable surface with an ejectable tip that is removed from the apparatus with a mechanism that mitigates user contact with the tip. It is the objectives of the present invention is to obviate the disadvantages of some styli and no-touch tools, and to present an apparatus that overcomes some of their limitations. It is also the objectives of the present invention to provide a stylus tool with the actuating means that enables the user to readily dispose of the used tip without having to touch it. Further, it is the objective of this invention to provide a structurally sound stylus that can be operated by applying force to movable surfaces utilizing the hand and fingers grasping the stylus in a manner that engages surfaces without compromising the strength of the hand and finger joints, and can allow for efficient force transfer between stylus and surface. It is a still further objective of the present apparatus to provide an electrically conductive path from the user's hand to communicate with a capacitive touchscreen device allowing use with both capacitive and resistive touchscreens, with both right and left hands. It is the aim of the apparatus to provide personal protection advantages such as mitigating hand contact with microbial surfaces with an ejectable and discardable tip and providing mechanical advantage with excellent portability. These objectives of the present invention are achieved by providing a slim ergonomic lightweight stylus tool designed for ease of carrying, coupled with ease of use. Consequently although the current pressing need is for to mitigate the spread of coronavirus, this apparatus can also be useful to mitigate contact with surfaces containing other microbes and pernicious substances.

Hand protection and hygiene has mostly been through the use of gloves, liquid hand sanitizers and disinfecting wipes. Latex gloves are frequently used by healthcare personnel, and the stylus tool may be used in conjunction with, and over the latex gloved fingers, and may be used to interface with biomedical electronics, equipment, instruments and displays, patient-monitoring displays, EKG monitors, digital respirometer and various hospital room and ward surfaces, reserving touching the patient with clean gloves, further mitigating the possible spread of infection or illness.

In the general public arena the frequent use of and discarding of latex, vinyl and nitrile gloves, can produce a large quantity of refuse. Frequently, only a finger needs to be protected in contacting a surface and the use of disposable gloves can be wasteful. The stylus tool may be used with a wide variety of public capacitive device surfaces that may contain microbes, such as ATMs, supermarket payment and checkout terminals, drive-through and inside banking terminals, mall kiosks, vending machines, airline check-in terminals, smartphones, computer screens, human-machine interfaces; grocery store checkout and restaurant table payment, computers with keyboards, mobile devices, laptops, cellphones and tablets. The stylus tool may also be used with a wide variety of movable public surfaces such as drinking fountain push buttons, entrance and exit door handles, door locks, elevator doors and buttons, hygiene fixtures such as toilet flushing handles, water faucets, paper towel dispensers, air dryers, gas pumps, thrash lids, communal workplace items such as microwaves, refrigerators and security checkpoints that may have been touched by other people. Hand protection has mostly been through the use of gloves, and hand sanitizers. However, latex gloves have caused allergic reactions in some individuals and may not be appropriate for all. Negating the use thereof. people trying to open doors with their elbows, feet Hand protection has mostly been through the use of gloves, and liquid hand sanitizers and sanitizer wipes.

Some exemplary embodiments of the disclosure provide a portable multipurpose microbial surface contact mitigation stylus tool to mount on a finger and grasped by a user to mitigate hand contact with surfaces and to electrically interact with a capacitive device touchscreen; and the rigid stylus tool effecting force transmission and motion to a movable surface, the stylus tool comprising: at least an elongated stem having a proximal end and a distal end further comprising at least a transverse first aperture proximate to the proximal end; and wherein the first aperture supports a removably and pivotably docked ring comprising a fulcrum of a third class lever; and at least a compliant first cap comprising a closed end and an open end with an orifice, removably coupled with the elongated stem; and a means for ejection of removably separating the first cap from the elongated stem; and wherein the means for ejection includes an actuator that communicates with the elongated stem by axially sliding thereon.

In some exemplary embodiments of the disclosure the elongated stem increased in length includes a transverse second aperture, and the elongated stem having a distal end and a proximal end and a transverse second aperture in between the transverse first aperture and the proximal end; and wherein the compliant first cap is coupled to the elongated stem by the orifice sliding over the distal end thereof; and including a compliant second cap having a closed end and an open end with an orifice; the compliant second cap is removably coupled with the elongated stem, the orifice sliding over the proximal end and the transverse second aperture thereof, wherein the means for ejection includes the actuator having an ergonomic substantially arcuate outer surface.

In some other exemplary embodiments of the disclosure the elongated stem further increased in length can further comprise a distal end, and a proximal end and the transverse second aperture in between the transverse first aperture and the distal end; and wherein the compliant first cap is coupled with the elongated stem via the orifice sliding over the distal end thereof; and wherein the means for ejection includes the actuator comprising an ergonomic substantially arcuate textured outer surface.

In some additional exemplary embodiments of the disclosure the stem is further comprised two shafts; a bottom shaft and a top shaft and a means for securing together; and wherein the bottom shaft is comprised a lower section proximate a distal end and an upper section of lesser diameter than the lower section proximate a first attach end; and the two adjacent sections faired with a bottom shaft transition; and wherein the top shaft is comprised a second attach end and a proximal end and further comprising the transverse first aperture, and the transverse second aperture; and wherein the first attach end is connected to the second attach end at a shaft assembly junction; and wherein the compliant first cap is coupled with the bottom shaft via the orifice sliding over the distal end thereof; and wherein the means for ejection includes the actuator comprising an anterior end and a posterior end, comprises at least two bores; an anterior bore proximate the anterior end and a posterior bore proximate the posterior end, and the two adjacent bores connected by an actuator bore transition; and wherein the actuator is confined by the assembly of the bottom shaft and the top shaft at the shaft assembly junction, and communicates slidably and concurrently with the bottom shaft lower section and bottom shaft upper section; and wherein the actuator range of motion enfolded by the contact of the bottom shaft transition and the actuator bore transition as the forward extent, and the contact of the actuator posterior end and the top shaft second attach end as the backward extent; and wherein the top shaft comprises the transverse second aperture in between the first transverse aperture and the proximal end; and further comprising a compliant second cap having a closed end, and an open end with an orifice; the compliant second cap removably coupled with the top shaft via the orifice sliding over the proximal end and the second aperture of the top shaft.

In some more exemplary embodiments the of the disclosure top shaft comprises the transverse first aperture in between the transverse second aperture and the proximal end; and wherein the means for securing together includes the bottom shaft first attach end secured into a bore in the second attach end of the upper shaft; and wherein the means for ejection includes the actuator having an ergonomic ribbed outer surface, In some more exemplary embodiments of the disclosure the elongated stem having a bottom stem portion proximate a distal end; and a top stem portion of lesser diameter than the bottom stem portion proximate the proximal end; and a stem transition connecting the two portions; and wherein the compliant first cap is coupled with the bottom stem portion via the orifice sliding over the distal end thereof; and further comprising a retainer having an internal passage, and a front end and a back end, the retainer removably and axially docked with the top stem portion in between the actuator posterior end and the first aperture; and wherein the means for ejection includes the actuator having an ergonomic textured exterior surface; and having a posterior bore proximate a posterior end and an anterior bore proximate an anterior end; and the two bores joined by an actuator bore transition; and the actuator communicating slidably and concurrently with the bottom stem portion and the top stem portion; and the range of motion of the actuator enfolded by the contact of the stem transition and the actuator bore transition as the forward extent, and the contact of the actuator posterior end and the retainer front end as the aft extent.

In some further exemplary embodiments of the disclosure provide a multipurpose microbial surface contact mitigation stylus tool to mount on a finger and grasped by a user to mitigate hand contact with surfaces and to electrically interact with a capacitive device touchscreen; and the rigid stylus tool effecting force transmission and motion to a movable surface, the stylus tool comprising: a bottom shaft and a top shaft and a means for securing together; wherein the bottom shaft is comprised a lower section proximate a distal end and an upper section of lesser diameter than the lower section proximate a first attach end; and the two adjacent sections faired with a bottom shaft transition; and wherein the top shaft is comprised a second attach end and a proximal end, and further comprising a transverse first aperture and a transverse second aperture that is between the transverse first aperture and the proximal end; and wherein the transverse first attach end is connected to the second attach end at a shaft assembly junction; and wherein the first aperture supports a removably and pivotably docked split key ring comprising a fulcrum of a third class lever; and wherein a compliant first cap comprising a closed end and an open end with an orifice that is removably coupled with the bottom stem surface via the orifice sliding over the distal end thereof; and further comprising a compliant second cap having a closed end, and an open end with an orifice; the compliant second cap removably coupled with the top shaft via the orifice sliding over the proximal end and the second aperture of the top shaft; and a means for ejection of removably separating the compliant first cap from the bottom shaft; and self-aligning means for activating a capacitive device screen.

In some still further exemplary embodiments of the disclosure provide a multipurpose microbial surface contact mitigation stylus tool to mount on a finger and grasped by a user to mitigate hand contact with surfaces and to electrically interact with a capacitive device touchscreen; and the rigid stylus tool effecting force transmission and motion to a movable surface, the stylus tool comprising: an elongated stem having a proximal end and a distal end; and wherein the elongated stem having a bottom stem portion proximate a distal end; and a top stem portion of lesser diameter than the bottom stem portion proximate the proximal end; and a stem transition connecting the two portions; and further comprising a transverse aperture proximate to the proximal end; and wherein the transverse aperture supports a removably and pivotably docked key ring comprising a fulcrum of a third class lever; and a compliant cap comprising an open end with an orifice, and a closed end removably coupled with the bottom stem portion via the orifice sliding over the distal end thereof; and further comprising a retainer having an internal passage, and a front end and a back end, the retainer removably and axially docked with the top stem portion in between the actuator posterior end and the transverse aperture; and a means for ejection of removably separating the compliant cap from the bottom stem portion; and self-aligning means for activating a capacitive device screen.

The stylus tool can provide personal protection advantages such as mitigating hand contact with microbial surfaces, interacting with capacitive touchscreens with an ejectable and replaceable tip and providing mechanical advantage for movement of surfaces, and allowing excellent portability.

BRIEF DESCRIPTION OF THE DRAWINGS

The disclosure will be readily understood by the following detailed description in conjunction with the accompanying drawings, wherein like reference numerals designate like structural elements.

FIG. 7 is a plan view of the stylus tool according to some exemplary embodiments of the present disclosure.

FIG. 8 is an axial cross-sectional view of Section A-A in FIG. 7 of the stylus tool according to some exemplary embodiments of the present disclosure.

FIG. 9 is a cross-sectional view of Section B-B in FIG. 7 through the centerline of the first aperture and fulcrum of the stylus tool according to some exemplary embodiments of the present disclosure.

FIG. 11 is a plan view of the activated actuator after ejection of the first cap from the stem of the stylus tool according to some exemplary embodiments of the present disclosure.

FIG. 12 is a cross-sectional view C-C of FIG. 11 of the activated actuator after ejection of the first cap of the stylus tool according to some exemplary embodiments of the present disclosure.

FIG. 16 is a perspective deconstructed view of the stylus tool according to some exemplary embodiments of the present disclosure.

FIG. 17 is a detail view 16A of FIG. 16, of the elongated first cap of the stylus tool according to some exemplary embodiments of the present disclosure.

FIG. 18 is a detail view 16B of FIG. 16, of the distal end of the elongated stem of the stylus tool according to some exemplary embodiments of the present disclosure.

FIG. 19 is a detail view 16C of FIG. 16, of the proximal end of the elongated stem of the stylus tool according to some exemplary embodiments of the present disclosure.

FIG. 20 is a side view of the split key ring of the stylus tool according to some exemplary embodiments of the present disclosure.

FIG. 21 is a plan view of the stylus tool according to some exemplary embodiments of the present disclosure.

FIG. 22 is an axial cross-sectional view D-D of FIG. 21 of the stylus tool according to some exemplary embodiments of the present disclosure.

FIG. 23 is a cross-sectional view E-E of FIG. 21 through the centerline of the first aperture and fulcrum of the stylus tool according to some exemplary second embodiments of the present disclosure.

FIG. 28 is a plan view of the stylus tool according to some exemplary embodiments of the present disclosure.

FIG. 29 is an axial cross-sectional view G-G of FIG. 28 of the stylus tool according to some exemplary embodiments of the present disclosure.

FIG. 30 is a cross-sectional view H-H of FIG. 28 through the centerline of the first aperture and fulcrum of the stylus tool according to some exemplary embodiments of the present disclosure.

FIG. 40 is a side view of the stylus tool according to some exemplary embodiment of the present disclosure.

FIG. 41 is an axial cross-sectional view J-J of FIG. 40 of the stylus tool according to some exemplary embodiments of the present disclosure.

FIG. 42 is a cross-sectional view K-K of FIG. 40 through the centerline of the first aperture and fulcrum of the stylus tool according to some exemplary embodiments of the present disclosure.

FIG. 46 is a plan view of the activated captive actuator after ejection of the primary cap from the lower stem of the stylus tool according to some exemplary embodiments of the present disclosure.

FIG. 47 is an axial cross-sectional view L-L of FIG. 46 of the activated actuator after ejection of the primary cap from the lower stem of the stylus tool according to some exemplary embodiments of the present disclosure.

FIG. 49 is a plan view of the stylus tool according to some exemplary embodiments of the present disclosure.

FIG. 50 is an axial cross-sectional view M-M of FIG. 49 of the stylus tool according to some exemplary embodiments of the present disclosure.

FIG. 51 is a cross-sectional view N-N of FIG. 49 through the centerline of the first aperture and fulcrum of the stylus tool according to some exemplary embodiments of the present disclosure.

FIG. 52 is an axial cross-sectional view of the stylus tool and the retracted captive actuator after ejection of the first cap from the lower stem of the according to some exemplary embodiments of the present disclosure.

FIG. 53 is an axial cross-sectional view of the stylus tool and the activated captive actuator after ejection of the first cap from the lower stem of the according to some exemplary embodiments of the present disclosure.

FIG. 64 is a perspective deconstructed view of the stylus tool according to some exemplary embodiments of the present disclosure.

FIG. 65 is a detail view 64A FIG. 64, of the first cap of the stylus tool according to some exemplary embodiments of the present disclosure.

FIG. 66 is a detail view 64B FIG. 64, of the upper attach end of the upper stem of the stylus tool according to some exemplary embodiments of the present disclosure.

FIG. 67 is a detail view 64C FIG. 64, of the proximal end of the upper stem of the stylus tool according to some exemplary embodiments of the present disclosure.

FIG. 68 is an end view of the split ring of the stylus tool according to some exemplary embodiments of the present disclosure.

FIG. 69 is a detail view 64D FIG. 64, of the distal end of the lower stem of the stylus tool according to some exemplary embodiments of the present disclosure.

FIG. 82 is a plan view of the stylus tool according to some exemplary embodiments of the present disclosure.

FIG. 83 is an axial cross-sectional view U-U of FIG. 82 of the stylus tool according to some exemplary embodiments of the present disclosure.

FIG. 84 is a cross-sectional view V-V of FIG. 82 through the centerline of the first aperture and fulcrum of the stylus tool according to some exemplary embodiments of the present disclosure.

The drawings constitute a part of this specification and include exemplary embodiments in various forms. A greater understanding of the embodiments of the present disclosure may be obtained by the subsequent detailed description and associated drawings.

DETAILED DESCRIPTION

The embodiments and aspects described herein relate to an ergonomic finger-mounted and hand-held personal protection, surface microbe contact mitigation stylus tool for performing force transmission for actuation of movable surfaces and for contacting touch based capacitive and resistive input devices, includes a rotationally locking keyring, a rigid stem and a disposable tip, wherein the tip can be ejected by the manual operation of an ergonomic actuator mitigating finger or hand contact with replaceable (or reuseable when sanitized) tip after intended use that can be conveniently carried as a utilitarian keyring.

The apparatus "Microbial surface contact mitigation stylus tool," may alternatively and interchangeably be referred to as "stylus tool." Before several illustrative embodiments of the stylus tool are presented, it is to be acknowledged that these illustrative embodiments are not bounded by the detailed descriptions set forth in the description and the drawings, and may be configured as numerous similar embodiments, combining features, construction or any other aspects that do not depart from the spirit of the invention. It is also to be acknowledged that the terms that may appear herein such as "first," "second," "third", "top," "bottom," "anterior," "posterior," "front," "back," "forward," "backward," "extended," "retracted," "activated" and a combination thereof; do not by themselves indicate a specific relationship, quantity, significance unless it can be reasonably inferred from the context and in conjunction with the aforementioned drawings. Throughout the specification and claims, the term "comprise," "comprising," "comprised" and variation thereof are to be interpreted as "including, but not limited to."

Figure 1:
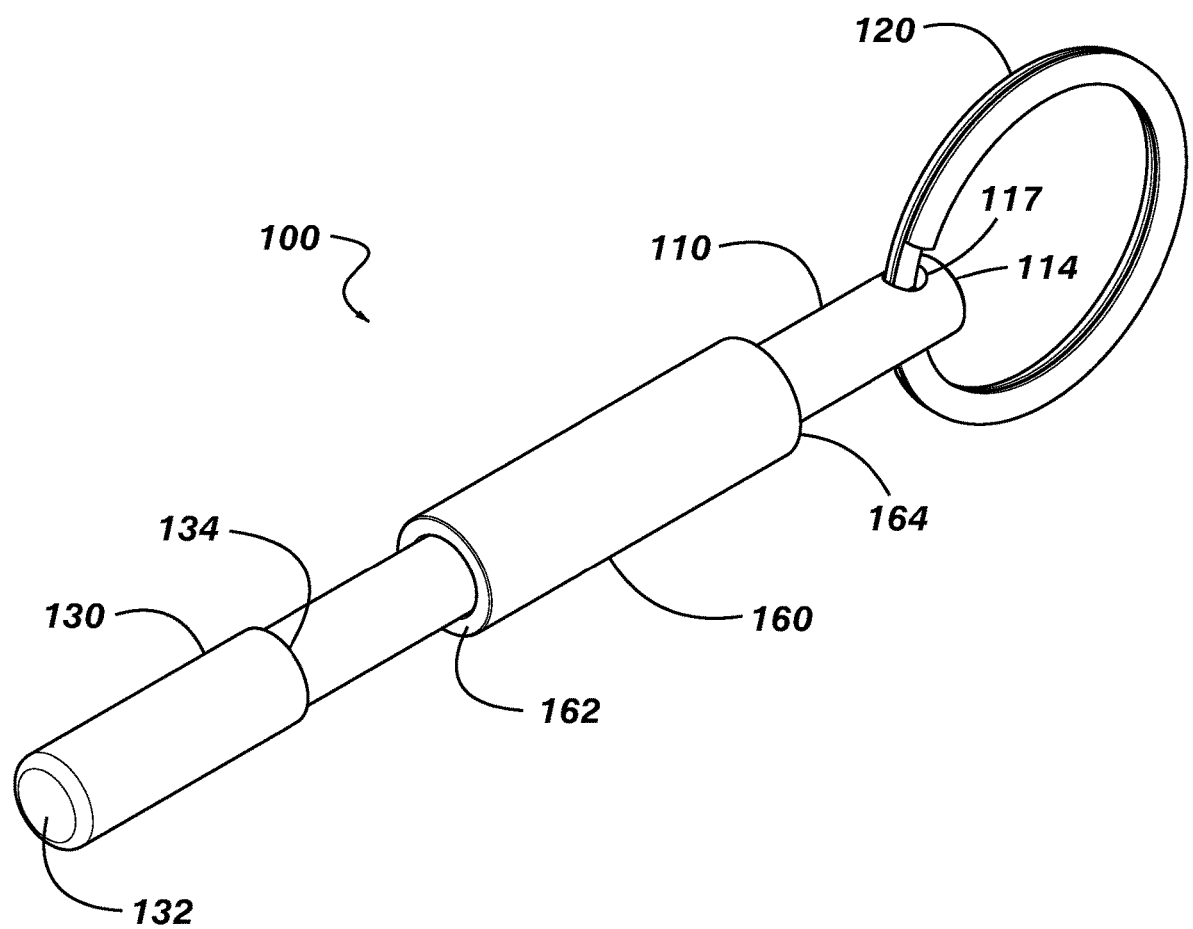
FIG. 1 is a perspective view of the stylus tool according to some exemplary embodiments of the present disclosure.
Figure 6:
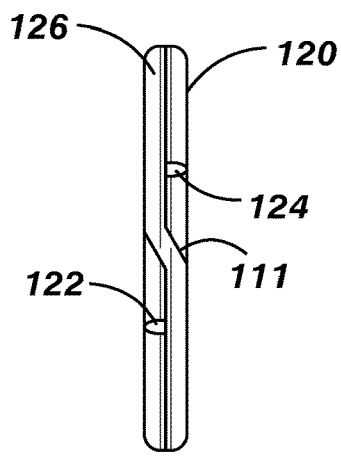
FIG. 6 is a side view of the split key ring of the stylus tool according to some exemplary embodiments of the present disclosure.
Figure 2:
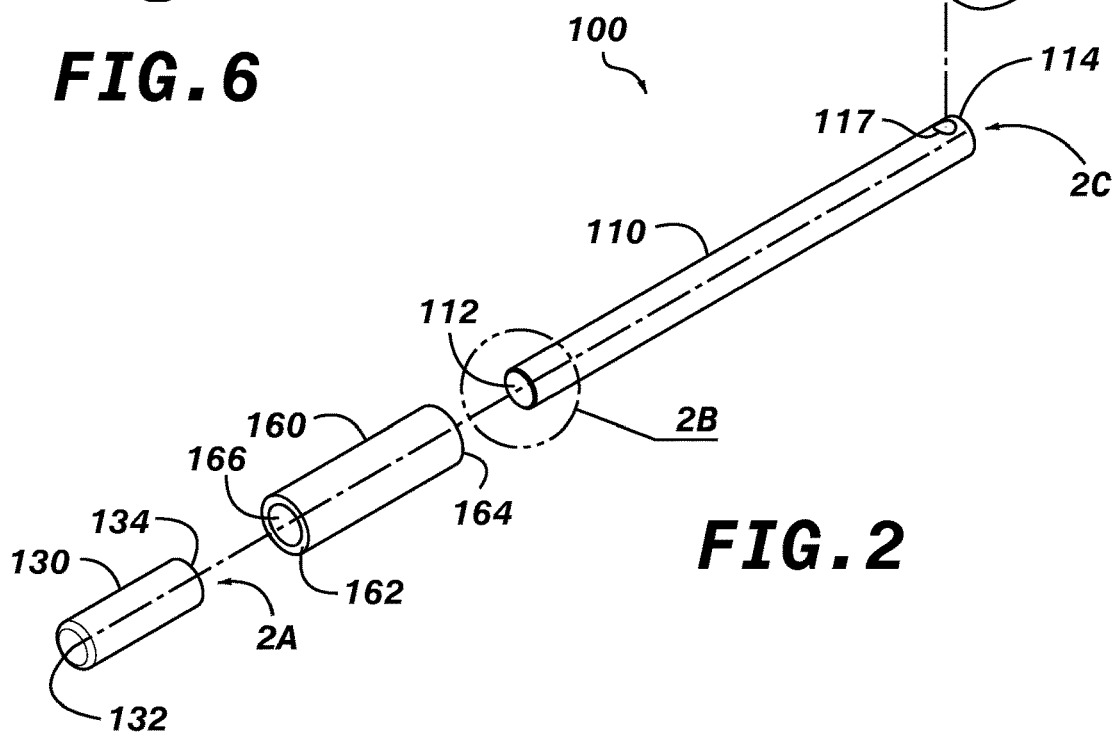
FIG. 2 is a perspective deconstructed view of the stylus tool according to some the exemplary embodiments of the present disclosure.
Figure 3:
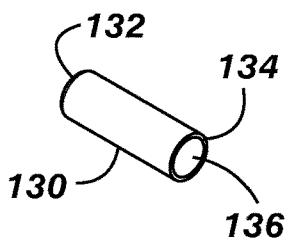
FIG. 3 is a detail view 2A of FIG. 2, of the first cap of the stylus tool according to some exemplary embodiments of the present disclosure.
Figure 4:
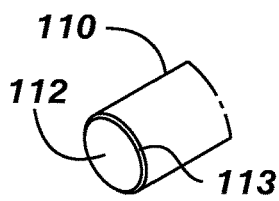
FIG. 4 is a detail view 2B of FIG. 2, of the distal end of the stem of the stylus tool according to some exemplary embodiments of the present disclosure.
Figure 5:
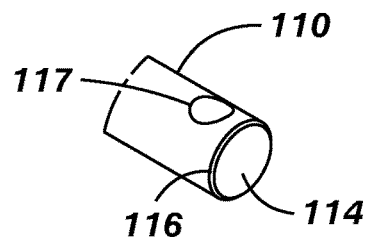
FIG. 5 is a detail view 2C of FIG. 2, of the proximal end of the stem of the stylus tool according to some exemplary embodiments of the present disclosure.
Figure 10:
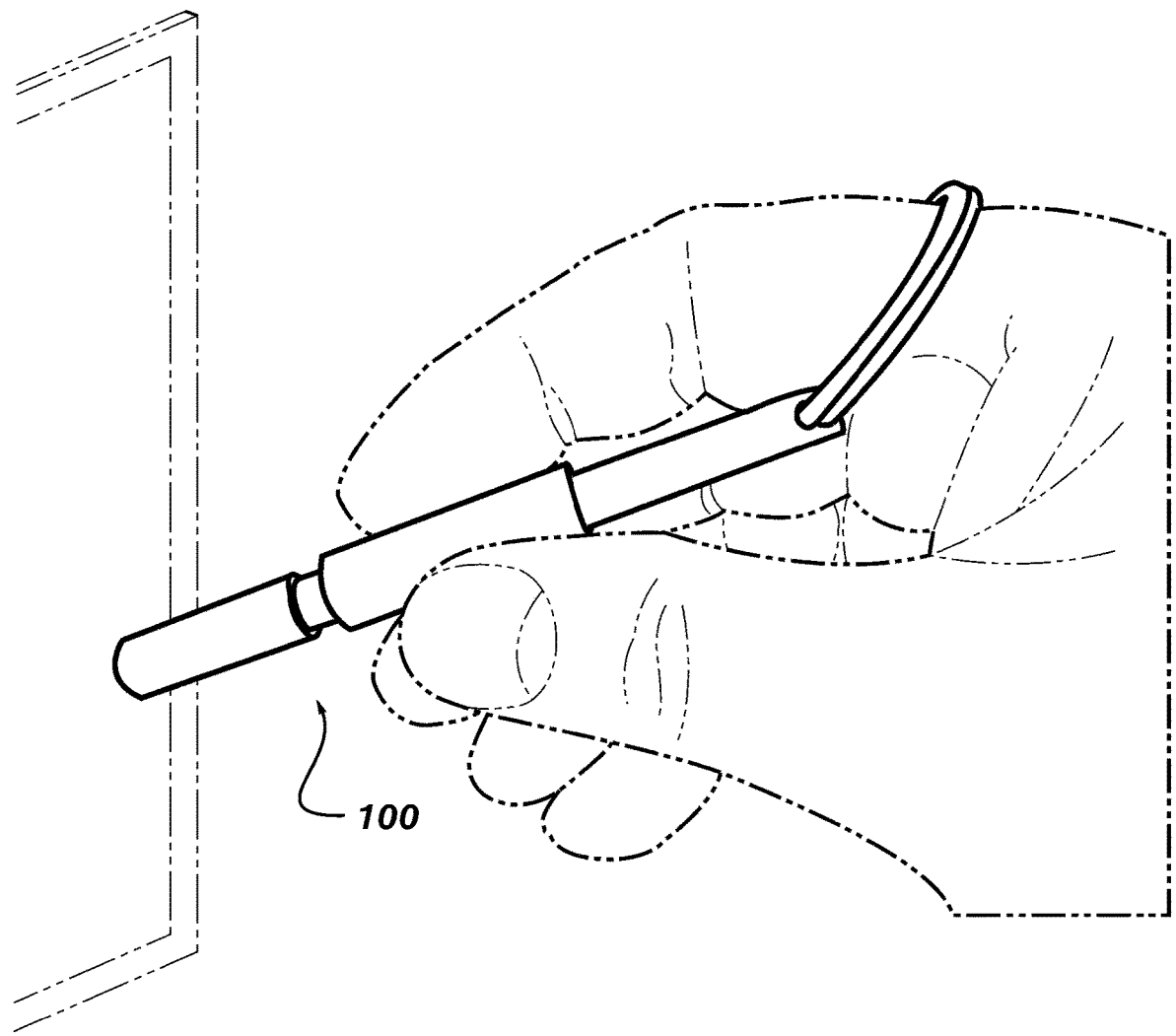
FIG. 10 is a pictorial diagram of a method of a human hand holding the stylus tool according to some exemplary embodiments of the present disclosure.

FIGS. 1-14 depict a portable, inexpensive exemplary stylus tool embodiment 100 that can mount on a finger and can be grasped by a user to mitigate hand contact with surfaces and can electrically interact with a capacitive device touchscreen, and the rigid stylus tool can effect force transmission and motion to a movable surface. Overview shown in FIG. 1 perspective view, FIG. 2 perspective deconstructed view, and FIG. 7 plan view.

The stylus tool exemplary embodiment 100 can comprise an elongated stem 110 comprising a proximal end 114 and a distal end 112 and can have at least a transverse first aperture 117 proximate the proximal end 114, and also the elongated stem 110 can have a distal chamfer 113 at the distal end 112 (FIG. 4) and a proximal chamfer 116 at the proximal end 114 (FIG. 5), and can be ergonomically sized to exceed in length an extended 95th percentile male middle finger. Further, the elongated stem 110 can be made of an electrically conductive metal such as aluminum, aluminum alloy, copper, copper alloy, steel, steel alloy, titanium, titanium alloy, brass, bronze, tungsten, tungsten alloy, zinc, zinc alloy and combination thereof. Other elongated stem 110 cross section perimeter shapes such as round, curved, polygonal and combination thereof are contemplated. The elongated stem 110 can be manufactured from a stiff, rigid material, having such construction that can resist bending and deforming when in use, and the elongated stem 110 can bear upon and move heavier objects such as a USPS mailbox door, dumpster lid, and an entrance door, and can have multiple transverse apertures suitable for hand and finger size adjustment. Also contemplated that the distal end 112 can be planar, round, frustoconical and combination thereof, and the proximal end 114 rounded.

Figure 14:
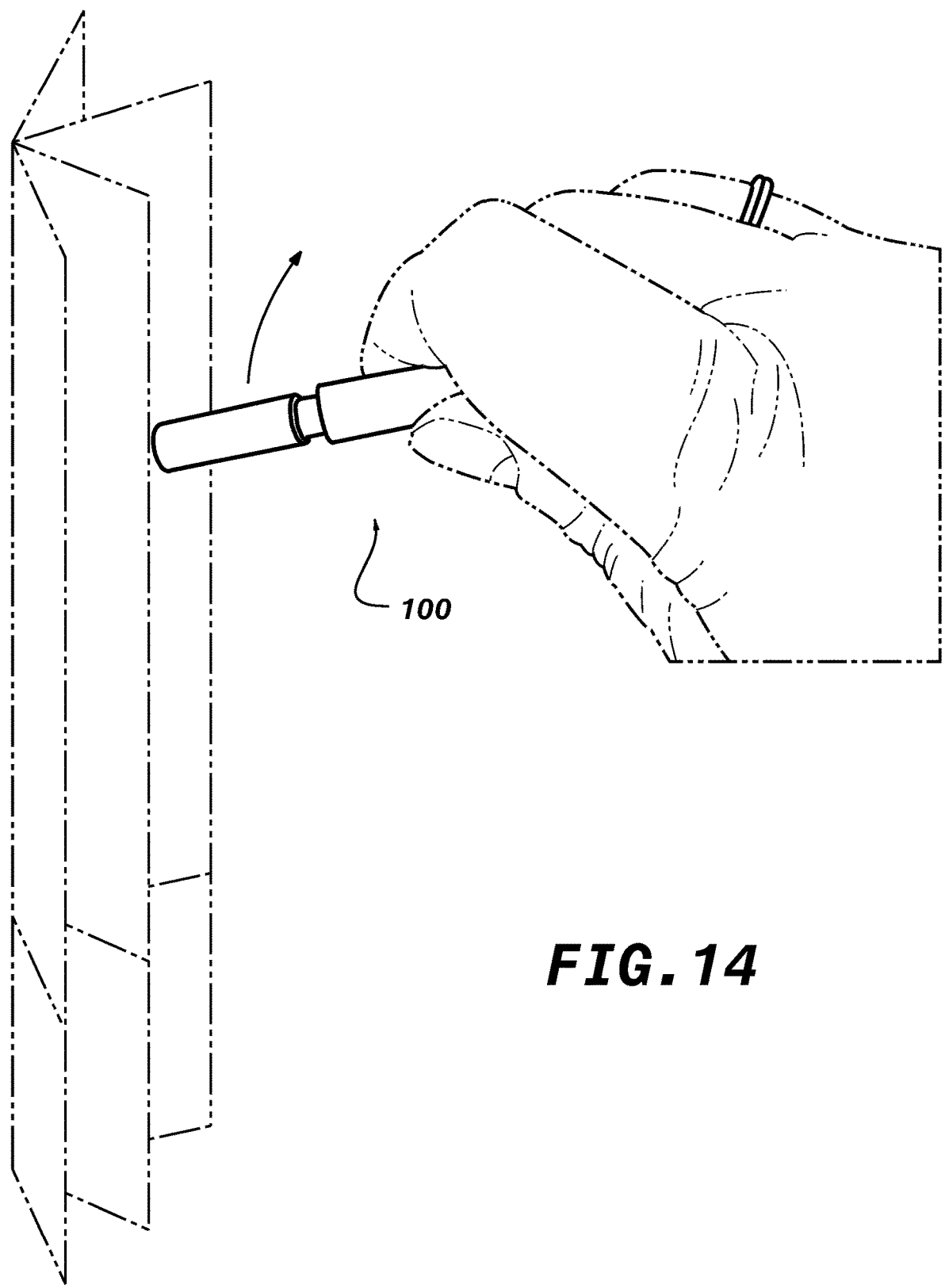
FIG. 14 is a pictorial diagram of a method of a human hand utilizing the actuator for enhanced capacitive contact use of the stylus tool according to some exemplary embodiments of the present disclosure.
Figure 15:
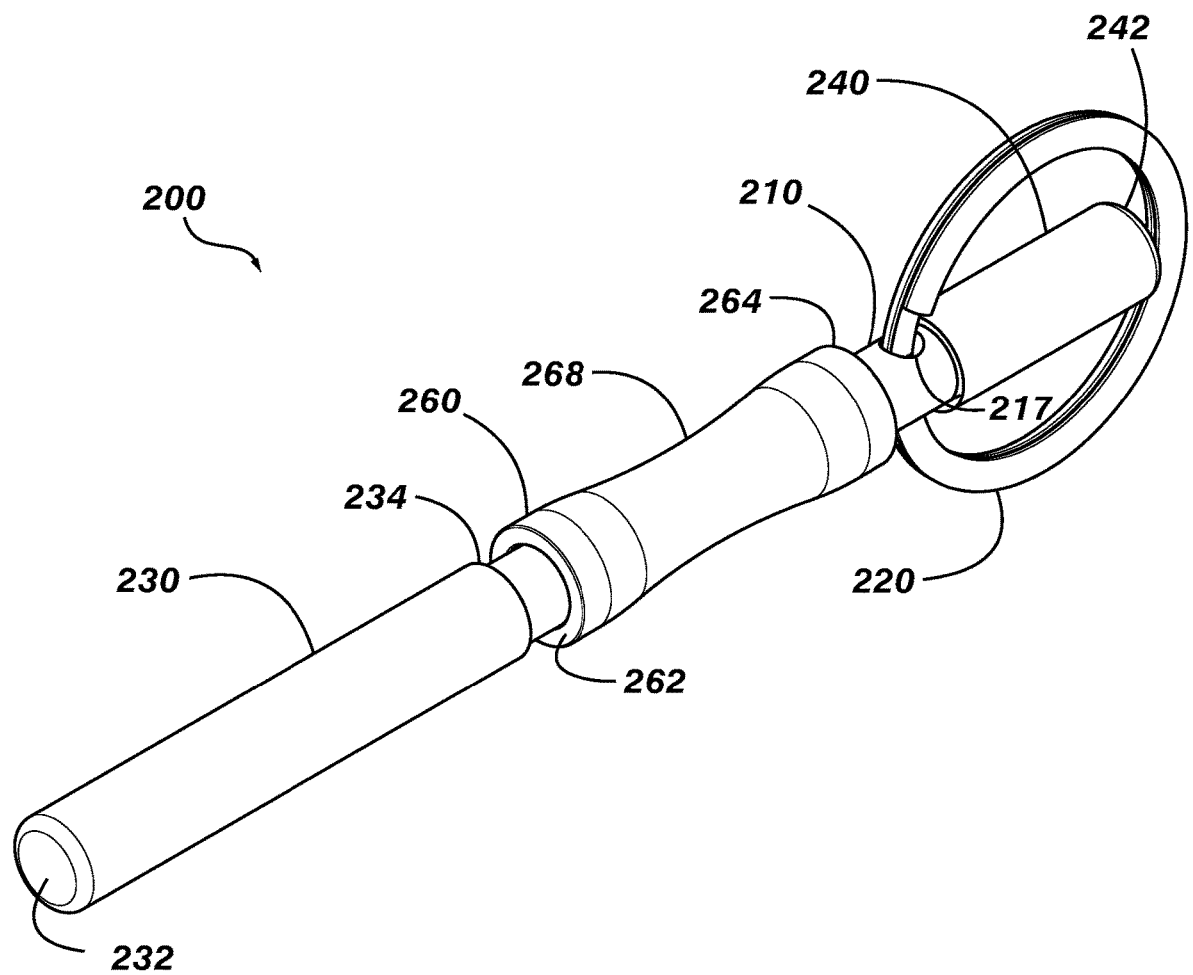
FIG. 15 is a perspective view of the stylus tool according to some exemplary embodiments of the present disclosure.

The stylus tool exemplary embodiment 100 can further comprise the transverse first aperture 117 that can support a removably and pivotably docked split keyring 120 which can comprise a fulcrum 111 of a third-class lever (FIGS. 8 & 9). The split keyring 120 (FIG. 6), can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. Other split keyring 120 cross section perimeter shapes such as round, curved, polygonal and combination thereof are also contemplated. Additionally, the split keyring 120 can be ergonomically sized to circumferentially communicate with the base of the proximal phalanx of the user's finger and may be seated against and nestled on the index finger superficial transverse metacarpal ligament at the metacarpal-phalangeal joint, and can accommodate a multitude of keys, such as house, car and office keys attached thereon. The metallic split keyring 120 engages with the transverse first aperture 117 that can be sized to envelop a single loop 126 and resist the transit of the full metallic split keyring 120, such that the metallic split keyring 120 can be substantially contained in circumferential rotation; clockwise by a first end 122 and counterclockwise by a second end 124, can effectively secure the elongated stem 110 in a position to provide firm attachment at the base of the finger in use, and thereby can activate a capacitive touchscreen (FIG. 10), or move a surface with authority and consistency since the force applied, such as in pushing or opening a door, can be transmitted to a fulcrum 111 of the split keyring 120 which is secured by the fingers and hand (FIG. 14).

The stylus tool exemplary embodiment 100 can also comprise at least a compliant first cap 130 comprising a closed end 132 and an open end 134 with an orifice 136, (FIG. 3), and can be removably coupled with the elongated stem 110. Further, the compliant first cap 130 can comprise a polymer, and can be metallically coated, infused by dispersed conductive carbon, carbon nanotubes, aluminum, nickel, steel wool, silver particles, copper fibers, metallized glass, and other metallic fillers to impart metallic properties, and can also include chemical vapor deposition, electrically conductive, antimicrobial additives, and injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof. Other compliant first cap 130 inner and outer cross section perimeter shapes such as round, curved, polygonal and combination thereof that can match the stem geometry are also contemplated. In addition, the closed end 132 of the compliant first cap 130 can be flat, rounded, pointed and combination thereof, and the finish can be smooth to limit microbial adhesion, and can be substantially elongated to provide sufficient contact area to utilize the length of the body of the compliant first cap 130, imitating the movements the user would perform typically with the index finger, without making finger contact with the surface. The compliant first cap 130 can be attached with a low insertion force firmly with an interference fit to the elongated stem 110, while requiring a higher ejection force to remove, allowing the apparatus to dangle on a keychain which be carried in the pocket or purse without separating. The compliant first cap 130 can have the advantage of being small, light, inexpensive and replaceable, and in some situations can be more practical and environmentally friendly than disposable gloves; and can vary in length; a shorter length can be more eco-friendly and economical whereas a longer length can provide increased side contact area.

Figure 13:
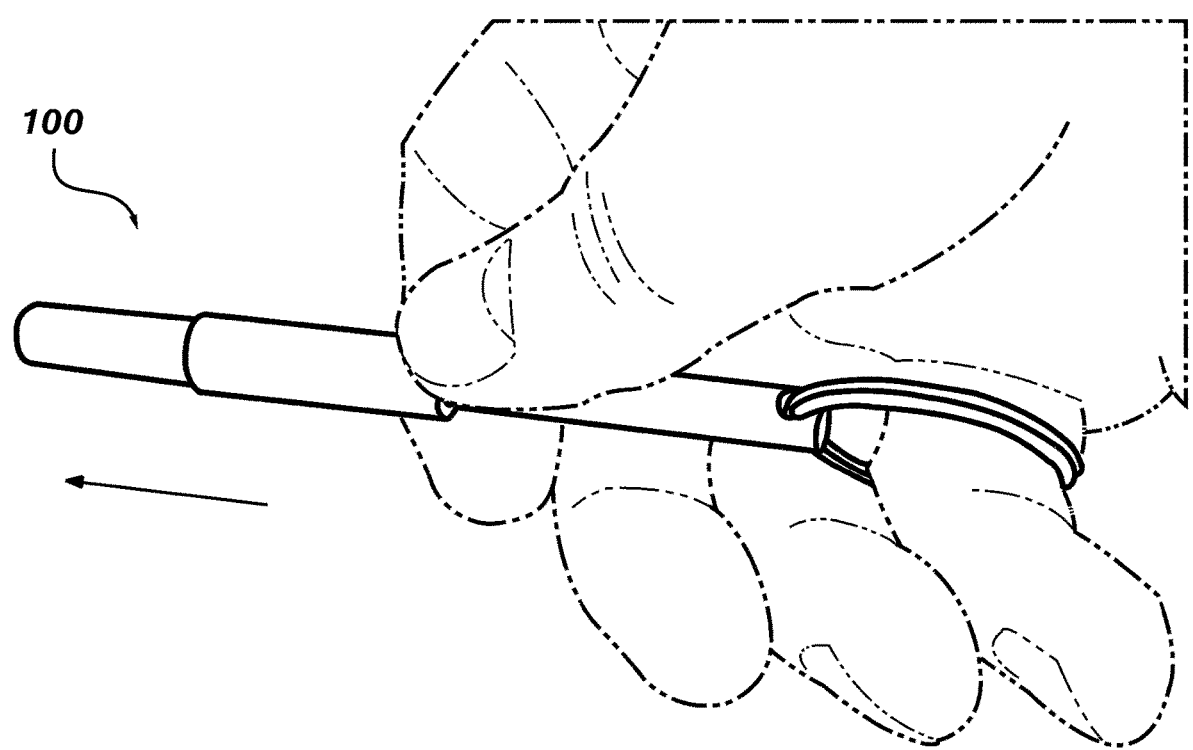
FIG. 13 is a pictorial diagram of a method of a human hand ejecting the first cap from the stylus tool according to some exemplary embodiments of the present disclosure.

Further, the stylus tool exemplary embodiment 100 can comprise a means for ejection of removably separating the compliant first cap 130 from the distal end 112 of the elongated stem 110. The ejection mechanism can include an actuator 160 comprising an anterior end 162, and a posterior end 164, and an internal passage 166 that can axially communicate with the elongated stem 110 by slidably enveloping the elongated stem 110 in between the open end 134 of the first cap 130, and the anterior end 162 of the actuator 160 proximate the open end 134 of the compliant first cap 130. The ejection mechanism can additionally comprise a keyring 120 connected to the elongated stem 110 via a transverse aperture 117 near the proximal end 114 of the elongated stem 110. FIG. 13 illustrates an exemplary manually actuated means for ejection, which can be a one handed effort. The keyring 120 can be anchored on the little finger, and the thumb and index finger can grasp the posterior end 164 of the actuator 160 and can extend by increasing the force axially upon the posterior end 164 of the actuator 160, whereby the keyring 120, through the transverse first aperture 117, can communicate with the elongated stem 110, and can provide a counterforce, whereby the anterior end 162 of the actuator 160 contacts the open end 134 of the compliant first cap 130, and the transmitted force is adequate to overcome the frictional force that can hold the compliant first cap 130 in place, and can force the compliant cap 130 to slide axially upon and toward the distal end 112 of the elongated stem 110. Continuing the extension of the thumb and index finger, the actuator 160 can continue along the elongated stem 110, and can exert a force on the compliant first cap 130 axially, until the compliant first cap 130 can separate from the stem 110. The actuator 160 can be of sufficient length whereby grasping it with thumb and forefinger can diminish thumb and finger contact with the ejecting compliant first cap 130. Furthermore, wherein the actuator 160 may be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The actuator 160 may be produced by conventional metal mill and machining methods, or additive manufacturing and may also consist of polymer, carbon, carbon fiber and other composites; Other actuator 160 cross section perimeter shapes such as round, curved, polygonal and combination thereof are contemplated.

A capacitive touchscreen panel generally consists of an insulator, such as glass, coated with a transparent conductor. As the human body is also an electrical conductor, touching the surface of the screen with an electrically conductive stylus tool results in a distortion of the touchscreen's electrostatic field, measurable as a change in capacitance. That electrical signal is then interpreted and processed by the capacitive device. Electronics having capacitive and resistive (pressure sensitive) touchscreens can be activated with the manual stylus tool exemplary embodiment 100. The means for activating a capacitive touchscreen can comprise an elongated stem 110 with a transverse aperture 117 near the proximal end 114 can be connected to a split keyring 120 that can be worn on the index finger of the user, and the actuator 160 can axially communicate with the elongated stem 110 and can self-align to a two fingers and thumb grasp (FIG. 10), whereby a compliant first cap 130 attached to the distal end 112 of the elongated stem 110 can make contact with the touchscreen. Some capacitive touchscreens require a greater surface contact area for activation, accordingly the compliant first cap 130 can be ejected, and the anterior end 162 of the actuator 160 can activate a capacitive touchscreen by means of axially communicating with the elongated stem 110 and can haptically generate tactile feedback by the user physically referencing the contact of the distal end 112 with the surface, and self-aligning with the aforesaid (FIGS. 11-12). The distal phalanges pressing with the pads of the fingers touching in a triangular grasp the actuator 160 can allow for more precise control, similar to the use of a writing implement, over the placement and position of the tip of the stylus tool. The actuator 160 can automatically adjust to the optimum finger position of the user, whether arched or extended, by sliding back and forth on the elongated stem 110.

Third-class levers are referred to as 'speed multipliers' because a larger force is applied by the effort (force by the user), and the load (surface contacted) travels a farther distance, its speed is also multiplied. The split keyring 120 that can fit on the small, ring and middle finger of the user, and through the transverse first aperture 117 the elongated stem 110 can hinge about the fulcrum 111, and the actuator 160 can communicate with the elongated stem 110 and can self-align relative to a two fingers and thumb grasp, whereby a compliant first cap 130 attached over the distal end 112 of the elongated stem 110 can make contact with a surface. The stylus tool exemplary embodiment 100 can further function as a third-class lever with a closed first providing the effort, and the wrist, elbow, shoulder, the body and a combination thereof, articulating as the fulcrum.

The exemplary embodiment 100 length may be in the range between 3.5 and 3.7 inches. The combined weight for the aluminum versions of the elongated stem 110 and actuator 160, and the steel version of the split keyring 120 and the plastic version of the compliant first cap 130 may be in the range between 0.5 and 0.7 ounces.

FIGS. 15-26 depict exemplary stylus tool embodiment 200. Overview shown in FIG. 15 perspective view, FIG. 16 perspective deconstructed view, and FIG. 21 plan view.

The stylus tool exemplary embodiment 200 can comprise an elongated stem 210 and can be ergonomically sized to exceed in length an extended 95th percentile male middle finger, and an additional length that is less than the inside diameter of a split keyring 230, elongated stem 210 comprising a distal end 212 and a proximal end 214. Further, a transverse second aperture 219 located in between a transverse first aperture 217 and the proximal end 214. Further, the elongated stem can have a distal chamfer 213 at the distal end 212 (FIG. 18) and a proximal chamfer 216 at the proximal end (FIG. 19). Also contemplated in addition to chamfered ends, that the distal end 212 can be planar, round, frustoconical and combination thereof, and the proximal end 214 rounded, as these shapes can aid in the attachment of a compliant first cap 230, and a compliant second cap 240.

The stylus tool exemplary embodiment 200 elongated stem 210 can further comprise the transverse first aperture 217 that can support a removably and pivotably docked metallic split key ring 220 (FIG. 20) which can function as a third-class lever fulcrum 211 (FIGS. 22-23), and can be ergonomically sized to circumferentially communicate with the base of the proximal phalanx of the user's finger, and can also accommodate a multitude of keys attached thereon. Additionally, the transverse first aperture 217 can be sized by drilling the appropriate size aperture to envelop a single loop 226 and resist the transit of the full metallic split keyring 220, such that the metallic split keyring 220 can be substantially contained in circumferential rotation; clockwise by a first end 222 and counterclockwise by a second end 224.

The stylus tool exemplary embodiment 200 can also comprise the compliant first cap 230 comprising a closed end 232, and an open end 234 with an orifice 236 (FIG. 17), the compliant first cap 230 can be removably coupled with the stem 210 via the orifice 236 sliding over the distal end 212 thereof, and further comprising the compliant second cap 240 comprising a closed end 242, and an open end 244 with an orifice 246, the compliant second cap removably coupled with the elongated stem 210 via the orifice 246 sliding over the proximal end 214 and the transverse second aperture 219 thereof. Furthermore, the compliant first cap 230 and the compliant second cap 240 can comprise a polymer, and can be metallically coated, infused by dispersed conductive carbon, carbon nanotubes, aluminum, nickel, steel wool, silver particles, copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof. The compliant first cap 230 and the compliant second cap 240 inner and outer cross section perimeters may be round, curved, polygonal and combination thereof that can match the stem geometry.

Figure 24:
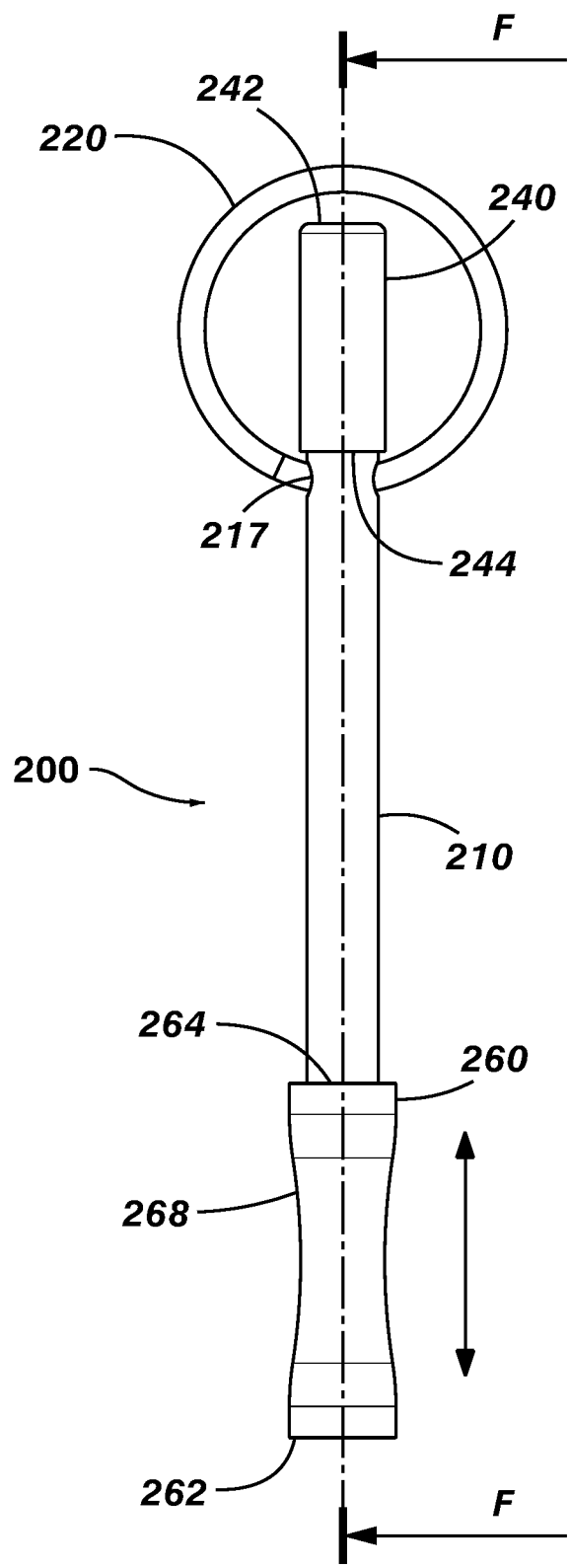
FIG. 24 is a plan view of the activated actuator after ejection of the extended cap from the stylus tool according to some exemplary embodiments of the present disclosure.
Figure 25:
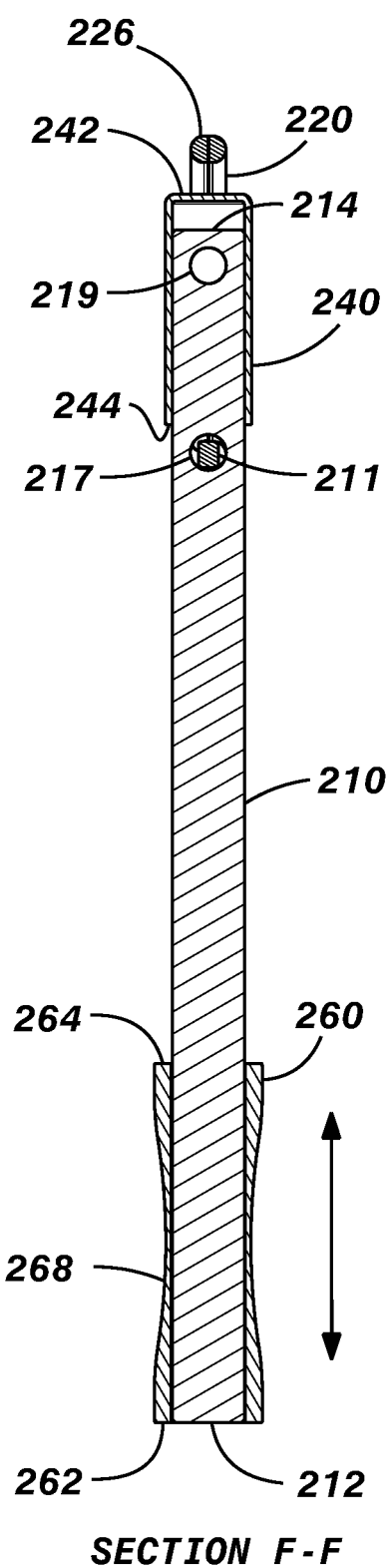
FIG. 25 is a cross-sectional view F-F of FIG. 24 the activated actuator after ejection off the elongated cap from the stylus tool according to some exemplary embodiments of the present disclosure.
Figure 26:
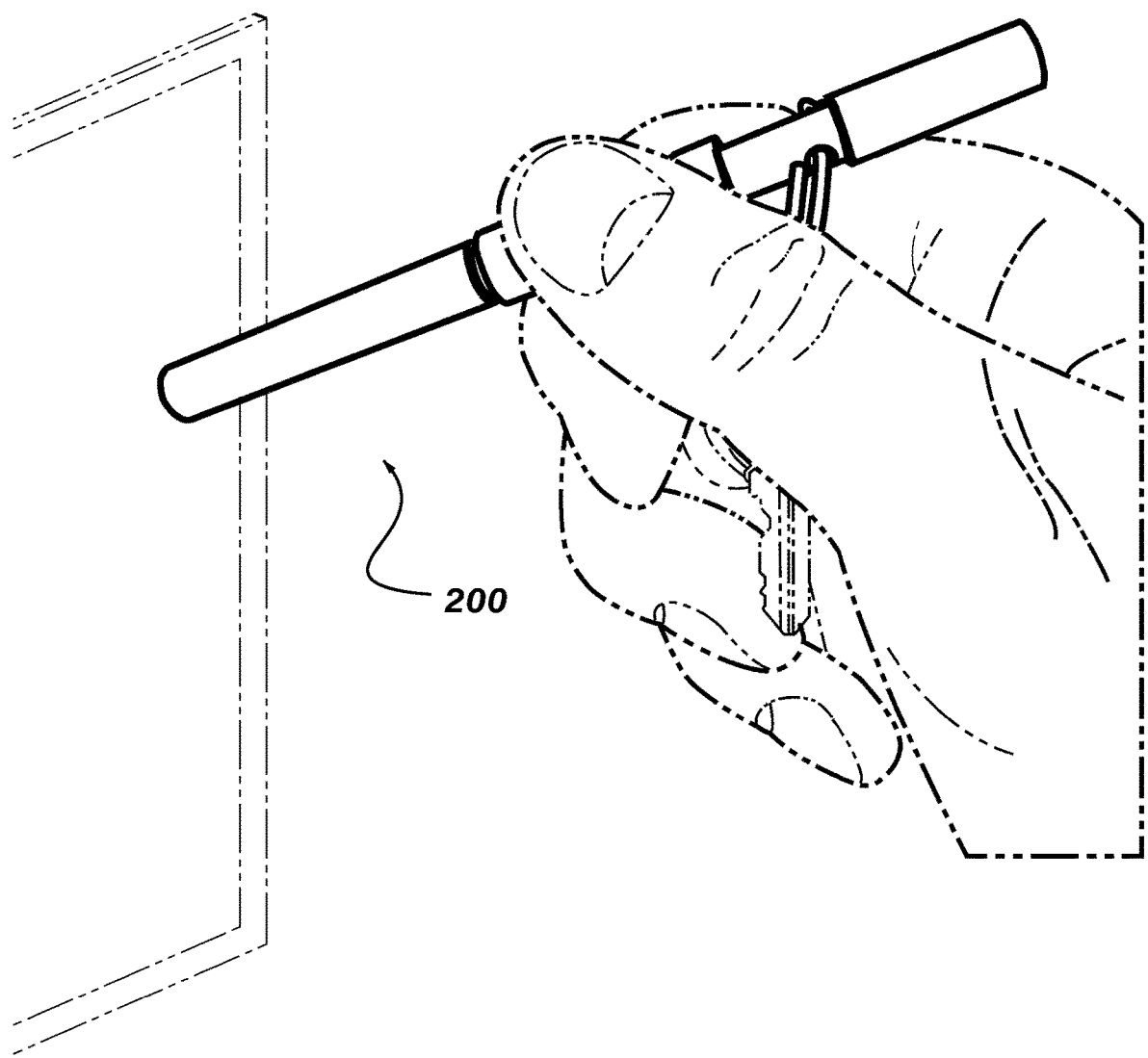
FIG. 26 is a pictorial diagram of a method of a human hand holding the stylus tool according to some exemplary embodiments of the present disclosure.
Figure 27:
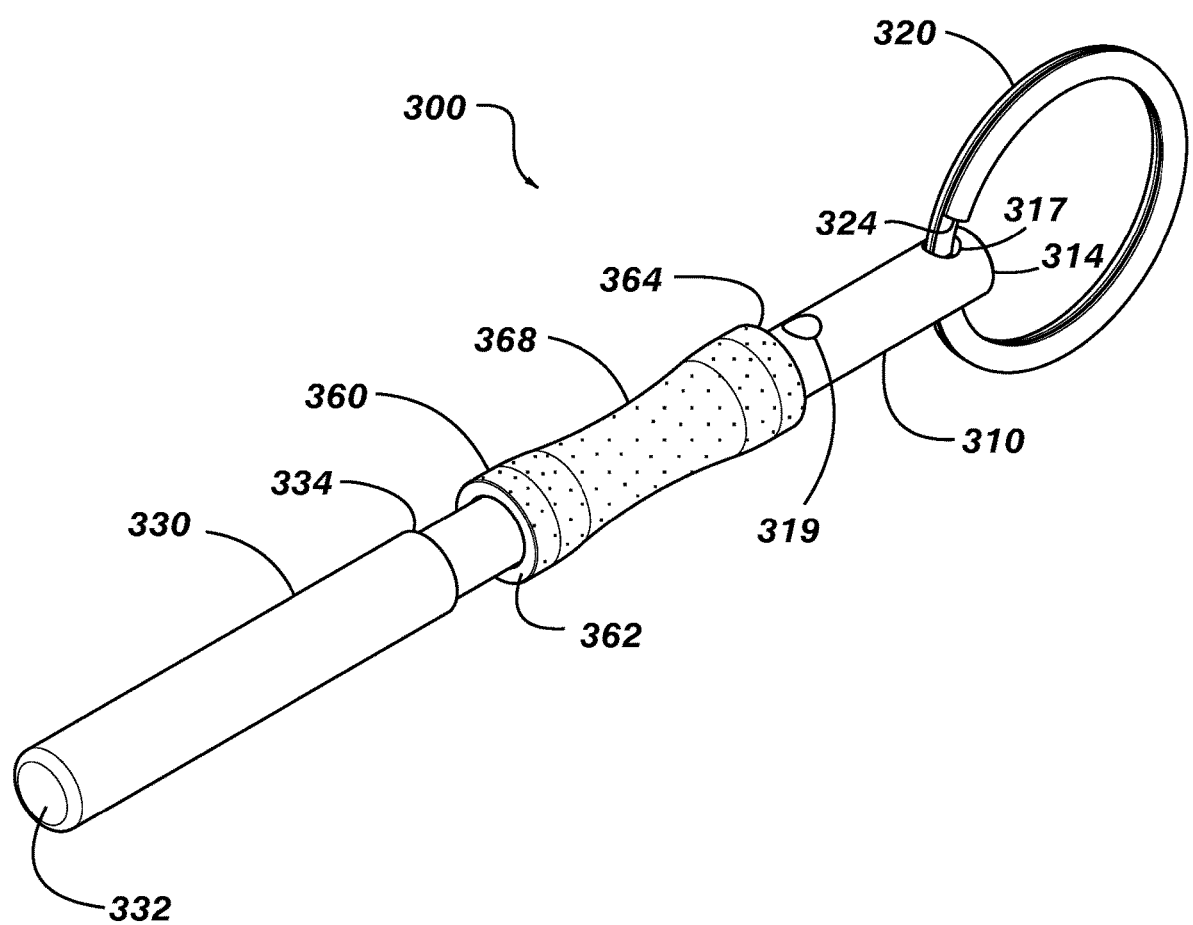
FIG. 27 is a perspective view of the stylus tool according to some exemplary embodiments of the present disclosure.

Further, the stylus tool exemplary embodiment 200 can comprise a means for ejection of removably separating the compliant first cap 230 from the distal end 212 of the elongated stem 210. The ejection mechanism can include an actuator 260 with a substantially arcuate outer surface, comprising an anterior end 262, and a posterior end 264, and an internal passage 266 that can axially communicate with the elongated stem 210, and by slidably enveloping the elongated stem 210 in between the open end 234 of the first cap 230 and the transverse first aperture 217. The ejection mechanism can additionally comprise a keyring 220 connected to the elongated stem 210 via the transverse first aperture 217 toward the proximal end 214 of the elongated stem 210. The actuator 260 can be moved to eject the compliant first cap 230, utilizing one or two hands, by grasping the substantially arcuate outer surface 268 of the actuator 260, which can self-center according to the position of the grasping fingers; and moving in the direction of the compliant first cap 230, and exerting an axial compressive force on the open end 234 of the compliant first cap 230, and synchronously effecting an axial tensile force through the transverse first aperture 217 of the stem 210 and the keyring 220, which can be worn by a chosen finger, thereby holding the stem 210 in place. The actuator 260 anterior end 264 can force the compliant first cap 230 and open end 234 to slide completely off the stem 210 (FIGS. 24-25). After the ejection of the compliant first cap 230, the compliant second cap 240 can be removed from the proximal end 214 of the elongated stem 210, and removably coupled with the distal end 212 of the elongated stem 210, for further capped use of stylus tool exemplary embodiment 200.

The stylus tool exemplary embodiment 200 means for activating a capacitive touchscreen can comprise the elongated stem 210 with a transverse aperture 217 near the proximal end 214 connected to the split keyring 220 that can be worn on the index finger of the user, and the actuator 260 can axially communicate with the elongated stem 210 and can self-align to a finger and thumb grasp (FIG. 26), whereby some capacitive touchscreens require a greater surface contact area for activation, thereby the anterior end 262 of the actuator 260 can activate a capacitive touchscreen by means of axially communicating with the elongated stem 210 and can haptically generate tactile feedback by physically referencing the contact of the distal end 212 with the surface, and self-aligning with the aforesaid (FIG. 24-25). Further, the compliant first cap 230 attached to the distal end 212 of the elongated stem 210, and also the distal end 212 can make contact and communicate with the touchscreen.

The stylus tool exemplary embodiment 200 third class lever can comprise a split keyring 220 that can fit on the small, ring and middle finger of the user, and through the transverse first aperture 217, the elongated stem 210 can hinge about the fulcrum 211, and the actuator 260 can communicate with the elongated stem 210 and can self-align relative to a two fingers and thumb grasp, whereby a compliant first cap 230 attached over the distal end 212 of the elongated stem 210 can make contact with a surface. The stylus tool exemplary embodiment 200 can further function as a third class lever with a closed first providing the effort, and the wrist, elbow, shoulder, the body and a combination thereof, articulating as the fulcrum.

The elongated stem 210, the metallic split keyring 220 and the actuator 260 can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The elongated stem 210, the metallic split keyring 220 and the actuator 260 can be produced by conventional metal mill and machining methods, or utilizing additive manufacturing and can also consist of polymer, carbon, carbon fiber and other composites. The elongated stem 210 and the metallic split keyring 220 cross section perimeter and the actuator 260 inner and outer cross section perimeters can be round, curved, polygonal and combination thereof, are further contemplated.

The exemplary embodiment 200 length may be in the range between 4.3 and 4.5 inches. The combined weight for the steel versions of the elongated stem 210 and the split keyring 220, the aluminum version actuator 260, and the plastic versions of the compliant first cap 230 and compliant second cap 240 may be in the range between 0.5 and 0.7 ounces.

FIGS. 27-32 depict an exemplary stylus tool embodiment 300. Overview shown in FIG. 27 perspective view and FIG. 28 plan view.

The stylus tool exemplary embodiment 300, comprising an elongated stem 310, can comprise an additional 20-25% the length of the stylus tool embodiment 100, and comprising a distal end 312 with a distal chamfer 313, and a proximal end 314 with a proximal chamfer 316, and a transverse second aperture 319 located in between a transverse first aperture 317 and the distal end 312.

The stylus tool exemplary embodiment 300 can further comprise the transverse first aperture 317 that can support a removably and pivotably docked metallic split key ring 320, which can function as a third-class lever fulcrum 311 (FIGS. 29-30) and can be ergonomically sized to circumferentially communicate with the base of the proximal phalanx of the user's finger, and can also accommodate a multitude of keys attached thereon. Additionally, the transverse first aperture 317 can be sized by drilling the appropriate size aperture to envelop a single loop 326 and resist the transit of the full metallic split keyring 320, such that the metallic split keyring 320 can be substantially contained in circumferential rotation; clockwise by a first end 322 and counterclockwise by a second end 324.

The stylus tool exemplary embodiment 300 can also comprise a compliant first cap 330 comprising a closed end 332 and an open end 334 with an orifice 336, the first cap 330 removably coupled with the stem 310 via the orifice 336 sliding over the distal end 312 thereof; and the compliant first cap 330 can comprise a polymer, and may be metallically coated, infused by dispersed conductive carbon, carbon nanotubes, aluminum, nickel, steel wool, silver particles, or copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone, and plastic variants made from cellulose, corn, cotton, fermented plant starch derivatives, and combination thereof. The compliant first cap 330 inner and outer cross section perimeters may be round, curved, polygonal and combination thereof that can match the stem geometry, and can be substantially longer in embodiment 300, having a larger area for contacting larger surfaces.

Further, the stylus tool exemplary embodiment 300 can comprise a means for ejection of removably separating the compliant first cap 330 from the distal end 312 of the elongated stem 310. The ejection mechanism can include an actuator 360 with a substantially arcuate textured outer surface 368, comprising an anterior end 362, and a posterior end 364, and an internal passage 366 that can axially communicate with the elongated stem 310 by slidably enveloping the elongated stem 310 in between the open end 334 of the first cap 330, with the anterior end 362 of the actuator 360 proximate the open end 334 of the compliant first cap 330. The ejection mechanism can additionally comprise the keyring 320 connected to the elongated stem 310 via a transverse first aperture 317 near the proximal end 314 of the elongated stem 310. The grasped actuator 360 can be moved in the direction of the compliant first cap, by the user exerting a compressive axial force on the open end 334 of the compliant first cap 330, and a resultant axial tension force through the transverse first aperture 317 of the stem on the keyring 320 which can be worn on a chosen finger. The actuator 360 anterior end 362 can force the compliant first cap 330 open end 334 to slide completely off the distal end 312 of the elongated stem 310.

The stylus tool exemplary embodiment 300 means for activating a capacitive touchscreen can comprise an elongated stem 310 with a transverse aperture 317 near the proximal end 314 connected to split keyring 320 that can be worn on the index finger of the user, and the actuator 360 can axially communicate with the elongated stem 310 and can self-align to a finger and thumb grasp, whereby as some capacitive touchscreens require a greater surface contact area for activation, thereby the anterior end 362 of the actuator 360 can activate a capacitive touchscreen by means of axially communicating with the elongated stem 310 and can haptically generate tactile feedback by physically referencing the contact of the distal end 312 with the surface, and self-aligning with the aforesaid (FIG. 24-25). Also, the compliant first cap 330 attached to the distal end 312 of the elongated stem 310, and the distal end alone 312 can make contact and communicate with the touchscreen.

Figure 31:
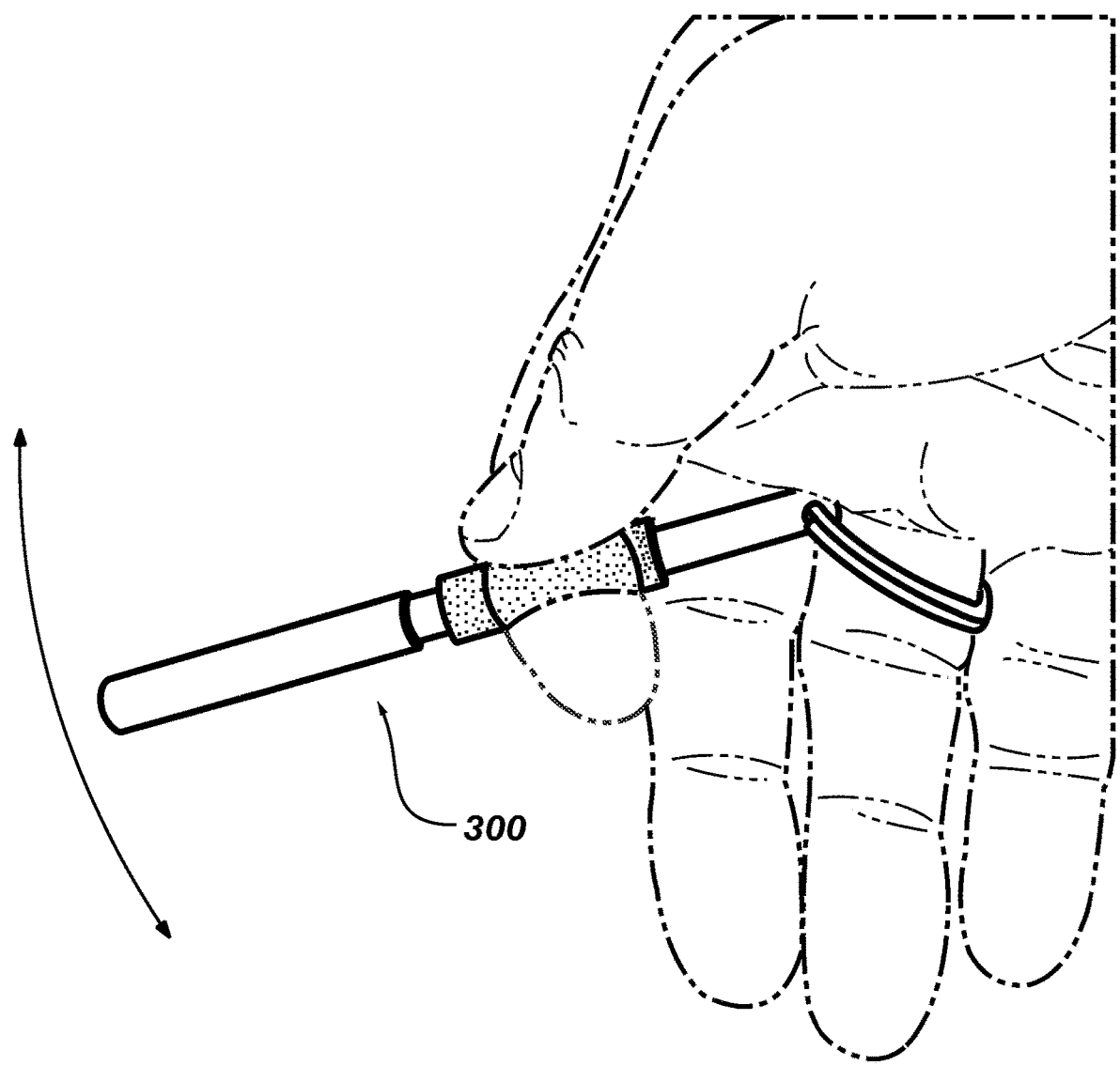
FIG. 31 is a pictorial diagram of a method of an open human hand holding the stylus tool according to some exemplary embodiments of the present disclosure.
Figure 32:
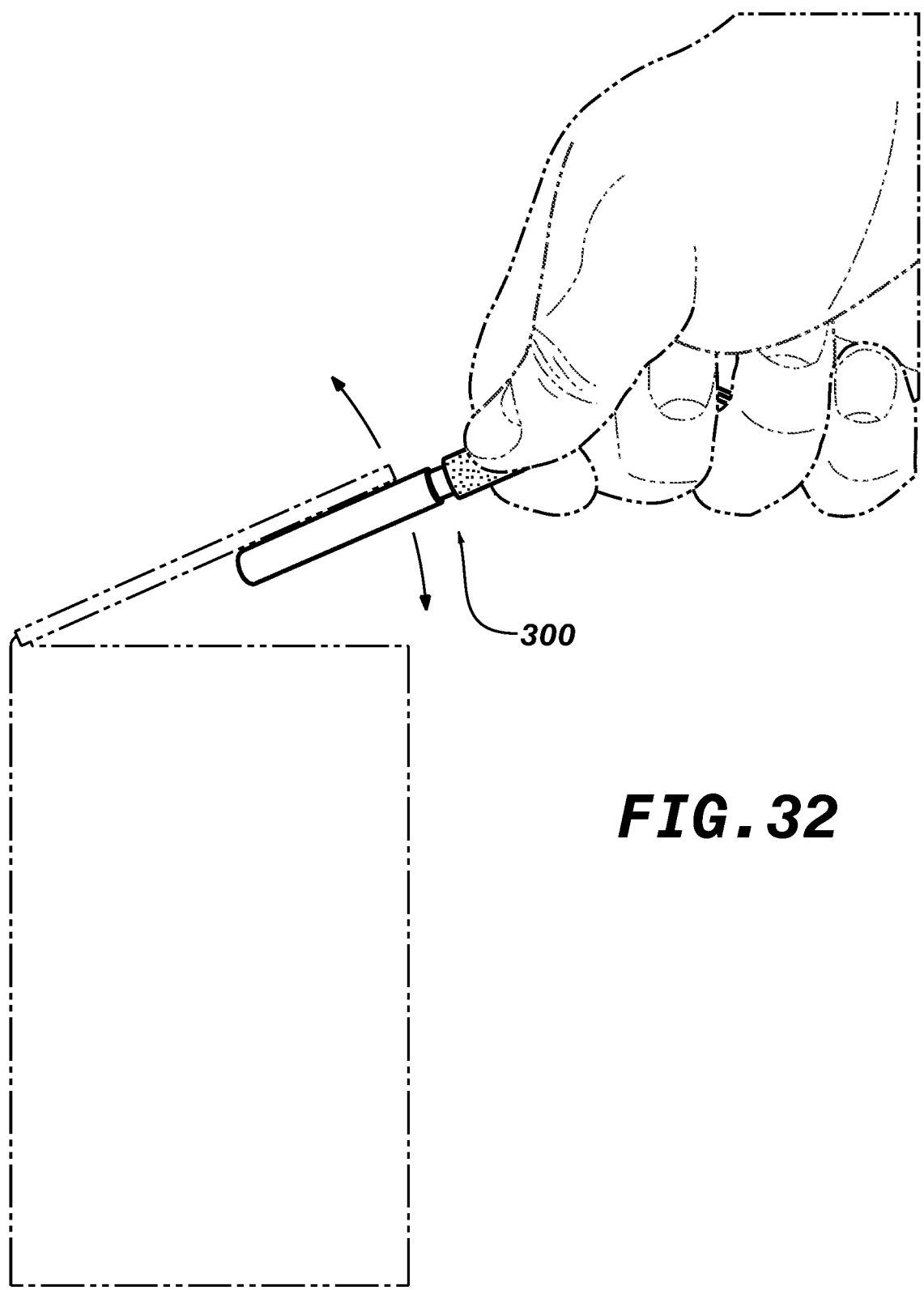
FIG. 32 is a pictorial diagram of a method of a closed human hand grasping the stylus tool to move a surface object according to some exemplary embodiments of the present disclosure.

The stylus tool exemplary embodiment 300 third class lever can comprise a split keyring 320 that can fit on the small, ring and middle finger of the user, and through the transverse first aperture 317, the elongated stem 310 can hinge about the fulcrum 311, and the actuator 360 can communicate with the elongated stem 310 and can self-align relative to a two fingers and thumb grasp, whereby a compliant first cap 330 attached over the distal end 312 of the elongated stem 310 can make contact with a surface (FIGS. 31-32). The stylus tool exemplary embodiment 300 can further function as a third-class lever with a closed first providing the effort, and the wrist, elbow, shoulder, the body and a combination thereof, articulating as the fulcrum.

The elongated stem 310, the metallic split keyring 320 and the actuator 360 can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The elongated stem 310, the metallic split keyring 320 and the actuator 360 can be produced by conventional metal mill and machining methods, or utilizing additive manufacturing and may also consist of polymer, carbon, carbon fiber and other composites. The elongated stem 310 and the metallic split keyring 320 cross section perimeter and the actuator 360 inner and outer cross section perimeters can be round, curved, polygonal and combination thereof, are further contemplated.

The exemplary embodiment 300 length may be in the range between 4.3 and 4.5 inches. The combined weight for the aluminum versions of the elongated stem 310 and actuator 360, and the steel version of the split keyring 320 and the plastic version of the compliant first cap 330 may be in the range between 0.5 and 0.7 ounces.

Figure 33:
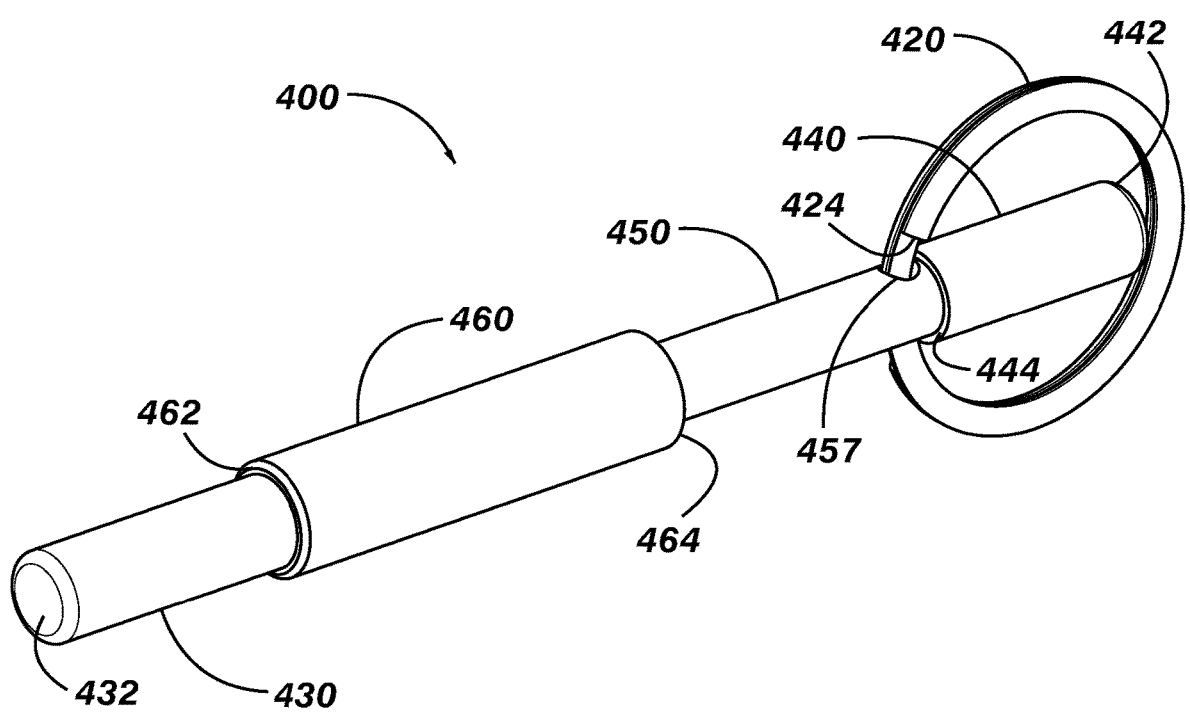
FIG. 33 is a perspective view of the stylus tool according to some exemplary embodiments of the present disclosure.
Figure 38:
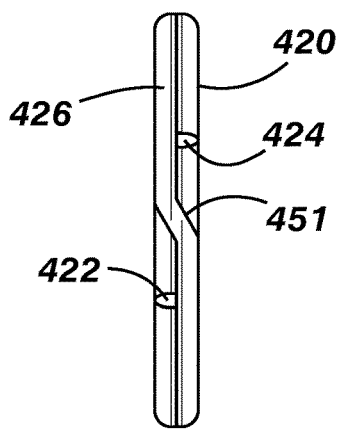
FIG. 38 is an end view of the split keyring of the stylus tool according to some exemplary embodiments of the present disclosure.
Figure 39:
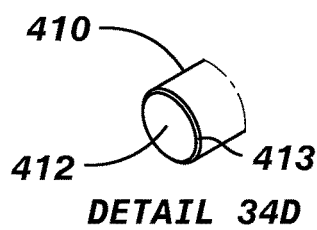
FIG. 39 is a detail view 34D FIG. 34, of the distal end of the lower stem of the stylus tool according to some exemplary embodiments of the present disclosure.
Figure 34:
FIG. 34 is a perspective deconstructed view of the stylus tool according to some exemplary embodiments of the present disclosure.
Figure 35:
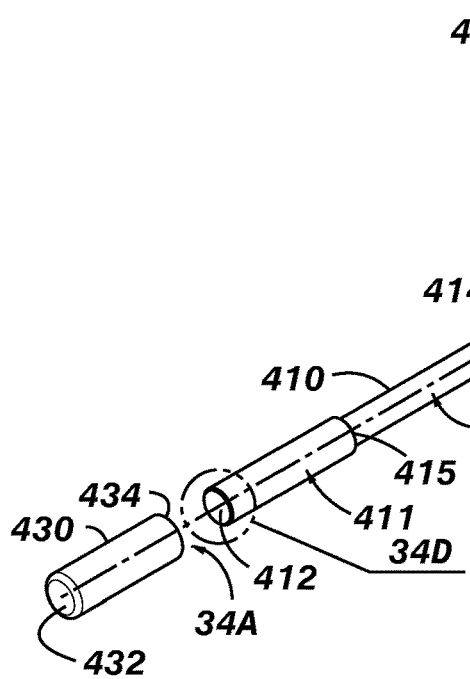
FIG. 35 is a detail view 34A of FIG. 34, of the first cap of the stylus tool according to some exemplary embodiments of the present disclosure.
Figure 36:
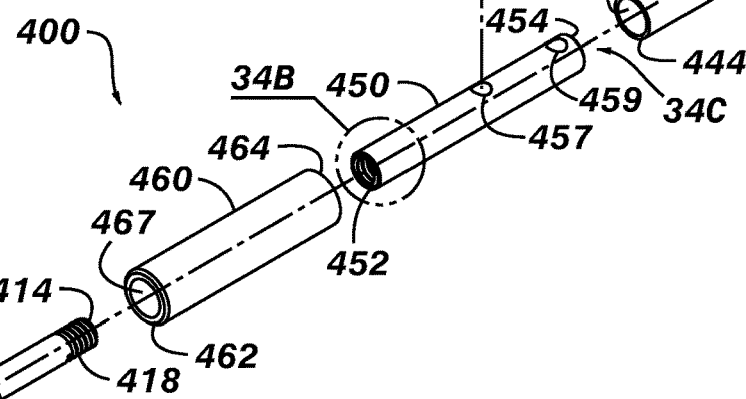
FIG. 36 is a detail view 34B FIG. 34, of the upper attach end of the upper stem of the stylus tool according to some exemplary embodiments of the present disclosure.
Figure 37:
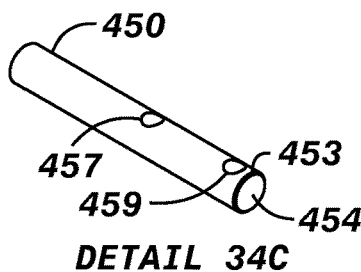
FIG. 37 is a detail view 34C FIG. 34, of the proximal end of the upper stem of the stylus tool according to some exemplary embodiments of the present disclosure.

FIGS. 33-47 depict an exemplary stylus tool embodiment 400. Overview shown in FIG. 33 perspective view, FIG. 34 perspective deconstructed view, and FIG. 40 plan view.

Figure 43:
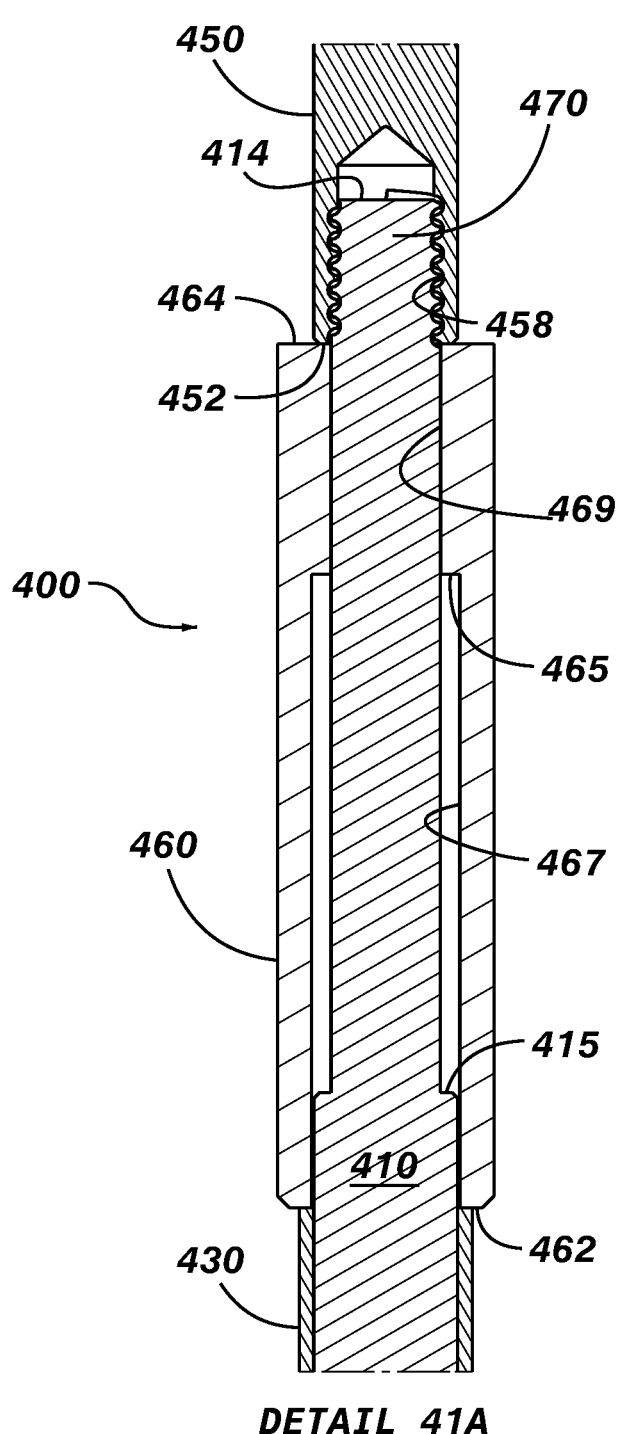
FIG. 43 is a close-up section view 41A of FIG. 41 of the captive actuator assembly of the stylus tool according to some exemplary embodiments of the present disclosure.
Figure 44:
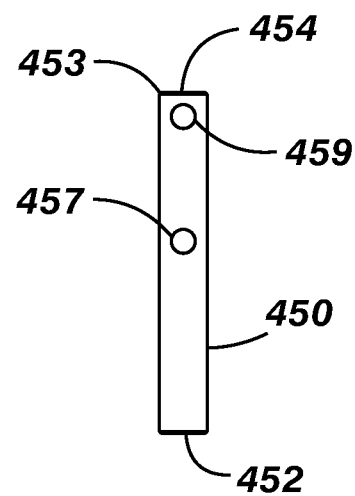
FIG. 44 is a detail view of the upper shaft of the stylus tool according to some exemplary embodiments of the present disclosure.
Figure 45:
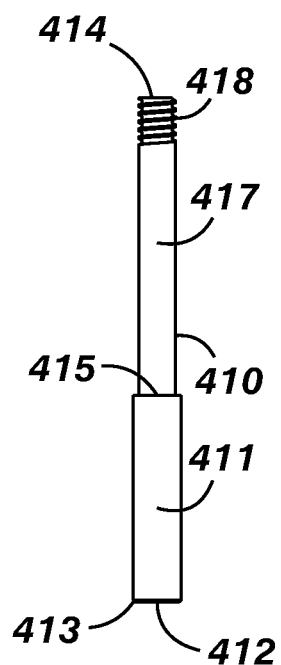
FIG. 45 is a detail view of the lower shaft of the stylus tool according to some exemplary embodiments of the present disclosure.
Figure 48:
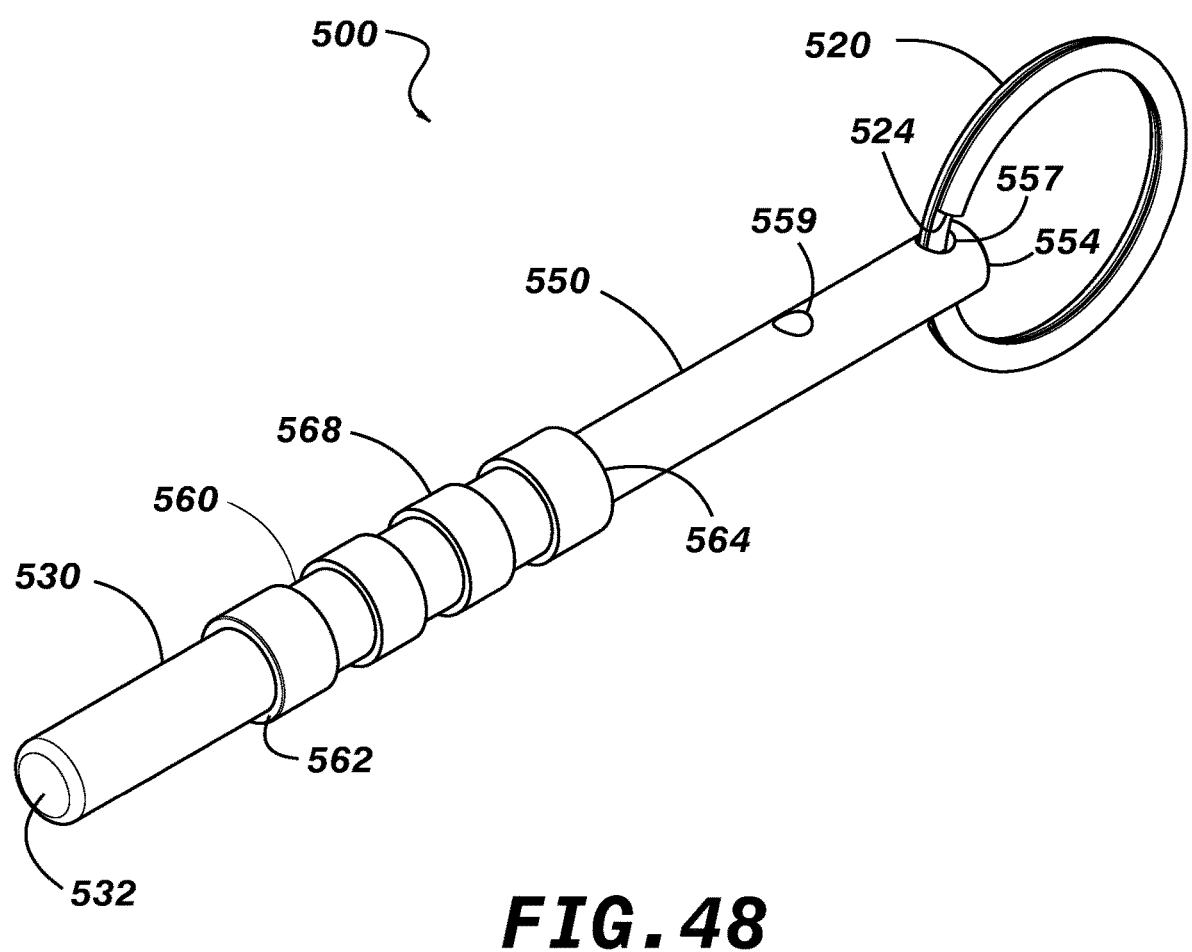
FIG. 48 is a perspective view of the stylus tool according to some exemplary embodiments of the present disclosure.
Figure 54:
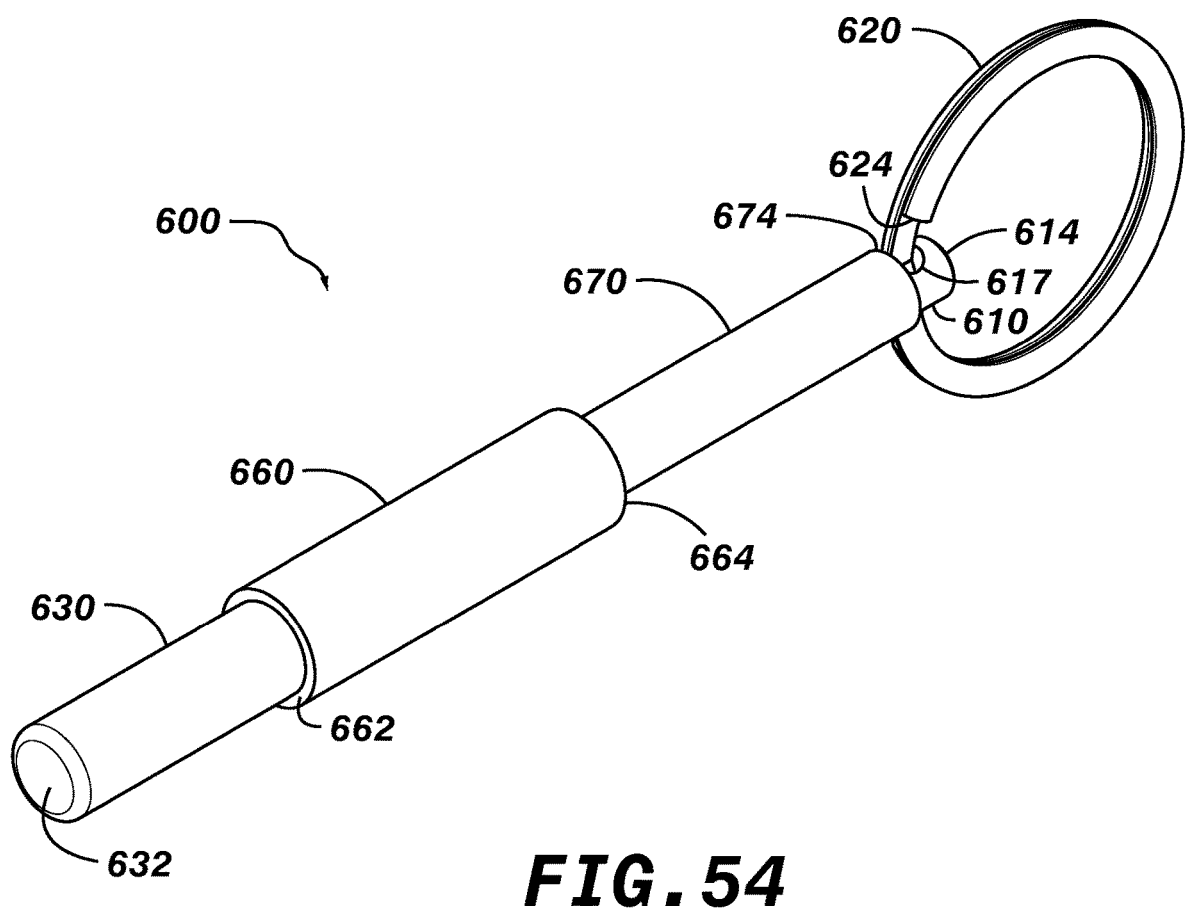
FIG. 54 is a perspective view of the stylus tool according to some exemplary embodiments of the present disclosure.
Figure 59:
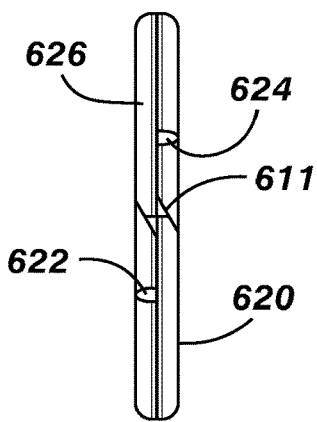
FIG. 59 is a side view of the split key ring of the stylus tool according to some exemplary embodiments of the present disclosure.
Figure 55:
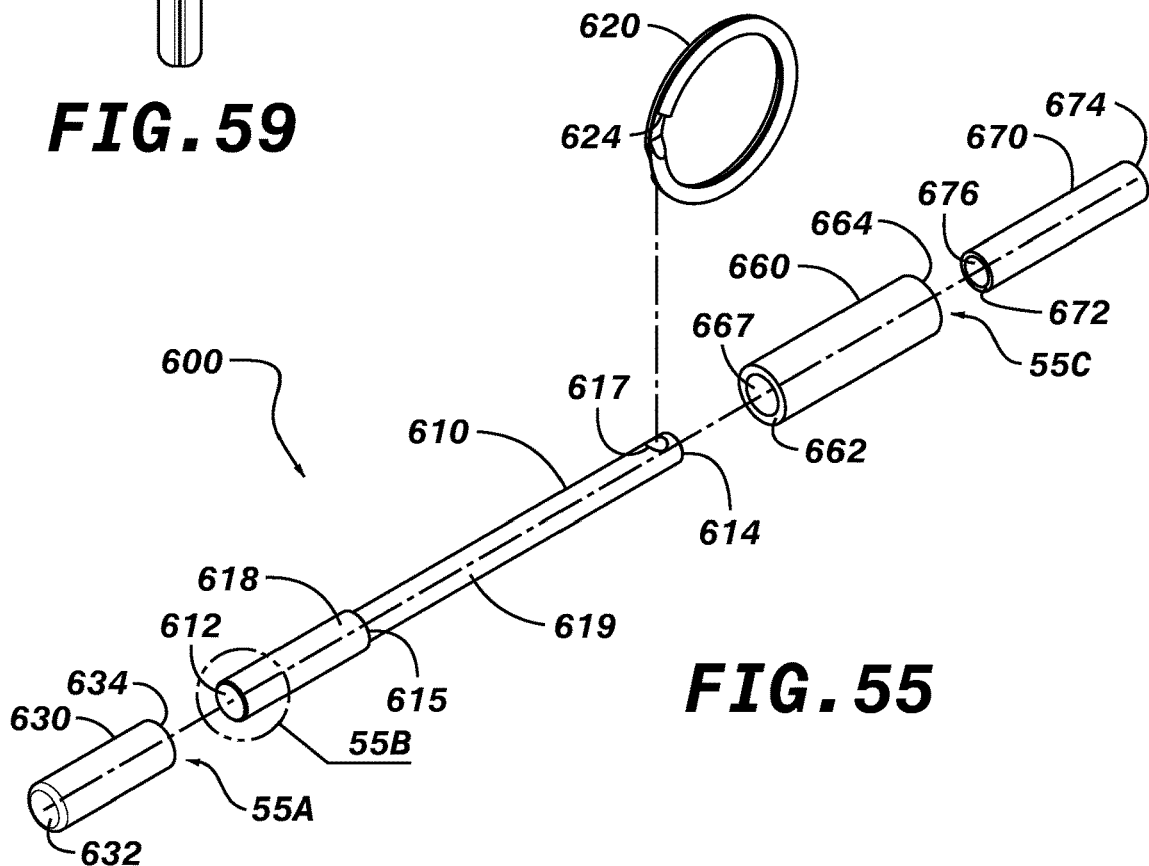
FIG. 55 is a perspective deconstructed view of the stylus tool according to some exemplary embodiments of the present disclosure.
Figure 56:
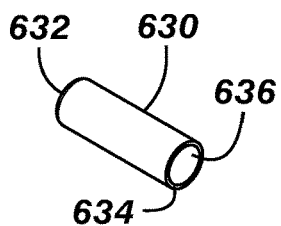
FIG. 56 is a detail view 55A FIG. 55, of the first cap of the stylus tool according to some exemplary embodiments of the present disclosure.
Figure 57:
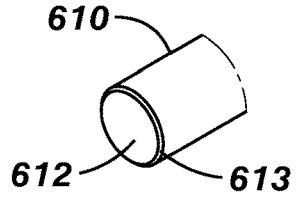
FIG. 57 is a detail view 55B FIG. 55, of the distal end of the stepped stem of the stylus tool according to some exemplary embodiments of the present disclosure.
Figure 58:
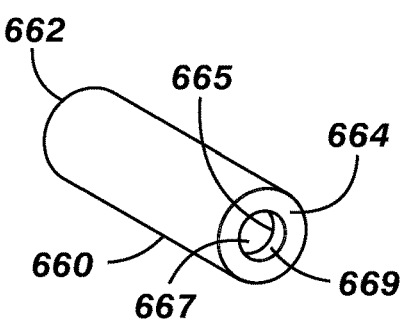
FIG. 58 is a detail view 55C FIG. 55, of the proximal end of the captive actuator of the stylus tool according to some exemplary embodiments of the present disclosure.
Figure 60:
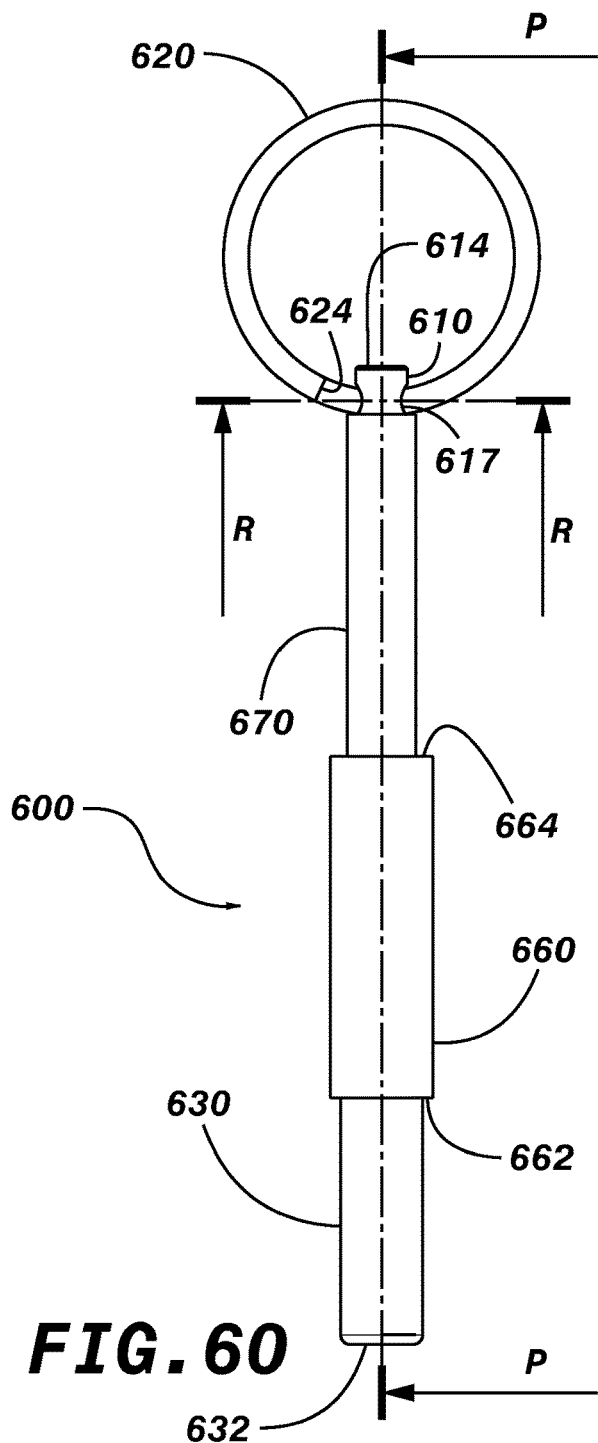
FIG. 60 is a plan view of the stylus tool according to some exemplary embodiments of the present disclosure.
Figure 61:
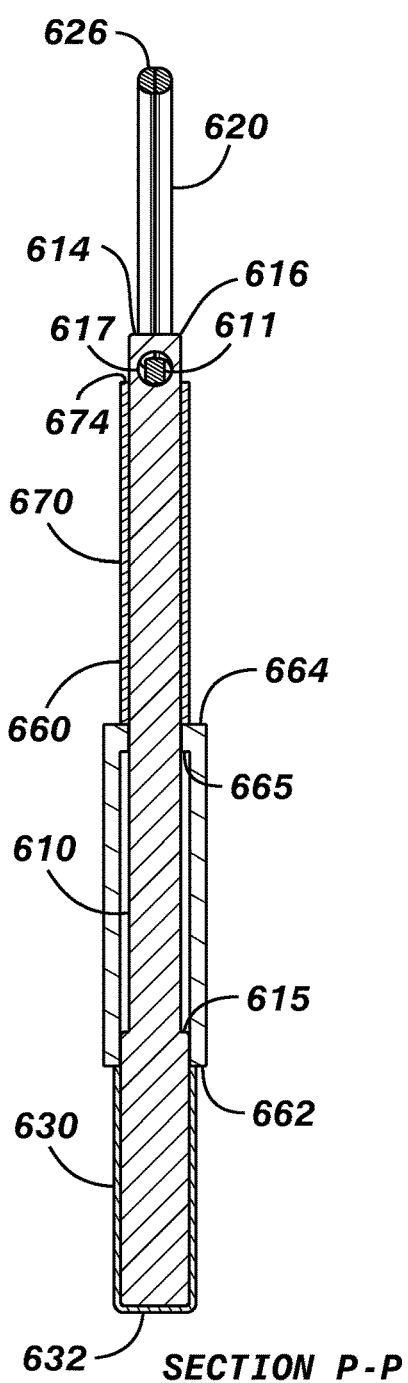
FIG. 61 is an axial cross-sectional view P-P of FIG. 60 of the stylus tool according to some exemplary embodiments of the present disclosure.
Figure 62:
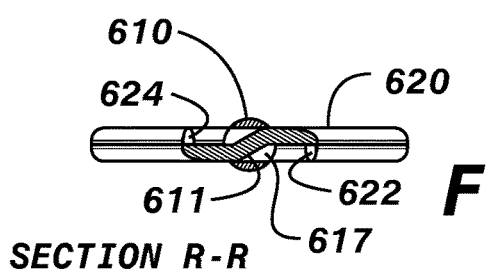
FIG. 62 is a cross-sectional view R-R of FIG. 60 through the centerline of the first aperture and fulcrum of the stylus tool according to some exemplary embodiments of the present disclosure.

The stylus tool exemplary embodiment 400 can comprise two shafts, a bottom shaft 410 and a top shaft 450 and a means for securing together, wherein the bottom shaft 410 (FIG. 45) may be comprised a lower section 411 proximate a distal end 412 with a distal chamfer 413 (FIG. 39), and an upper section 417 of less diameter than the lower section 411, proximate a first attach end 414, and the two adjacent sections faired with a bottom shaft transition 415. The bottom shaft 410 distal end 412 may be planar, chamfered, radiused, frustoconical and combination thereof. In another aspect, the top shaft 450 (FIG. 44) can be comprised a second attach end 452 (FIG. 36), and a proximal end 454 with a proximal chamfer 453 (FIG. 37) and further comprising a transverse second aperture 459 in between a transverse first aperture 457 and the proximal end 454, and wherein a first attach end 414 can connect to a second attach end 452 at a shaft assembly junction 470. Furthermore, the means for securing together can include an external thread 418 at the first attach end 414 and a tapped hole 458 in the second attach end 452 (FIG. 43). The means for securing together can alternatively comprise an interference fit joint, a ferruminated attachment, a bonded interface and a welded joint.

The stylus tool exemplary embodiment 400 can further comprise the transverse first aperture 457 that can support a removably and pivotably docked metallic split keyring 420 (FIG. 38) which can function as a third-class lever fulcrum 451 (FIGS. 41-42), and can be ergonomically sized to circumferentially communicate with the base of the proximal phalanx of the user's finger, and can also accommodate a multitude of keys attached thereon. Additionally, the transverse first aperture 457 can be sized by drilling the appropriate size aperture to envelop a single loop 426 and resist the transit of the full metallic split keyring 420, such that the metallic split keyring 420 can be substantially contained in circumferential rotation; clockwise by a first end 422 and counterclockwise by a second end 424.

The stylus tool exemplary embodiment 400 can also comprise a compliant first cap 430 comprising a closed end 432, and an open end 434 with the orifice 436, (FIG. 35) and the compliant first cap 430 can be removably coupled with the bottom shaft 410 via the orifice 436 sliding over the distal end 412 thereof, and further comprising a compliant second cap 440 having a closed end 442, and an open end 444 with an orifice 446. The compliant second cap 440 can be removably coupled with the top shaft 450 via the orifice 446 sliding over the proximal end 454 and the second aperture 459 thereof. The compliant first cap 430 and the compliant second cap 440, can comprise a polymer, and can be metallically coated, infused by dispersed conductive carbon, carbon nanotubes, aluminum, nickel, steel wool, silver particles, copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof. The compliant first cap 430 and the compliant second cap 440 inner and outer cross section perimeters can be round, curved, polygonal and combination thereof that can match the stem geometry.

Further, the stylus tool exemplary embodiment 400 can comprise a means for ejection an actuator 460 comprising an anterior end 462 and a posterior end 464; and at least two bores; an anterior bore 467 proximate the anterior end and a posterior bore 469 proximate the posterior end 464 and the two adjacent bores connected by an actuator bore transition 465; and wherein the actuator 460 can be axially confined by the assembly of the bottom shaft 410 and the top shaft 450 at the shaft assembly junction 470, and can communicate axially and concurrently by slidably enveloping parts of the bottom shaft lower section 411 and the bottom shaft upper section 417; and wherein the actuator 460 range of motion enfolded by the contact of the bottom shaft transition 415 with the actuator bore transition 465 as the forward extent, and the contact of the actuator posterior end 464 and the top shaft 450 second attach end 452 as the backward extent. The ejection mechanism can additionally comprise a keyring 420 connected to the top shaft 450 via a transverse first aperture 457 toward the proximal end 414 of the top shaft 450. The actuator 460 can be moved to eject the compliant first cap 430, utilizing one or two hands, by grasping the actuator 460, and axially sliding upon the bottom shaft 410, in the direction of the compliant first cap 430, and exerting an axial compressive force on the open end 434 of the compliant first cap 430, and synchronously effecting an axial tensile force through the shaft assembly junction 470, the top shaft 450, the transverse first aperture 457, the fulcrum 451 and the keyring 220, which can be worn by a chosen finger. The actuator 460 anterior end 462 can force the compliant first cap 430 open end 434 to separate from the bottom shaft 410 (FIGS. 46-47). Following the ejection of the compliant first cap 430, the compliant second cap 440 can be removed from the proximal end 414 of the top shaft 450, and removably coupled with the distal end 412 of the bottom shaft 410, for further capped use of stylus tool exemplary embodiment 400.

The stylus tool exemplary embodiment 400 means for activating a capacitive touchscreen can comprise the bottom shaft 410 and the top shaft 450 secured together, and the top shaft 450 with a transverse first aperture 457 near the proximal end 454 connected to the split keyring 420 that can be worn on the index finger of the user, and the actuator 460 can axially communicate with the bottom shaft 410, and can self-align to a finger and thumb grasp. Whereby some capacitive touchscreens require a greater surface contact area for activation, thereby the anterior end 462 of the actuator 460 can activate a capacitive touchscreen by means of axially communicating with the bottom shaft 410 and can haptically generate tactile feedback by the user physically referencing the contact of the distal end 412 with the surface, and self-aligning with the aforesaid (FIG. 24-25). Also, the compliant first cap 430 attached to the distal end 412 of the bottom shaft 410, and the distal end 412 can each separately make contact and communicate with a touchscreen. Furthermore, the actuator bore transition 465 contacting the bottom shaft transition 415 can limit the forward motion of the actuator 460 and prevent separation from the bottom shaft 410; and similarly, the contact of the posterior end 464 of the actuator 460 contacting the second attach end 452 of the top shaft 450, can limit the backward motion of the actuator 460 and prevent separation from the bottom shaft lower section 411 (FIGS. 46-47).

The stylus tool exemplary embodiment 400 third class lever can comprise a split keyring 420 that can fit on the small, ring and middle finger of the user, and through the transverse first aperture 457 of the top shaft 450 which can attach to the bottom shaft 410, can hinge about the fulcrum 411, and the actuator 460 can communicate with the bottom shaft 410 and can self-align relative to a two fingers and thumb grasp, whereby a compliant first cap 430 attached over the distal end 412 of the elongated stem 410 can make contact with a surface. The stylus tool exemplary embodiment 400 can further function as a third class lever with a closed first providing the effort, and the wrist, elbow, shoulder, the body and a combination thereof, articulating as the fulcrum.

The bottom shaft 410, the top shaft 450, the metallic split keyring 420 and the actuator 460 can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The bottom shaft 410, the top shaft 450, the metallic split keyring 420 and the actuator 460 can be produced by conventional metal mill and machining methods, or utilizing additive manufacturing and may also consist of polymer, carbon, carbon fiber and other composites. The bottom shaft 410, the top shaft 450, the metallic split keyring 420 cross section perimeter, and the actuator 460 inner and outer cross section perimeters can be round, curved, polygonal and combination thereof, are further contemplated.

The exemplary embodiment 400 length may be in the range between 4.3 and 4.5 inches. The combined weight for the aluminum versions of the bottom shaft 410, the top shaft 450 and actuator 460, and the steel version of the split keyring 420, and the plastic versions of the compliant first cap 430 and compliant second cap 440 may be in the range between 0.5 and 0.7 ounces.

FIGS. 48-53 depict an exemplary stylus tool embodiment 500. Overview shown in FIG. 48 perspective view, and FIG. 49 plan view.

The stylus tool exemplary embodiment 500 can comprise two shafts, a bottom shaft 510 and a top shaft 550 and a means for securing together, wherein the bottom shaft 510 may be comprised a lower section 511 proximate a frustoconical 519 distal end 512, and an upper section 517 of less diameter than the lower section 511, proximate a first attach end 514, and the two adjacent sections faired with a bottom shaft transition 515. The bottom shaft 510 distal end 512 may be frustoconical 519, planar, chamfered, radiused, and combination thereof. In another aspect, the top shaft 550 can comprise a second attach end 552 and a proximal end 554 with a proximal chamfer 553 and further comprising a transverse second aperture 559 in between a transverse first aperture 557 and the proximal end 554, and wherein the first attach end 514 can connect to the second attach end 552 at a shaft assembly junction 570, the means for securing together can include the bottom shaft 510 first attach end 514 bonded with a bore 558 in the second attach end 552 of the upper shaft 550. The means for securing together can also comprise an interference fit joint, a ferruminated attachment, a welded joint and a threaded connection.

The stylus tool exemplary embodiment 500 can further comprise the transverse first aperture 557 that can support a removably and pivotably docked metallic split keyring 520 which can function as a third-class lever fulcrum 551 (FIGS. 50-51), and can be ergonomically sized to circumferentially communicate with the base of the proximal phalanx of the user's finger, and can also accommodate a multitude of keys attached thereon. Additionally, the transverse first aperture 557 can be sized by drilling the appropriate size aperture to envelop a single loop 526 and resist the transit of the full metallic split keyring 520, such that the metallic split keyring 520 can be substantially contained in circumferential rotation; clockwise by a first end 522 and counterclockwise by a second end 524.

The stylus tool exemplary embodiment 500 can also comprise a compliant first cap 530 comprising a closed end 532, and an open end 534 with an orifice 536, and the compliant first cap 530 can be removably coupled with the bottom shaft 510 via the orifice 536 sliding over the distal end 512 thereof. The compliant first cap 530 can comprise a polymer, and can be metallically coated, infused by dispersed conductive carbon, carbon nanotubes, aluminum, nickel, steel wool, silver particles, copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof. The compliant first cap 530 and the compliant second cap 540 inner and outer cross section perimeters can be round, curved, polygonal and combination thereof that can match the stem geometry.

Further, the stylus tool exemplary embodiment 500 can comprise a means for ejection an actuator 560 comprising an anterior end 562 and a posterior end 564; and at least two bores; an anterior bore 567 proximate the anterior end 562, and a posterior bore 569 proximate the posterior end 564, and the two adjacent bores connected by an actuator bore transition 565. Further, the actuator 560 can be axially confined by the assembly of the bottom shaft 510 and the top shaft 550 at the shaft assembly junction 570, and can communicate axially and concurrently by slidably enveloping parts of the bottom shaft lower section 511 and the bottom shaft upper section 517; and wherein the actuator 560 range of motion enfolded by the contact of the bottom shaft transition 515 and an actuator bore transition 565 as the forward extent, and the contact of the actuator posterior end 564 and the top shaft second attach end 552 as the rearward extent. The ejection mechanism can additionally comprise a keyring 520 connected to the top shaft 550 via the transverse first aperture 557 near the proximal end 554 of the top shaft 550. The actuator 560 can be moved to eject the compliant first cap 530, utilizing one or two hands, by grasping a substantially ribbed outer surface 566, which can improve the grip of the grasping fingers, of the actuator 560, and axially sliding upon the bottom shaft 510, in the direction of the compliant first cap 530, and exerting an axial compressive force on the open end 534 of the compliant first cap 530, and synchronously effecting an axial tensile force through: the shaft assembly junction 570, the top shaft 550, the transverse first aperture 557, and the keyring 520, which can be worn by a chosen finger which can hold the stems from moving. The actuator 560 anterior end 564 can force the compliant first cap 530 and open end 534 to separate from the bottom shaft 510 (FIGS. 52-53).

The stylus tool exemplary embodiment 500 means for activating a capacitive touchscreen can comprise the bottom shaft 510 that can have a frustoconical end 519, that can permit improved visual feedback to more accurately contact and activate the capacitive touchscreen, and the top shaft 550 secured together, and the top shaft 550 with a transverse first aperture 557 near the proximal end 554 connected to the split keyring 520 that can be worn on the index finger of the user, and the actuator 560 can axially communicate with the bottom shaft 510, and can self-align to a finger and thumb grasp. Whereby some capacitive touchscreens require a greater surface contact area for activation, thereby the anterior end 562 of the actuator 560 can activate a capacitive touchscreen by means of axially communicating with the bottom shaft 510 and can haptically generate tactile feedback by the user physically referencing the contact of the distal end 512 with the surface, and self-aligning with the aforesaid. Also, the compliant first cap 530 attached to the distal end 512 of the bottom shaft 510, and the distal end 512 can each separately make contact and communicate with a touchscreen. Furthermore, the actuator bore transition 565 contacting the bottom shaft transition 515 can limit the forward motion of the actuator 560 and prevent separation from the bottom shaft 510; and similarly, the contact of the posterior end 564 of the actuator 560 contacting the second attach end 552 of the top shaft 550, can limit the backward motion of the actuator 560 and prevent separation from the bottom shaft lower section 511 (FIGS. 52-53).

The stylus tool exemplary embodiment 500 third class lever can comprise a split keyring 520 that can fit on the small, ring and middle finger of the user, and through the transverse first aperture 557 of the top shaft 550 attached to the bottom shaft 510, can hinge about the fulcrum 551, and the actuator 560 can communicate with the bottom shaft 510 and can self-align relative to a two fingers and thumb grasp, whereby a compliant first cap 530 attached over the distal end 512 of the elongated stem 510 can make contact with a surface. The stylus tool exemplary embodiment 500 can further function as a third class lever with a closed first providing the effort, and the wrist, elbow, shoulder, the body and a combination thereof, articulating as the fulcrum.

The bottom shaft 510 distal end 512 may be frustoconical, planar, chamfered radiused and a combination thereof. The acute angle frustoconical taper of the distal end 512 in the absence of a compliant first cap 530, exposed in conjunction with a retracted actuator 560 (FIG. 52), can allow the frustoconical tip 519 to provide enhanced user visual acuity and reduced screen obstruction in locating and centering small pixel clusters such as diminutive icons and other small graphic user interfaces that may be present in handheld smart device touchscreens such as cellphones, and may assist in more precise placement of the stylus tool 500 on a capacitive touchscreen, thereafter the anterior end 562 of the actuator 560 may slide to an extended position to, if necessary, to activate the capacitive touchscreen, however the actuator can be guided until the actuator bore transition 565 contacts the bottom shaft transition 515; this limiting the actuator 760 forward movement and preventing the actuator 760 from sliding completely off the bottom shaft 710 (FIG. 53).

The bottom shaft 510, the top shaft 550, the metallic split keyring 520 and the actuator 560 can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The bottom shaft 510, the top shaft 550, the metallic split keyring 520 and the actuator 560 can be produced by conventional metal mill and machining methods, or utilizing additive manufacturing and may also consist of polymer, carbon, carbon fiber and other composites. The bottom shaft 510, the top shaft 550, the metallic split keyring 520 cross section perimeter and the actuator 560 inner and outer cross section perimeters can be round, curved, polygonal and combination thereof, are further contemplated.

The length of the exemplary embodiment 500 may be in the range between 4.3 and 4.5 inches. The combined weight for the aluminum versions of the bottom shaft 510, the top shaft 550 and actuator 560, and the steel version of the split keyring 520 and the plastic versions of the compliant first cap 530 may be in the range between 0.5 and 0.7 ounces.

FIGS. 54-62 depict an exemplary stylus tool embodiment 600. Overviews shown in FIG. 54 perspective view, FIG. 55 perspective deconstructed view, and FIG. 60 plan view.

The stylus tool exemplary embodiment 600 can comprise an elongated stem 610 having a bottom stem segment 618 proximate a distal end 612 with a distal chamfer 613 (FIG. 57), and a top stem segment 619, of less diameter than the bottom stem segment 618, proximate a proximal end 614 with a proximal chamfer 616, and a stem transition 615 connecting the two segments. The distal end 612 may be planar, chamfered, radiused, frustoconical, and combination thereof.

The stylus tool exemplary embodiment 600 can further comprise a transverse first aperture 617 that can support a removably and pivotably docked metallic split key ring 620 (FIG. 59) which can function as a third-class lever fulcrum 611 (FIGS. 61-62), and can be ergonomically sized to circumferentially communicate with the base of the proximal phalanx of the user's finger, and can also accommodate a multitude of keys attached thereon. Additionally, the transverse first aperture 617 can be sized by drilling the appropriate size aperture to envelop a single loop 626 and resist the transit of the full metallic split keyring 620, such that the metallic split keyring 620 can be substantially contained in circumferential rotation; clockwise by a first end 622 and counterclockwise by a second end 624.

The stylus tool exemplary embodiment 600 can also comprise a compliant cap 630 comprising a closed end 632 and an open end 634 with an orifice 636 (FIG. 56), the compliant cap 630 removably coupled with the bottom stem segment 618 via the orifice 636 sliding over the distal end 612 thereof. The compliant cap 630 can comprise a polymer, and may be metallically coated, infused by dispersed conductive carbon, carbon nanotubes, aluminum, nickel, steel wool, silver particles, or copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone, and plastic variants made from cellulose, corn, cotton, fermented plant starch derivatives, and combination thereof. The compliant cap 630 inner and outer cross section perimeters can be round, curved, polygonal and combination thereof that can match the stem geometry.

The stylus tool exemplary embodiment 600 can still further comprise, a retainer 670 comprising an internal passage 676, a front end 672 and a back end 674, and the retainer 670 can be axially and slidably docked with the top stem portion 619 in between the actuator posterior end 664 and the transverse first aperture 617 which can be transited by the split keyring 620 which can limit the movement of the retainer 670.

Further, the stylus tool exemplary embodiment 600 can comprise a means for ejection of removably separating the compliant first cap 630 from the bottom stem surface 618. The ejection mechanism comprises an actuator 660 (FIG. 58), that can have a posterior bore 669 proximate a posterior end 664; an anterior bore 667 proximate an anterior end 662, and the two bores can be joined by an actuator bore transition 665, whereby the actuator 660 can axially, slidably and concurrently communicate with the bottom stem surface 618 and the top stem surface 619, whereby the range of motion of the actuator 660 enfolded by the contact of the stem transition 615 and the actuator bore transition 665 as the forward extent, and the contact of the actuator 660 posterior end 664 and the retainer 670 front end 672 as the backward extent, and the mechanism additionally comprising a keyring 620 connected to the elongated stem 610 via the transverse aperture 617, in between the proximal end 614 of the elongated stem 610 and the retainer 670 docked with the elongated stem 610. The grasped actuator 660 can be moved axially by applying a force in the direction of the compliant cap 630, and producing a resultant axial tensile force through the transverse aperture 617 of the stem 610 on the keyring 620 which can be worn on a chosen finger, can hold the stem 610 in place. The actuator 660 anterior end 662 can force the compliant cap 630 open end 634 to separate completely from the distal end 612 of the elongated stem 610.

The stylus tool exemplary embodiment 600 means for activating a capacitive touchscreen can comprise an elongated stem 610 with a transverse aperture 617 near the proximal end 614 connected to the split keyring 620 that can be worn on the index finger of the user, and the actuator 660 can axially communicate with the elongated stem 610, whereby a compliant first cap 630 attached to the distal end 612 of the elongated stem 610 can make contact with the touchscreen. Further, some capacitive touchscreens require a greater surface contact area for activation, accordingly the compliant first cap 630 can be ejected, and the anterior end 662 of the actuator 660 can activate a capacitive touchscreen by means of axially communicating with the elongated stem 110 and can haptically generate tactile feedback by the user physically referencing the contact of the distal end 112 with the surface, and self-aligning with the aforesaid. Furthermore, the actuator bore transition 665 contacting the stem transition 615 can limit the forward motion of the actuator 660 and prevent separation from elongated stem 610, and similarly the contact of the posterior end 664 of the actuator 660 contacting the front end 672 of the retainer 670 which can abut at the back end 674 the split keyring 620, can limit the backward motion of the actuator 660 and prevent separation from the bottom stem portion 618 of the elongated stem 610.

The stylus tool exemplary embodiment 600 third-class lever can comprise a split keyring 620 that can fit on the small, ring and middle finger of the user, and through the transverse first aperture 617, the elongated stem 610 can hinge about the fulcrum 611, and the actuator 660 can communicate with the elongated stem 610 and can self-align relative to a two fingers and thumb grasp, whereby a compliant first cap 630 attached over the distal end 612 of the elongated stem 610 can make contact with a surface. The stylus tool exemplary embodiment 600 can further function as a third-class lever with a closed first providing the effort, and the wrist, elbow, shoulder, the body and a combination thereof, articulating as the fulcrum.

The elongated stem 610, the metallic split keyring 620, the actuator 660 and the retainer 670 can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The elongated stem 610, the metallic split keyring 620 and the actuator 660 can be produced by conventional metal mill and machining methods, or utilizing additive manufacturing and may also consist of polymer, carbon, carbon fiber and other composites The elongated stem 610, the metallic split keyring 620 cross section perimeter and the actuator 660 and the retainer 670 inner and outer cross section perimeters can be round, curved, polygonal and combination thereof, are further contemplated.

The retainer 670 can also comprise a polymer, and can be metallically coated, infused by dispersed conductive carbon, carbon nanotubes, aluminum, nickel, steel wool, silver particles, or copper fibers, metallized glass, and other metallic fillers to impart metallic properties, and may also include chemical vapor deposition, electrically conductive and antimicrobial additives, can injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof.

The exemplary embodiment 600 length may be in the range between 3.5 and 3.7 inches. The combined weight for the aluminum versions of the elongated stem 610, actuator 660 and retainer 670, the steel version of the split keyring 620 and the plastic version of the compliant first cap 630 may be in the range between 0.5 and 0.7 ounces.

Figure 63:
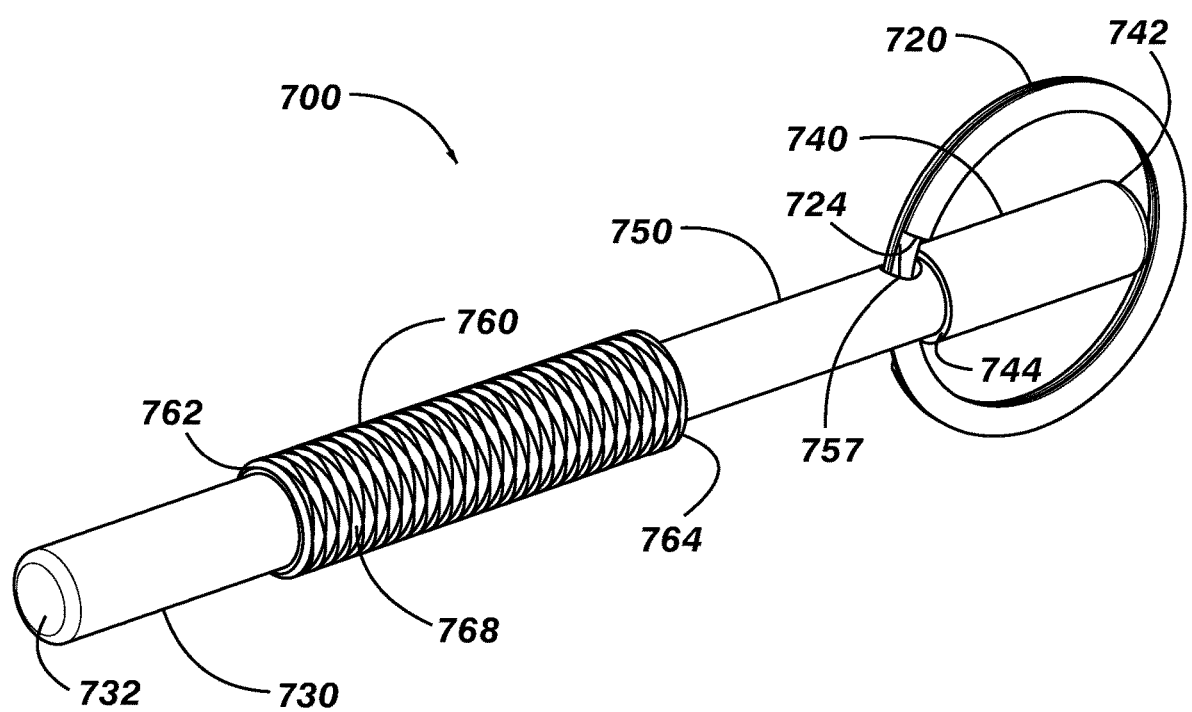
FIG. 63 is a perspective view of the stylus tool according to some exemplary embodiments of the present disclosure.
Figure 70:
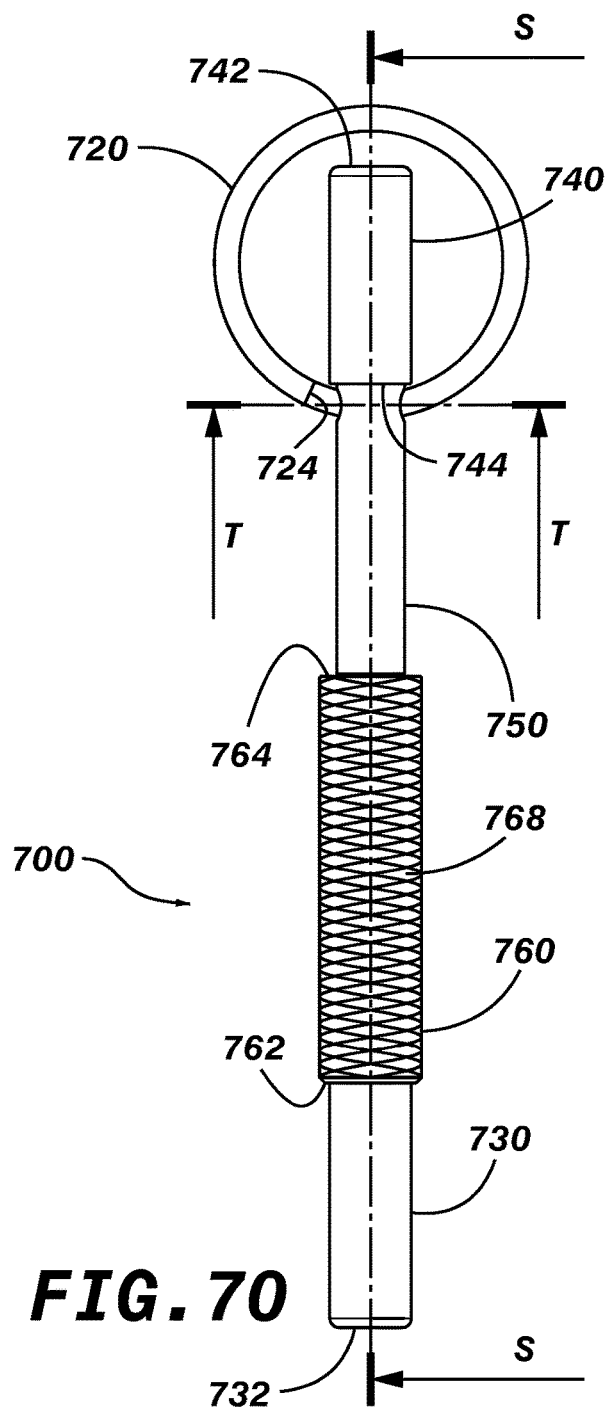
FIG. 70 is a side view of the stylus tool according to some exemplary embodiments of the present disclosure.
Figure 71:
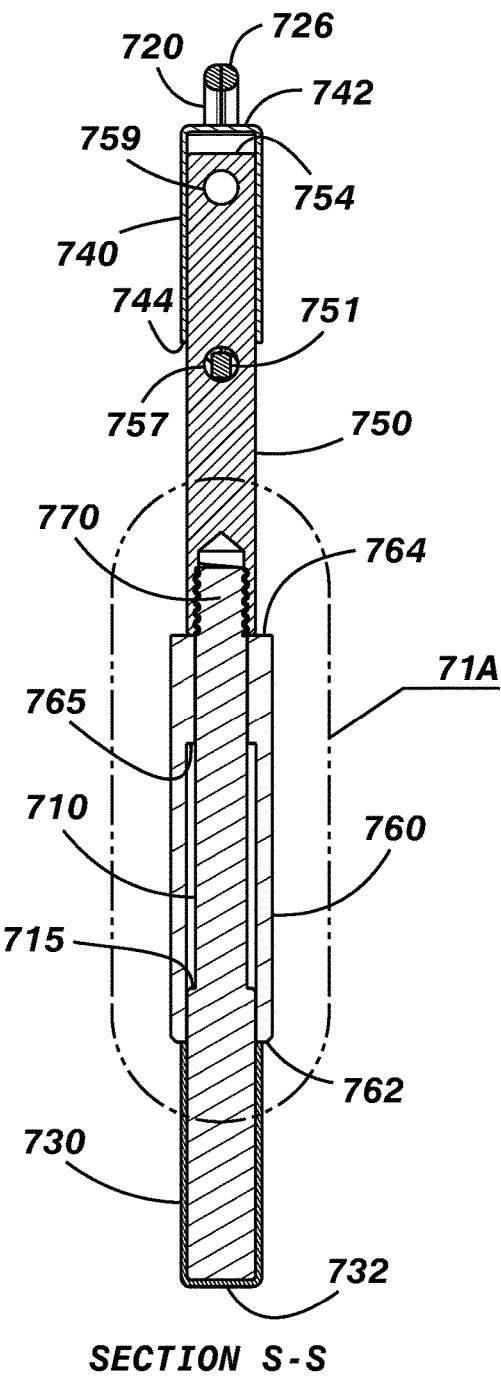
FIG. 71 is an axial cross-sectional view S-S of FIG. 70 of the stylus tool according to some exemplary embodiments of the present disclosure.
Figure 72:
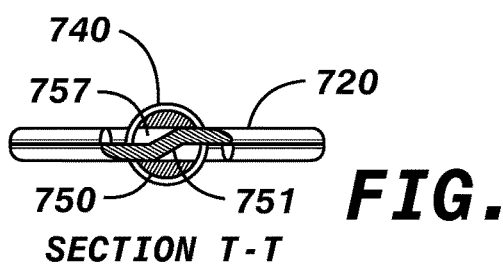
FIG. 72 is a cross-sectional view T-T of FIG. 70 through the centerline of the first aperture and fulcrum of the stylus tool according to the exemplary embodiments of the present disclosure.
Figure 73:
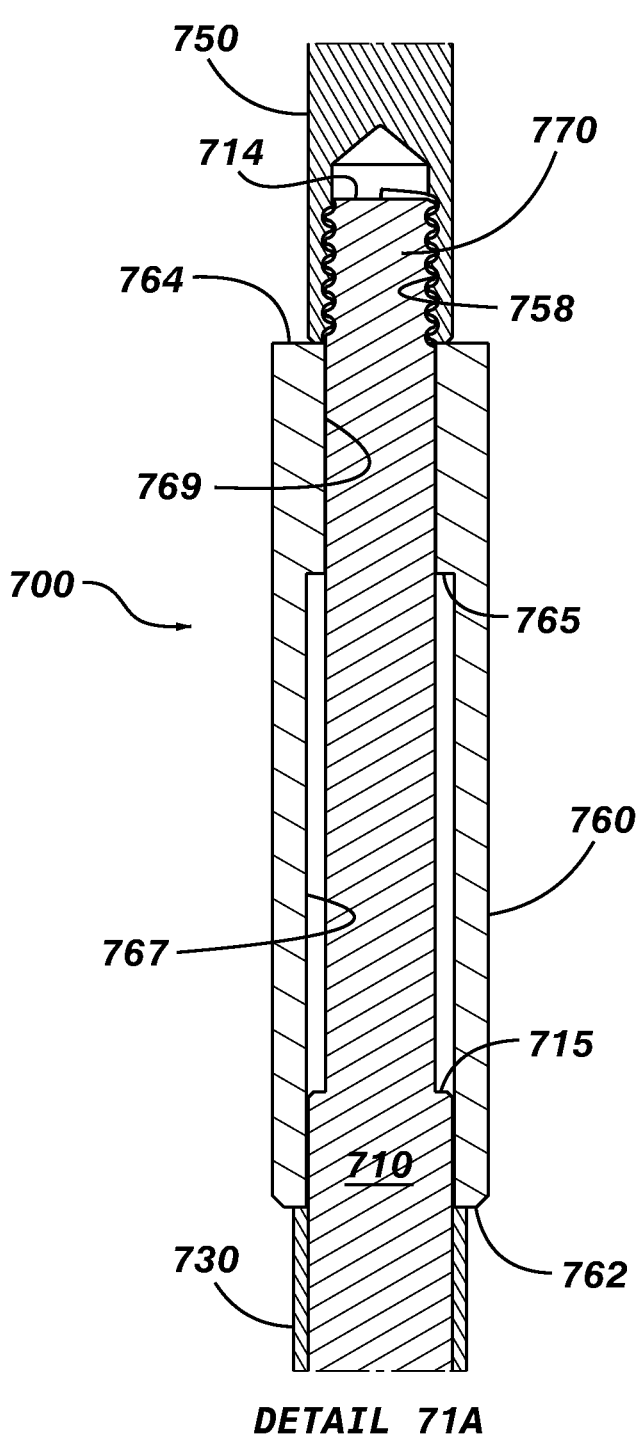
FIG. 73 is a close-up section view 71A of FIG. 71 of the captive actuator assembly of the stylus tool according to some exemplary embodiments of the present disclosure.
Figure 74:
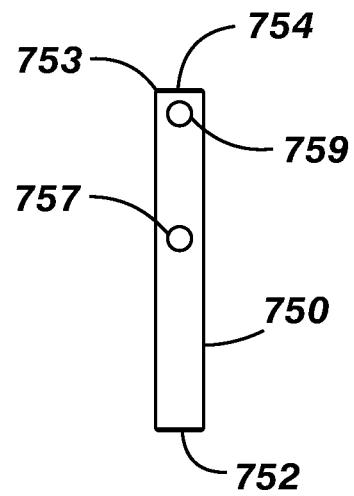
FIG. 74 is a detail view of the upper shaft of the stylus tool according to some exemplary embodiments of the present disclosure.
Figure 75:
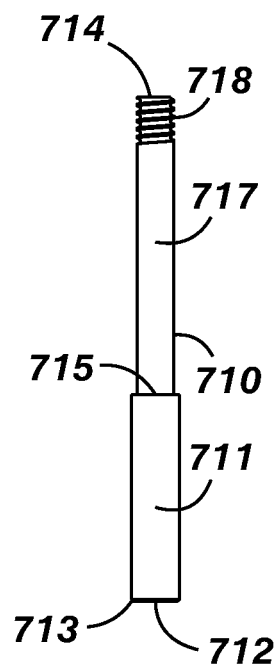
FIG. 75 is a detail view of the lower shaft of the stylus tool according to some exemplary embodiments of the present disclosure.
Figure 76:
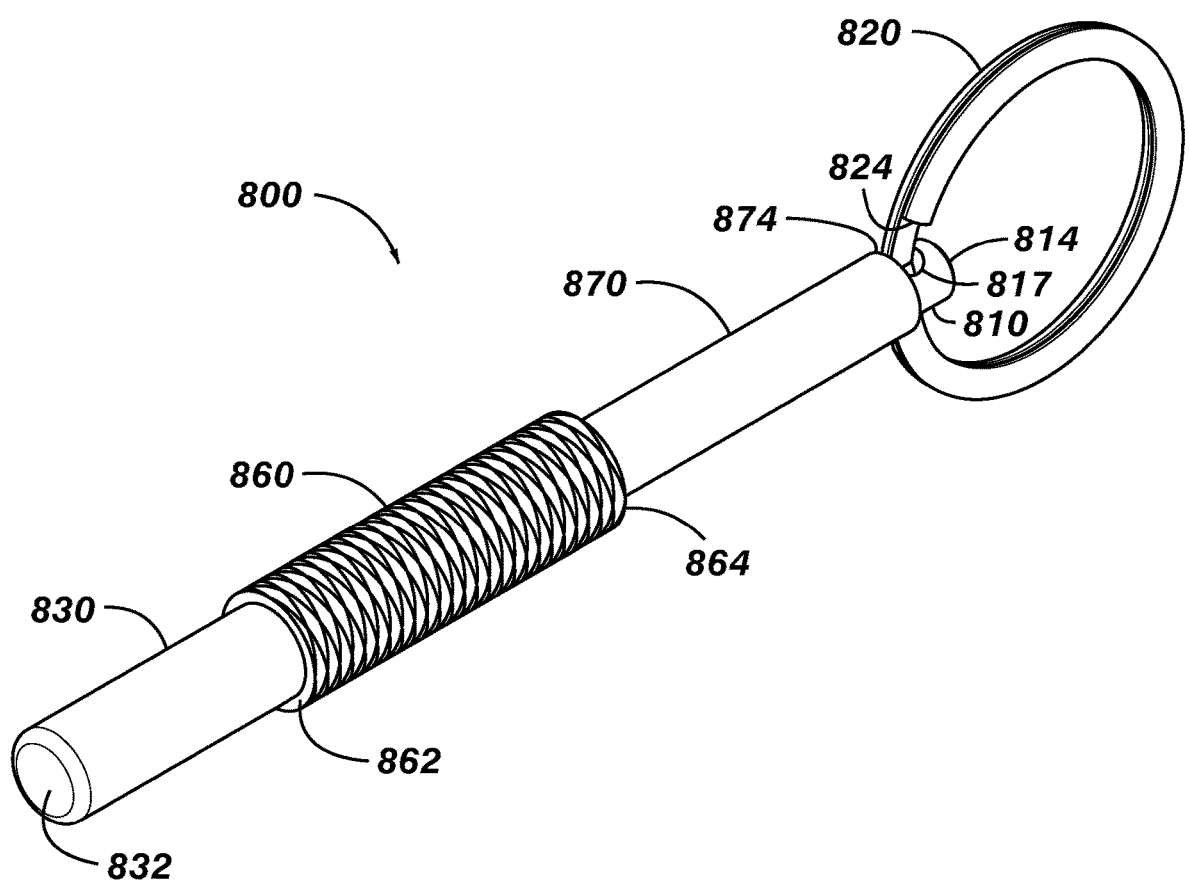
FIG. 76 is a perspective view of the stylus tool according to some exemplary embodiments of the present disclosure.
Figure 81:
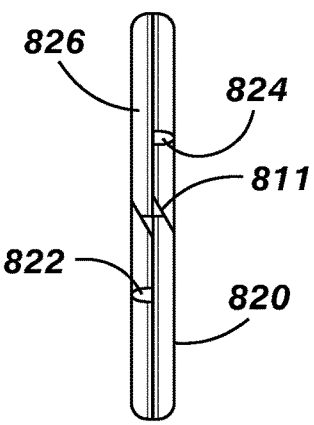
FIG. 81 is a side view of the split key ring of the stylus tool according to some exemplary embodiments of the present disclosure.
Figure 77:
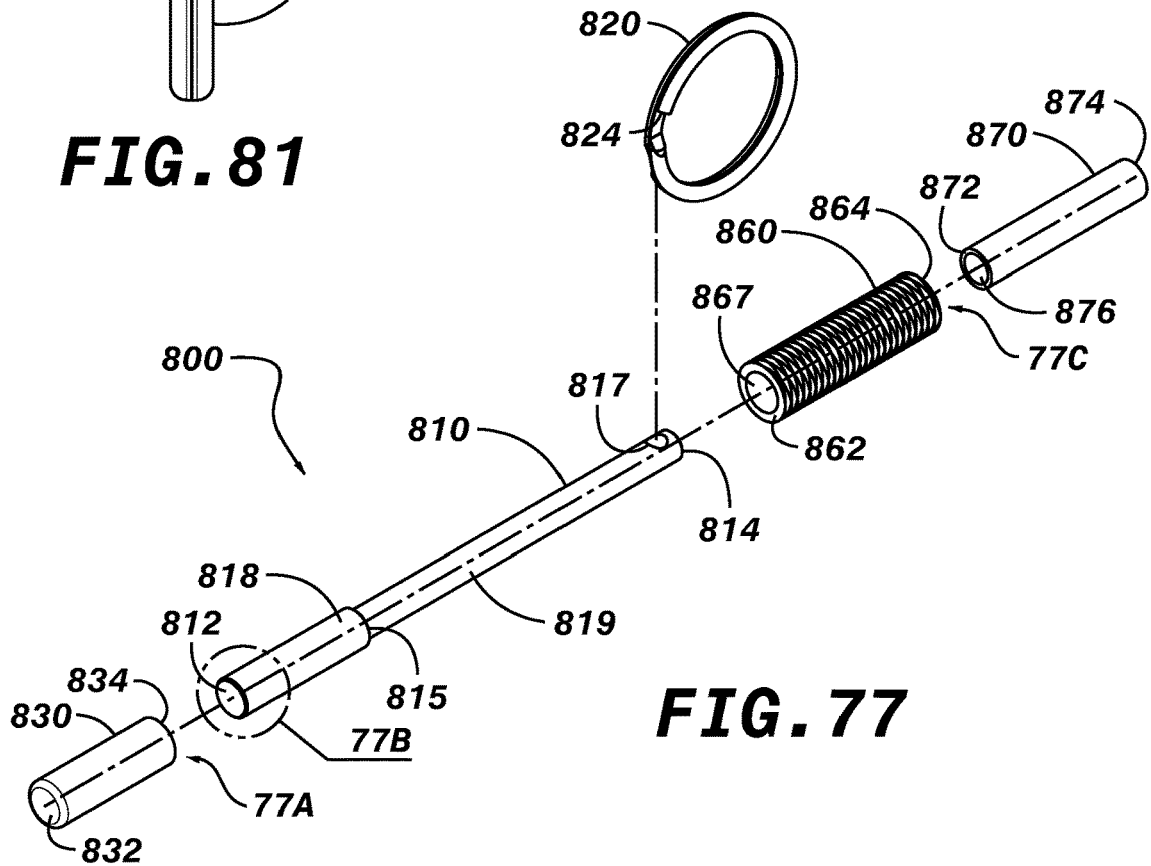
FIG. 77 is a perspective deconstructed view of the stylus tool according to some exemplary embodiments of the present disclosure.
Figure 78:
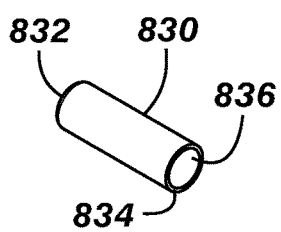
FIG. 78 is a detail view 77A of FIG. 77 of the first cap of the stylus tool according to some exemplary embodiments of the present disclosure.
Figure 79:
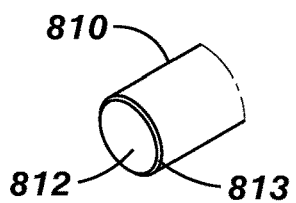
FIG. 79 is a detail view 77B of FIG. 77 of the distal end of the stepped stem of the stylus tool according to some exemplary embodiments of the present disclosure.
Figure 80:
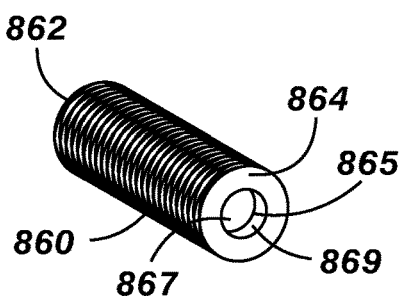
FIG. 80 is a detail view 77C of FIG. 77 of the proximal end of the captive actuator of the stylus tool according to some exemplary embodiments of the present disclosure.

FIGS. 63-75 depict an exemplary stylus tool embodiment 700. A portable microbial surface contact mitigation stylus tool that can mount on a finger and can be grasped by a user can mitigate hand contact with surfaces and can electrically interact with a capacitive device touchscreen, and the rigid stylus tool can effect force transmission and motion to a movable surface. Overview shown in FIG. 63 perspective view, FIG. 64 perspective deconstructed view, and FIG. 70 plan view.

The stylus tool exemplary embodiment 700 can comprise two shafts, a bottom shaft 710 and a top shaft 750 and a means for securing together; wherein the bottom shaft 710 (FIG. 75) can comprise a lower section 711 proximate a distal end 712 with a distal chamfer 713 (FIG. 69), and an upper section 717 of less diameter than the lower section 711, proximate a first attach end 714; and the two adjacent sections faired with a bottom shaft transition 715. The bottom shaft 710 distal end 712 may be planar, chamfered, radiused, frustoconical and combination thereof. In another aspect, the top shaft 750 (FIG. 74) can comprise a second attach end 752 (FIG. 66) and a proximal end 754 with a proximal chamfer 753 (FIG. 67), and further comprise a transverse first aperture 757 and a transverse second aperture 759 that can be in between the transverse first aperture 757 and the proximal end 754; and wherein the first attach end 714 is connected to the second attach end 752 at a shaft assembly junction 770. Furthermore, the means for securing together may include an external thread 718 at the first attach end 714 and a tapped hole 758 in the second attach end 752 (FIG. 73) The means for securing together can alternatively comprise an interference fit joint, a ferruminated attachment, a bonded interface and a welded joint.

The stylus tool exemplary embodiment 700 can further comprise the transverse first aperture 717 that can support a removably and pivotably docked metallic split key ring 720 (FIG. 68), which can function as a third-class lever fulcrum 751 (FIGS. 71-72); and can be ergonomically sized to circumferentially communicate with the base of the proximal phalanx of the user's finger, and can also accommodate a multitude of keys attached thereon. Additionally, the transverse first aperture 757 can be sized by drilling the appropriate size aperture to envelop a single loop 726 and resist the transit of the full metallic split keyring 720, such that the metallic split keyring 720 can be substantially contained in circumferential rotation; clockwise by a first end 722 and counterclockwise by a second end 724.

The stylus tool exemplary embodiment 700 can also comprise a compliant first cap 730 comprising a closed end 732, and an open end 734 with an orifice 736, (FIG. 65) and the compliant first cap 730 can be removably coupled with the bottom shaft 710 via the orifice 736 sliding over the distal end 712 thereof, and further comprising a compliant second cap 740 having a closed end 742, and an open end 744 with an orifice 746. The compliant second cap 740 can be removably coupled with the top shaft 750 via the orifice 746 sliding over the proximal end 754 and the second aperture 759 thereof. The compliant first cap 730 and the compliant second cap 740, can comprise a polymer, and can be metallically coated, infused by dispersed conductive carbon, carbon nanotubes, aluminum, nickel, steel wool, silver particles, copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof. The compliant first cap 730 and the compliant second cap 740 inner and outer cross section perimeters can be round, curved, polygonal and combination thereof that can match the stem geometry.

Further, the stylus tool exemplary embodiment 700 can comprise a means for ejection an actuator 760 with a substantially knurled outer surface 768, comprising an anterior end 762 and a posterior end 764; and at least two bores; an anterior bore 767 proximate the anterior end 762 and a posterior bore 769 proximate the posterior end 764 and the two adjacent bores connected by an actuator bore transition 765; and wherein the actuator 760 can be axially confined by the assembly of the bottom shaft 710 and the top shaft 750 at the shaft assembly junction 770, and can communicate axially and concurrently by slidably enveloping part of the bottom shaft lower section 711 and the bottom shaft upper section 717; and wherein the actuator 760 range of motion enfolded by the contact of the bottom shaft transition 715 and the actuator bore transition 765 as the forward extent, and the contact of the actuator posterior end 764 and the top shaft second attach end 752 as the backward extent. The ejection mechanism can additionally comprise a keyring 720 connected to the top shaft 750 via a transverse first aperture 717 toward the proximal end 714 of the top shaft 750. The actuator 760 can be moved to eject the compliant first cap 730, utilizing one or two hands, by grasping the actuator 760, and axially sliding upon the bottom shaft 410, in the direction of the compliant first cap 730, and exerting an axial compressive force on the open end 734 of the compliant first cap 730, and synchronously effecting an axial tension force through the shaft assembly junction 770, the top shaft 750, the transverse first aperture 717, the fulcrum 711 and the keyring 720, which can be worn by a chosen finger which can hold the stems from moving. The actuator 760 anterior end 764 can force the compliant first cap 730 and open end 734 to separate from the bottom shaft 710. Following the ejection of the compliant first cap 730, the compliant second cap 740 can be removed from the proximal end 754 of the top shaft 750, and removably coupled with the distal end of the bottom shaft 710, for further capped use of stylus tool exemplary embodiment 700.

The stylus tool exemplary embodiment 700 means for activating a capacitive touchscreen can comprise two shafts secured together, a bottom shaft 710 and a top shaft 750 with a transverse first aperture 757 near the proximal end 714 connected to the split keyring 420 that can be worn on the index finger of the user, and the actuator 760 can axially communicate with the bottom shaft 710, whereby a compliant first cap 730 attached to the distal end 712 of the bottom shaft 710 can make contact with the touchscreen. Further, some capacitive touchscreens require a greater surface contact area for activation, accordingly the compliant first cap 730 can be ejected, and the anterior end 762 of the actuator 760 can activate a capacitive touchscreen by means of axially communicating with the bottom shaft 710 can haptically generate tactile feedback by the user physically referencing the contact of the distal end 712 with the surface, and self-aligning with the aforesaid. Furthermore, the actuator bore transition 765 contacting the bottom shaft transition 715 can limit the forward motion of the actuator 760 and prevent separation from the bottom shaft 710; and similarly, the contact of the posterior end 764 of the actuator 760 contacting the second attach end 752 of the top shaft 750, can limit the backward motion of the actuator 760 and prevent separation from the bottom shaft lower section 711.

The stylus tool exemplary embodiment 700 third class lever can comprise a split keyring 720 that can fit on the small, ring and middle finger of the user, and through the transverse first aperture 757 of the top shaft 750 attached to the bottom shaft 710, can hinge about the fulcrum 751, and the actuator 760 can communicate with the bottom shaft 710 and can self-align relative to a two fingers and thumb grasp, whereby a compliant first cap 730 attached over the distal end 712 of the elongated stem 710 can make contact with a surface. The stylus tool exemplary embodiment 700 can further function as a third-class lever with a closed first providing the effort, and the wrist, elbow, shoulder, the body and a combination thereof, articulating as the fulcrum.

The bottom shaft 710, the top shaft 750, the metallic split keyring 720 and the actuator 760 can be made of an electrically conductive metal such as aluminum, aluminum alloy, copper, copper alloy, steel, steel alloy, titanium, titanium alloy, brass, bronze, tungsten, tungsten alloy, zinc and zinc alloy. and combination thereof. The bottom shaft 710, the top shaft 750, the metallic split keyring 720 and the actuator 760 can be produced by conventional metal mill and machining methods, or utilizing additive manufacturing and may also consist of polymer, carbon, carbon fiber and other composites. The bottom shaft 710, the top shaft 750, the metallic split keyring 720 cross section perimeter and the actuator 760 inner and outer cross section perimeters can be round, curved, polygonal and combination thereof that can match the stem geometry are further contemplated.

The exemplary embodiment 700 length may be in the range between 4.3 and 4.5 inches. The combined weight for the aluminum versions of the bottom shaft 710 and the top shaft 750, and the steel version of the split keyring 720 and the plastic versions of the compliant first cap 730 and compliant second cap 740 may be in the range between 0.5 and 0.7 ounces.

FIGS. 76-84 depict an exemplary stylus tool embodiment 800. A portable microbial surface contact mitigation stylus tool that can mount on a finger and can be grasped by a user can mitigate hand contact with surfaces and can electrically interact with a capacitive device touchscreen, and the rigid stylus tool can effect force transmission and motion to a movable surface. Overview shown in FIG. 76 perspective view, FIG. 77 perspective deconstructed view, and FIG. 82 plan view.

The stylus tool exemplary embodiment 800 can comprise an elongated stem 810 having a proximal end 814 and a distal end 812, and wherein the elongated stem 810 can have a bottom stem segment 818 proximate the distal end 812 with a distal chamfer 813 (FIG. 79); and a top stem segment 819 of less diameter than the bottom stem portion 818, proximate the proximal end 814 with a proximal chamfer 816; and a stem transition 815 connecting the two segments. The distal end 812 may be planar, chamfered, radiused, frustoconical and combination thereof.

The stylus tool exemplary embodiment 800 can further comprise a transverse aperture 817 proximate to the proximal end 814; and wherein the transverse aperture 817 supports a removably and pivotably docked metallic split keyring 820 (FIG. 81), wherein part of which can be a third-class lever fulcrum 811 (FIGS. 83-84), and can be ergonomically sized to circumferentially communicate with the base of the proximal phalanx of the user's finger and can also accommodate a multitude of keys attached thereon.

Additionally, the transverse first aperture 817 can be sized by drilling the appropriate size aperture to envelop a single loop 826 and resist the transit of the full metallic split keyring 820, such that the metallic split keyring 820 can be substantially contained in circumferential rotation; clockwise by a first end 822 and counterclockwise by a second end 824.

The stylus tool exemplary embodiment 800 can also comprise a compliant cap 830 comprising a closed end 832 and an open end 834 with an orifice 836 (FIG. 78), the compliant cap 830 removably coupled with the bottom stem segment 818 via the orifice 836 sliding over the distal end 812 thereof. The compliant cap 830 can comprise a polymer, and may be metallically coated, infused by dispersed conductive carbon, carbon nanotubes, aluminum, nickel, steel wool, silver particles, or copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone, and plastic variants made from cellulose, corn, cotton, fermented plant starch derivatives, and combination thereof. The compliant cap 830 inner and outer cross section perimeters can be round, curved, polygonal and combination thereof that can match the stem geometry.

The stylus tool exemplary embodiment 800 can still further comprise, a retainer 870 comprising an internal passage 876, a front end 872 and a back end 874, the retainer 870 can be axially and slidably docked with the top stem portion 819 in between the actuator posterior end 864 and the transverse first aperture 817 that can be transited by the split keyring 820, limiting the movement of the retainer 870.

Further, the stylus tool exemplary embodiment 800 can comprise a means for ejection of removably separating the compliant cap 830 from the bottom stem segment 818. The ejection mechanism comprises an actuator 860 (FIG. 80), with a substantially knurled outer surface 868, that can have a posterior bore 869 proximate a posterior end 864; an anterior bore 867 proximate an anterior end 862, and the two bores can be joined by an actuator bore transition 865, whereby the actuator 860 can communicate axially and concurrently by slidably enveloping the bottom stem surface 818 and the top stem surface 819, whereby the range of motion of the actuator enfolded by the contact of the stem transition 815 and the actuator bore transition 865 as the forward extent, and the contact of the actuator 860 posterior end 864 and a retainer 870 front end 872 as the backward extent, and the mechanism additionally comprising a keyring 820 connected to the elongated stem 810 via the transverse aperture 817 in between the proximal end 814 of the elongated stem 810 and the retainer 870 docked with the elongated stem 810. The actuator 260 can be moved to eject the compliant cap 230, utilizing one or two hands, by grasping the substantially knurled outer surface 868, which can improve the grip of the grasping fingers, of the actuator 260, and applying an axial force moving in the direction of the compliant cap 830, and a resultant axial tensile force through the transverse aperture 817 of the stem 810 on the keyring 820 which can be worn on a chosen finger and can hold the stem 610 in place. The actuator 860 anterior end 862 can force the compliant cap 830 open end 834 to separate completely from the distal end 812 of the elongated stem 810.

The stylus tool exemplary embodiment 800 means for activating a capacitive touchscreen can comprise an elongated stem 810 with the transverse aperture 817 near the proximal end 814 connected to the split keyring 820 that can be worn on the index finger of the user, and the actuator 860 can axially communicate with the elongated stem 810, whereby the compliant first cap 830 attached to the distal end 812 of the elongated stem 810 can make contact with the touchscreen. Further, some capacitive touchscreens require a greater surface contact area for activation, accordingly the compliant first cap 830 can be ejected, and the anterior end 862 of the actuator 860 can activate a capacitive touchscreen by means of axially communicating with the elongated stem 810 and can haptically generate tactile feedback by the user physically referencing the contact of the distal end 812 with the surface, and self-aligning with the aforesaid. Furthermore, the actuator bore transition 865 contacting the stem transition 815 can limit the forward motion of the actuator 860 and can prevent separation from the elongated stem 810; and similarly, the contact of the posterior end 864 of the actuator 860 contacting the front end 882 of the retainer 880 which can abut at the back end 874 the split keyring 820, can limit the backward motion of the actuator 860 and prevent separation from the bottom stem portion 818 of the elongated stem 810.

The stylus tool exemplary embodiment 800 third-class lever can comprise a split keyring 820 that can fit on the small, ring and middle finger of the user, and through the transverse first aperture 817, the elongated stem 810 can hinge about the fulcrum 811, and the actuator 860 can communicate with the elongated stem 810 and can self-align relative to a two fingers and thumb grasp, whereby a compliant first cap 830 attached over the distal end 812 of the elongated stem 810 can make contact with a surface. The stylus tool exemplary embodiment 800 can further be a third-class lever with a closed first providing the effort, and the wrist, elbow, shoulder, the body and a combination thereof, articulating as the fulcrum.

The elongated stem 810, the metallic split keyring 820, the actuator 860 and the retainer 870 can be made of an electrically conductive metal such as aluminum, aluminum alloy, copper, copper alloy, steel, steel alloy, titanium, titanium alloy, brass, bronze, tungsten, tungsten alloy, zinc and zinc alloy and combination thereof. The elongated stem 810, the metallic split keyring 820 and the actuator 860 can be produced by conventional metal mill and machining methods, or utilizing additive manufacturing and may also consist of polymer, carbon, carbon fiber and other composites. The elongated stem 610, the metallic split keyring 620 cross section perimeter and the actuator 660 and the retainer 670 inner and outer cross section perimeters can be round, curved, polygonal and combination thereof that can match the stem geometry are further contemplated.

The retainer 870 can also comprise a polymer, and can be metallically coated, infused by dispersed conductive carbon, carbon nanotubes, aluminum, nickel, steel wool, silver particles, or copper fibers, metallized glass, and other metallic fillers to impart metallic properties, and can also include chemical vapor deposition, electrically conductive and antimicrobial additives, and injection molded elastomeric thermoplastics such as polyethylene, polypropylene, plasticized polyvinyl chloride, nylon; and elastomers like synthetic and natural rubber, polyurethane and silicone; and plastic variants made from cellulose, corn, cotton, fermented plant starch derivatives, and combination thereof.

The exemplary embodiment 800 length may be in the range between 3.5 and 3.7 inches. The combined weight for the aluminum versions of the elongated stem 810, actuator 860 and retainer 870: and the steel version of the split keyring 820 and the plastic version of the compliant first cap 830 may be in the range between 0.5 and 0.7 ounces.

A method for use of the stylus tool for contacting surfaces for capacitive device interfaces requiring a larger contact area, the use of the actuator can bridge the gap between the smaller diameter stem tip and the requirement for a larger tip, the diameter of the actuator can be large enough to activate such a screen. Inserting the index finger through the split keyring and sliding the split keyring against the base of the index finger then rotating the stylus tool parallel with the midline of the index finger; and pressing against the stem above the actuator with the thumb, index and middle fingers grasping the actuator can allow the optimum flexure of the fingers and thumb cooperating in harmony and allowing the adjustment the actuator to move to the optimum ergonomic position along the stem allowing the fingers to extend and slide the actuator whereas the face of the proximal tip of the stem and the face of the anterior end of the actuator self-align as the user senses the haptic tactile feedback which can disrupt the electric field on a capacitive screen, thereby initiating an interactive signal to the device.

It is to be understood that the present stylus tool is not limited to the embodiments described above, but encompasses any and all embodiments within the scope of the following claims.

I claim:

1. A portable multipurpose microbial surface contact mitigation stylus tool to mount on a finger and grasped by a user to mitigate hand contact with surfaces and to electrically interact with a capacitive device touchscreen; and the rigid stylus tool effecting force transmission and motion to a movable surface, the stylus tool comprising:
   at least an elongated stem comprising a proximal end and a distal end further comprising:
   at least a transverse first aperture proximate to the proximal end; and
      wherein the first aperture supports a removably and pivotably docked ring comprising a fulcrum of a third-class lever; and
   at least a compliant first cap comprising a closed end and an open end with an orifice removably coupled with the elongated stem; and
   a means for ejection of removably separating the compliant first cap from the elongated stem; and
   wherein the means for ejection includes an actuator that communicates with the elongated stem by axially sliding thereon; and
   a self-aligning means for activating a capacitive device screen.

2. The stylus tool stated in claim 1, wherein the elongated stem having a proximal chamfer at the proximal end, and a distal chamfer at the distal end, and ergonomically sized to fit to a user's hand, such that the distal end extends beyond the user's arched fingers when the ring is circumferentially communicating with the base of the proximal phalange of the wearing finger.

3. The stylus tool stated in claim 1, wherein the elongated stem is comprised of electrically conductive metal selected from the group consisting of aluminum, aluminum alloy, copper, copper alloy, steel, titanium, titanium alloy, brass, bronze, tungsten, tungsten alloy, zinc, zinc alloy and combination thereof.

4. The stylus tool stated in claim 1, wherein the ring is comprised a metallic split keyring ergonomically sized to circumferentially communicate with the base of the proximal phalanx of the user's finger and to accommodate a multitude of keys attached thereon, and wherein the metallic split keyring engages with the transverse first aperture substantially sized to envelop a single loop and resist the transit of the full metallic split keyring, such that the metallic split keyring is substantially contained in circumferential rotation, clockwise by a first end and counterclockwise by a second end.

5. The stylus tool stated in claim 1, wherein the first cap comprises a polymer.

6. The stylus tool stated in claim 1, wherein the means for ejection includes an actuator comprising an anterior end and a posterior end, and an internal passage that communicates with the elongated stem by removably and slidably enveloping axially the elongated stem in between the first cap and the transverse first aperture; the anterior end being proximate the open end of the first cap.

7. The stylus tool stated in claim 1, wherein the actuator comprises an electrically conductive metallic material.

8. The stylus tool stated in claim 1, wherein the elongated stem is further comprised a transverse second aperture.

9. The stylus tool stated in claim 8, further comprising the elongated stem having a transverse second aperture in between the transverse first aperture and the proximal end; and wherein the compliant first cap is coupled to the elongated stem by enveloping the distal end thereof; and further comprising a compliant second cap having a closed end and an open end with an orifice, the compliant second cap is removably coupled with the elongated stem, the orifice sliding over the proximal end and the transverse second aperture thereof, and wherein the means for ejection includes the actuator having an ergonomic substantially arcuate outer surface.

10. The stylus tool stated in claim 8, wherein the increased length elongated stem is further comprised a distal end and a proximal end, and the transverse second aperture in between the transverse first aperture and the distal end; and wherein the compliant first cap is coupled with the elongated stem via the orifice sliding over the distal end thereof; and wherein the means for ejection includes the actuator comprising an ergonomic substantially arcuate textured outer surface.

11. The stylus tool stated in claim 8, wherein the stem is further comprised two shafts, a bottom shaft and a top shaft and a means for securing together; and wherein the bottom shaft is comprised a lower section proximate a distal end and an upper section of lesser diameter than the lower section proximate a first attach end; and the two adjacent sections faired with a bottom shaft transition; and wherein the top shaft is comprised a second attach end and a proximal end and further comprising the transverse first aperture, and the transverse second aperture; and wherein the first attach end of the bottom shaft is connected to the second attach end of the top shaft at a shaft assembly junction; and wherein the compliant first cap is coupled with the bottom shaft via the orifice sliding over the distal end thereof; and wherein the means for ejection includes the actuator comprising an anterior end and a posterior end, comprises at least two bores; an anterior bore proximate the anterior end and a posterior bore proximate the posterior end, and the two adjacent bores connected by an actuator bore transition; and wherein the actuator is confined by the assembly of the bottom shaft and the top shaft at the shaft assembly junction, and communicates slidably and concurrently with the bottom shaft lower section and bottom shaft upper section; and wherein the actuator range of motion enfolded by the contact of the bottom shaft transition and the actuator bore transition as the forward extent, and the contact of the actuator posterior end and the top shaft second attach end as the rearward extent.

12. The stylus tool stated in claim 11, wherein the top shaft comprises the transverse second aperture in between the first transverse aperture and the proximal end; and further comprising a compliant second cap having a closed end, and an open end with an orifice; the second cap removably coupled with the top shaft via the orifice sliding over the proximal end and the second aperture thereof.

13. The stylus tool stated in claim 11, wherein the top shaft comprises the transverse first aperture in between the transverse second aperture and the proximal end; and wherein the means for securing together includes the bottom shaft first attach end secured to a bore of the second attach end of the upper shaft; and wherein the means for ejection includes the actuator having an ergonomic ribbed outer surface, having an anterior end and a posterior end, and at least two bores, having an anterior bore proximate the anterior end and a posterior bore proximate the posterior end, and the two bores joined by an actuator bore transition; and wherein the actuator is confined by the assembly of the lower shaft and upper shaft, and communicating slidably and concurrently with the bottom shaft lower and upper sections; and wherein the actuator range of motion enfolded by the contact of the bottom shaft transition and the actuator bore transition as the forward extent, and the contact of the actuator posterior end and the top shaft second attach end as the aft extent.

14. The stylus tool stated in claim 13, wherein the bottom shaft distal end is frustoconical.

15. The stylus tool stated in claim 1, wherein the elongated stem having a bottom stem portion proximate a distal end; and a top stem portion of lesser diameter than the bottom stem portion proximate the proximal end; and a stem transition connecting the two portions; and wherein the compliant first cap is coupled with the bottom stem surface via the orifice sliding over the distal end thereof; and further comprising a retainer having an internal passage, and a front end and a back end, said retainer removably and axially docked with the top stem surface in between the actuator posterior end and the first aperture; and wherein the means for ejection includes the actuator having an ergonomic textured exterior surface; and having a posterior bore proximate a posterior end and an anterior bore proximate an anterior end; and the two bores joined by an actuator bore transition; and the actuator communicating slidably and concurrently with the bottom stem surface and the top stem surface; and the range of motion of the actuator enfolded by the contact of the stem transition and the actuator bore transition as the forward extent, and the contact of the actuator posterior end and the retainer front end as the rearward extent.

16. The stylus tool stated in claim 15, wherein the retainer is made of a rigid metallic material.

17. A multi-purpose microbial surface contact mitigation stylus tool to mount on a finger and grasped by a user to mitigate hand contact with surfaces and to electrically interact with a capacitive device touchscreen; and the rigid stylus tool effecting force transmission and motion to a movable surface, the stylus tool comprising:
- a bottom shaft and a top shaft and a means for securing together; and
- wherein the bottom shaft is comprised a lower section proximate a distal end and an upper section of lesser diameter than the lower section proximate a first attach end; and the two adjacent sections faired with a bottom shaft transition; and
- wherein the transverse first attach end is connected to the second attach end at a shaft assembly junction; and
- wherein the first aperture supports a removably and pivotably docked split key ring comprising a fulcrum of a third-class lever; and
- wherein a compliant first cap comprising a closed end and an open end with an orifice that is removably coupled with the bottom stem surface via the orifice sliding over the distal end thereof; and
- further comprising a compliant second cap having a closed end, and an open end with an orifice and the second cap removably coupled with the top shaft via the orifice sliding over the proximal end and the second aperture thereof; and
- a means for ejection of removably separating the compliant first cap from the bottom shaft; and
- wherein the means for ejection includes an actuator that communicates with the bottom shaft by axially sliding thereon; and
- wherein the means for ejection includes the actuator comprising an anterior end and a posterior end, comprises at least two bores; an anterior bore proximate the anterior end and a posterior bore proximate the posterior end, and in between the two bores supported by an actuator bore transition; and
- wherein the actuator is confined by the assembly of the bottom shaft and the top shaft at the shaft assembly junction, and communicates slidably and concurrently with the bottom shaft lower section and bottom shaft upper section; and
- wherein the actuator range of motion enfolded by the contact of the bottom shaft transition and the actuator bore transition as the forward extent, and the contact of the actuator posterior end and the top shaft second attach end as the aft extent; and
- a self-aligning means for activating a capacitive device screen.

18. A multi-purpose microbial surface contact mitigation stylus tool to mount on a finger and grasped by a user to mitigate hand contact with surfaces and to electrically interact with a capacitive device touchscreen, and effecting force transmission and motion to a movable surface, the stylus tool comprising:
- an elongated stem having a proximal end and a distal end; and
- wherein the elongated stem having a bottom stem portion proximate a distal end; and
- a top stem portion of lesser diameter than the bottom stem portion proximate the proximal end; and a stem transition connecting the two portions; and
- further comprising a transverse aperture proximate to the proximal end; and
- wherein the transverse aperture supports a removably and pivotably docked key ring comprising a fulcrum of a third-class lever; and
- a compliant cap comprising an open end with an orifice, and a closed end removably coupled with the bottom stem surface via the orifice sliding over the distal end thereof; and
- further comprising a retainer having an internal passage, and a front end and a back end, the retainer removably and axially docked with the top stem surface in between the actuator posterior end and the transverse aperture; and
- a means for ejection of removably separating the compliant cap from the bottom stem surface; and
- wherein the means for ejection includes an actuator that communicates with the elongated stem by axially sliding thereon; and
- wherein the means for ejection includes the actuator comprises a posterior bore proximate a posterior end; an anterior bore proximate an anterior end; and the two bores joined by an actuator bore transition; and the actuator communicating slidably and concurrently with the bottom stem surface and the top stem surface; and the range of motion of the actuator enfolded by the contact of the stem transition and the actuator bore transition as the forward extent, and the contact of the actuator posterior end and the retainer front end as the aft extent; and
- a self-aligning means for activating a capacitive device screen.

* * * * *